(12) United States Patent
Rafaeli et al.

(10) Patent No.: US 11,947,196 B2
(45) Date of Patent: Apr. 2, 2024

(54) DYNAMIC TEAR LENSES

(71) Applicant: Pres-By Vision Ltd., Tel-Aviv (IL)

(72) Inventors: Omer Rafaeli, Tel-Aviv (IL); Eugene De Juan, Jr., Tel-Aviv (IL); Yair Alster, Tel-Aviv (IL); Ofer Pintel, Tel-Aviv (IL); Matt Clarke, Menlo Park, CA (US)

(73) Assignee: PRES-BY VISION LTD., Tel Aviv (IL)

( * ) Notice: Subject to any disclaimer, the term of this patent is extended or adjusted under 35 U.S.C. 154(b) by 0 days.

(21) Appl. No.: 17/812,929

(22) Filed: Jul. 15, 2022

(65) Prior Publication Data

US 2022/0350168 A1 Nov. 3, 2022

Related U.S. Application Data

(63) Continuation of application No. 16/608,124, filed as application No. PCT/US2018/030502 on May 1, 2018, now Pat. No. 11,460,719.

(60) Provisional application No. 62/492,780, filed on May 1, 2017.

(51) Int. Cl.
*G02C 7/04* (2006.01)

(52) U.S. Cl.
CPC .............. *G02C 7/049* (2013.01); *G02C 7/047* (2013.01)

(58) Field of Classification Search
CPC .............................. G02C 7/047; G02C 7/049
USPC ...................................... 359/159.02
See application file for complete search history.

(56) References Cited

U.S. PATENT DOCUMENTS

| | | | |
|---|---|---|---|
| 3,468,602 A | 9/1969 | Rosen et al. | |
| 4,477,158 A | 10/1984 | Pollock et al. | |
| 5,422,687 A | 6/1995 | Tanaka et al. | |
| 6,010,219 A | 1/2000 | Stoyan | |
| 7,695,135 B1 | 4/2010 | Rosenthal | |
| 11,460,719 B2 | 10/2022 | Rafaeli et al. | |
| 2008/0231799 A1* | 9/2008 | Iuliano | G02C 7/041 351/159.18 |
| 2010/0245760 A1 | 9/2010 | Win-Hall | |
| 2012/0062835 A1 | 3/2012 | Clamp et al. | |
| 2012/0092775 A1 | 4/2012 | Duston et al. | |
| 2012/0194778 A1 | 8/2012 | Skudder et al. | |
| 2012/0206691 A1 | 8/2012 | Iwai | |
| 2012/0268712 A1 | 10/2012 | Egan et al. | |
| 2014/0043588 A1 | 2/2014 | Grant et al. | |
| 2014/0152953 A1 | 6/2014 | Guillon et al. | |
| 2014/0232982 A1 | 8/2014 | Iwai | |
| 2015/0055081 A1 | 2/2015 | De Juan, Jr. et al. | |
| 2015/0219925 A1 | 8/2015 | Hare et al. | |
| 2016/0109726 A1 | 4/2016 | Tai et al. | |
| 2016/0334640 A1 | 11/2016 | De Juan, Jr. et al. | |
| 2016/0377887 A1 | 12/2016 | Waite et al. | |
| 2017/0315381 A1 | 11/2017 | De Juan, Jr. et al. | |
| 2018/0173010 A1 | 6/2018 | Harant et al. | |
| 2018/0280135 A1 | 10/2018 | Otts | |
| 2018/0329227 A1 | 11/2018 | Chow | |
| 2021/0181530 A1 | 6/2021 | Alster et al. | |
| 2022/0326546 A1 | 10/2022 | Alster et al. | |

FOREIGN PATENT DOCUMENTS

| | | |
|---|---|---|
| CN | 102621710 A | 8/2012 |
| CN | 103467652 A | 12/2013 |
| CN | 103648448 A | 3/2014 |
| CN | 104335104 A | 2/2015 |
| CN | 104823100 A | 8/2015 |
| EP | 2645157 A2 | 10/2013 |
| JP | 2010522352 A | 7/2010 |
| JP | 2013214068 A | 10/2013 |
| JP | 2014170209 A | 9/2014 |
| JP | 2015510152 A | 4/2015 |
| WO | WO-9110154 A1 | 7/1991 |
| WO | WO-2005121874 A1 | 12/2005 |
| WO | WO-2006055707 A2 | 5/2006 |
| WO | WO-2008115251 A1 | 9/2008 |
| WO | WO-2011149196 A2 | 12/2011 |
| WO | WO-2012061160 A1 | 5/2012 |
| WO | WO-2012149056 A1 | 11/2012 |
| WO | WO-2013134825 A1 | 9/2013 |
| WO | WO-2014120928 A2 | 8/2014 |

(Continued)

OTHER PUBLICATIONS

Adler's Physiology of the Eye Ebook [online] 11th edition. Elsevier Health Sciences, 2011. [retrieved on Jan. 15, 2020]. Retrieved from the internet: <url: < a="" href="https://books.google.com/books?id=r1BtVqwSJBsC&ppis">https://books.google.com/books?id=r1BtVqwSJBsC&ppis p. 106. ISBN:0323081169.</url:>.

(Continued)

*Primary Examiner* — James R Greece

(74) *Attorney, Agent, or Firm* — WILSON SONSINI GOODRICH & ROSATI

(57) ABSTRACT

Dynamic contact lenses fabricated with a dynamic portion that extends outward from the peripheral portion are disclosed. When worn on an eye the dynamic portion forms a tear lens for correcting vision. The dynamic portion can also be configured to provide a dynamic tear lens that changes optical power with forces applied by eyelids. The dynamic portion can be configured to assume a conforming configuration and at least one non-conforming configuration, or can be configured to assume at least two non-conforming configurations. The dynamic contact lenses can be used for correcting vision such as correcting presbyopia.

12 Claims, 40 Drawing Sheets

(56) References Cited

FOREIGN PATENT DOCUMENTS

| WO | WO-2014210186 A2 | | 12/2014 | | |
|---|---|---|---|---|---|
| WO | WO-2016115369 A1 | * | 7/2016 | ........... | B29C 64/129 |
| WO | WO-2016173620 A1 | | 11/2016 | | |
| WO | WO-2017060537 A2 | | 4/2017 | | |
| WO | WO-2018204395 A1 | | 11/2018 | | |
| WO | WO-2020049356 A1 | | 3/2020 | | |
| WO | WO-2021136961 A2 | | 7/2021 | | |

OTHER PUBLICATIONS

Horst et al. Measuring the Modulus of Silicone Hydrogel Contact Lenses. Optom Vis Sci. 89(10):1468-76 (2012).
PCT/IB2019/000956 International Search Report and Written Opinion dated Feb. 3, 2020.
PCT/US2018/030502 International Search Report and Written Opinion dated Sep. 3, 2018.
U.S. Appl. No. 16/608,124 Office Action dated Apr. 6, 2022.

* cited by examiner

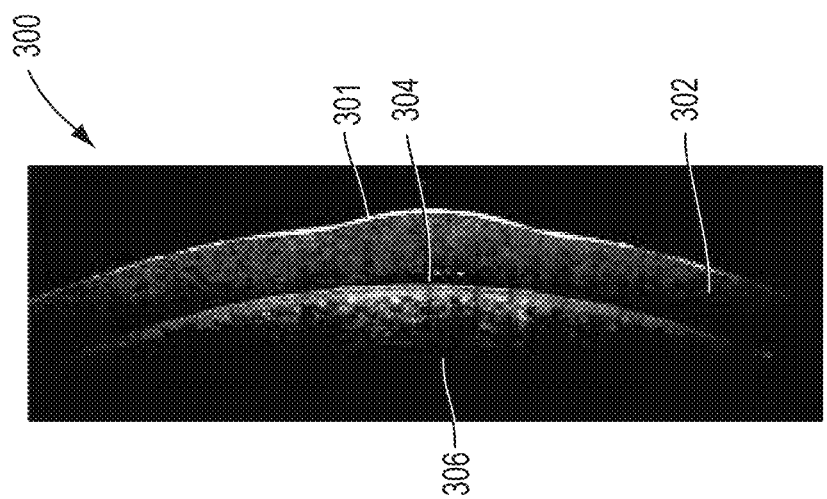
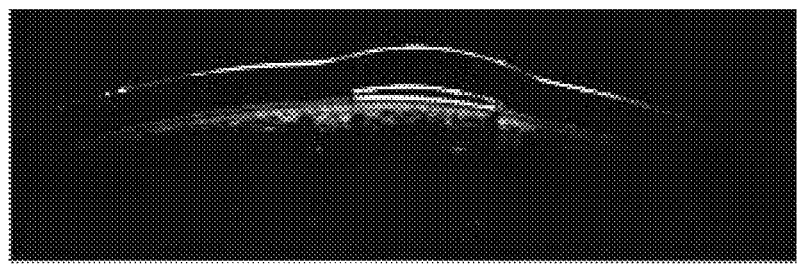
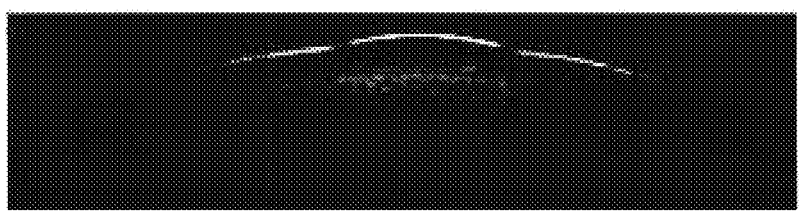
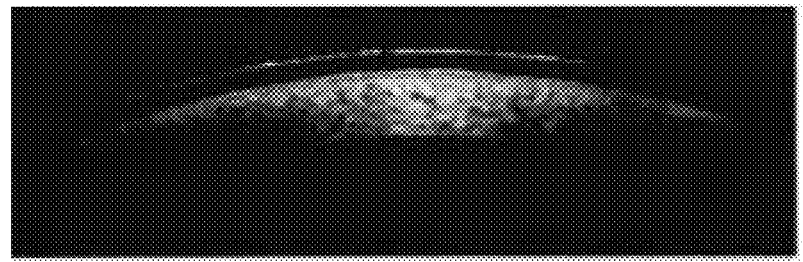
FIG. 3D
FIG. 3C
FIG. 3B
FIG. 3A

| | 4mm Diameter | | |
|---|---|---|---|
| | Curve (m) | Diameter (m) | Vault Height (mm) |
| Corneal Surface | 0.00775 | 0.004 | 0.019 |

| | 5mm Diameter | | |
|---|---|---|---|
| | Curve (m) | Diameter (m) | Vault Height (mm) |
| Corneal Surface | 0.00775 | 0.005 | 0.030 |

DYNAMIC TEAR LENSES

CROSS-REFERENCE

This application is a continuation application of U.S. Ser. No. 16/608,124, filed Oct. 24, 2019, which is the National Stage entry of International Application Number PCT/US2018/030502, filed May 1, 2018, which claims the benefit of U.S. Provisional Application No. 62/492,780, filed May 1, 2017, which application is incorporated herein by reference in their entireties.

FIELD

This disclosure relates to dynamic contact lenses having a dynamic portion that when placed on a cornea have a conforming configuration and at least one non-conforming configuration, or can have at least two non-conforming configurations. When worn on an eye the dynamic portion forms a tear lens for correcting vision. The dynamic portion can also be configured to provide a dynamic tear lens that changes optical power in response to forces applied to the dynamic contact lens by eyelids and/or gaze movement. The contact lenses can be used for correcting vision such as for correcting presbyopia, delaying the progression of myopia progression, or for correcting vision caused by an irregularly-shaped cornea.

BACKGROUND

Typical vision problems such as myopia (nearsightedness), hyperopia (farsightedness) and presbyopia (loss of accommodation and subsequent loss of near and intermediate vision) are readily correctable using eyeglasses. However, some individuals prefer contact lenses for vision correction for reasons such as to accommodate an active life style or for aesthetic reasons.

Contact lens wearers who become presbyopic with age require additional corrective lenses to allow both near, intermediate, and distance vision. To address presbyopia, contact lens manufacturers have developed multifocal lenses that simultaneously focus light from a range of distances via several focal regions and bifocal lenses that include two focusing regions, e.g., a central region for correcting myopia and a surrounding region for correcting hyperopia. The latter lenses translate with respect to the optical axis of the eye to provide both near and far vision correction depending on the eye gaze angle.

Translating contact lenses are configured for moving (translating) anywhere from 1 mm to 6 mm over the surface of the cornea and as such are significantly less stable than standard contact lenses, which typically have a movement over the cornea from 0 mm to 1 mm. Because translating lenses are designed to move, during upper eyelid blinking, translating lenses shift downward over the cornea such that the lower edge of the lens impinges upon the lower lid margin with every blinking motion. Such repeated movement and lid contact causes significant user discomfort due to the heightened foreign object sensitivity of the cornea and lower lid margin. In addition, due to the presence of the meibomian gland opening on the lower lid margin, lower lid impingement can lead to repeated trauma and inflammation of these openings which can lead to hyperkeratosis and possibly meibomian gland dysfunction.

SUMMARY

According to the present invention, dynamic contact lenses comprise: a dynamic portion comprising a dynamic posterior surface and a dynamic anterior surface opposite the dynamic posterior surface; a peripheral portion comprising a peripheral posterior surface, a peripheral anterior surface opposite the peripheral posterior surface, and a transition zone coupling the peripheral portion and the dynamic portion; wherein the dynamic portion comprises: a material having a Young's modulus within a range from 0.05 MPa to 10 MPa; and an as-fabricated center SAG height from 10 μm to 300 μm.

According to the present invention, dynamic contact lenses comprise: a peripheral portion, a dynamic portion coupled to the peripheral portion, wherein the dynamic portion comprises: a conforming configuration configured to provide a first optical power to an eye having a cornea; and at least one non-conforming configuration configured to provide a second optical power to the eye, wherein the second optical power is different than the first optical power.

According to the present invention, dynamic contact lenses, comprise: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

According to the present invention, dynamic contact lenses comprise: a dynamic portion comprising a dynamic posterior surface, wherein the dynamic posterior surface comprises a dynamic base curvature; a peripheral portion coupled to the dynamic portion, wherein the peripheral portion comprises a peripheral posterior surface; and the peripheral posterior surface comprises a peripheral base curvature; wherein, in a first configuration the dynamic base curvature is substantially the same as the peripheral base curvature; and in a second configuration the dynamic base curvature deviates from the peripheral base curvature.

According to the present invention, dynamic contact lenses comprise a dynamic portion, wherein, the dynamic portion comprises a dynamic posterior surface; the dynamic posterior surface comprises a dynamic base curvature; in a first configuration the dynamic base curvature is substantially the same as a corneal curvature; and in a second configuration the dynamic base curvature deviates from the corneal curvature.

According to the present invention, dynamic contact lenses comprise: a peripheral portion, wherein the peripheral portion comprises a peripheral posterior surface, wherein the peripheral posterior surface comprises a peripheral base curvature; and a dynamic portion coupled to the peripheral portion, wherein the dynamic portion comprises a center thickness, and a center SAG height with respect to the peripheral base curvature; wherein, the dynamic portion is configured to assume a first configuration characterized by a first center gap height with respect to the peripheral base curvature and assume a second configuration characterized by a second center gap height with respect to the peripheral base curvature, wherein, the first center gap height and the second center gap height are different; and the first configuration and the second configuration are quasi-stable.

According to the present invention, dynamic contact lenses comprise a dynamic portion comprising a posterior surface, wherein, the posterior surface comprises a dynamic base curvature; in a first configuration the posterior surface comprises a first base curvature; and in a second configuration the posterior surface comprises a second base curvature.

According to the present invention, dynamic contact lenses comprise: a dynamic portion, wherein the dynamic portion comprises: at least one first non-conforming configuration configured to provide a first optical power to an eye having a cornea; and at least one second non-conforming configuration configured to provide a second optical power to the eye, wherein the second optical power is different than the first optical power; at least one first mechanism configured to induce a change between the first non-conforming configuration and the at least one second non-conforming configuration; and at least one second mechanism configured to induce a change between the at least one second non-conforming configuration and the at least one first non-conforming configuration.

According to the present invention, dynamic contact lenses comprise: a first portion comprising a first posterior surface, a first anterior surface opposite the first posterior surface, and a first material, wherein, the first posterior surface comprises a first radius of curvature; and the first material comprises a first Young's modulus; and a second portion coupled to the first portion, wherein the second portion comprises a second posterior surface and a second anterior surface opposite the second posterior surface, and a second material, wherein, The second posterior surface comprises a second radius of curvature; and the second material comprises a second Young's modulus; and wherein the first radius of curvature is less than the second radius of curvature; and wherein each of the first Young's modulus and the second Young's modulus is independently within a range from 0.05 MPa to 10 MPa.

According to the present invention, dynamic contact lenses comprise: a first portion comprising a first posterior surface, a first anterior surface opposite the first posterior surface, and a first material, wherein the first material comprises a first Young's modulus; and a peripheral portion coupled to the first portion, wherein the peripheral portion comprises: a peripheral posterior surface having a base curvature, and the second material comprises a second Young's modulus; and wherein the first posterior surface bulges anteriorly from the base curvature of the posterior surface of the peripheral portion; and wherein each of the first Young's modulus and the second Young's modulus is independently within a range from 0.05 MPa to 10 MPa.

According to the present invention, methods of correcting vision of a patient comprise applying a dynamic contact lens according to the present invention to an eye of a patient in need of corrected vision.

According to the present invention, methods of treating presbyopia comprise applying a dynamic contact lens according to the present invention to a presbyopic eye of a patient.

According to the present invention, methods of correcting vision of a patient comprise applying a dynamic contact lens according to the present invention to an eye of a patent in need of such treatment.

According to the present invention, methods of treating an eye of a patient following ocular therapy comprise applying a dynamic contact lens according to the present invention to an eye of a patent in need of such treatment.

According to the present invention, methods of healing a trauma wound to a cornea of an eye of a patient comprise applying a dynamic contact lens according to the present invention to an eye of a patent in need of such healing.

According to the present invention, methods of protecting an eye of a patient from a potential injury comprise applying a dynamic contact lens according to the present invention to an eye of a patent in need of such protection.

According to the present invention, methods of fabricating a dynamic contact lens comprise molding a material to provide a dynamic contact lens comprising: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

According to the present invention, methods of fabricating a dynamic contact lens comprise molding a material to provide a dynamic contact lens comprising: a dynamic portion characterized by a dynamic base curvature; and a peripheral portion coupled to the dynamic portion, wherein the peripheral portion comprises a peripheral base curvature, wherein the dynamic base curvature is different than the peripheral base curvature.

According to the present invention, dynamic contact lenses according to the present invention are applied to a cornea.

BRIEF DESCRIPTION OF DRAWINGS

The drawings described herein are for illustration purposes only. The drawings are not intended to limit the scope of the present disclosure.

FIGS. 3A-3D show optical coherence tomography (OCT) images of dynamic contact lenses provided by the present disclosure having a tear lens with a gap height of 0 μm, 43 μm, 84 μm, and 105 μm, respectively.

FIG. 4A shows a dynamic contact lens in which the dynamic portion is proximate the cornea where the posterior surface of the dynamic portion is held against the cornea by capillary forces. FIG. 4A shows a view of a dynamic contact lens illustrating the direction of tear flow movement from the tear fluid reservoirs toward the dynamic portion when force is applied to the tear fluid reservoirs by the lower eyelid when gazing down. FIG. 4A shows a view of a dynamic contact lens in which the dynamic portion bulges away from the cornea to provide a volume for a tear lens. FIG. 4B shows a bottom view of the dynamic contact lens shown in FIG. 4A.

FIG. 23A shows a cross-sectional view, FIG. 23B shows a view of the anterior surface, and FIG. 23C shows a view of the posterior surface.

FIG. 24A shows a cross-sectional view, FIG. 24B shows a view of the anterior surface, and FIG. 24C shows a view of the posterior surface.

Figure 1A:
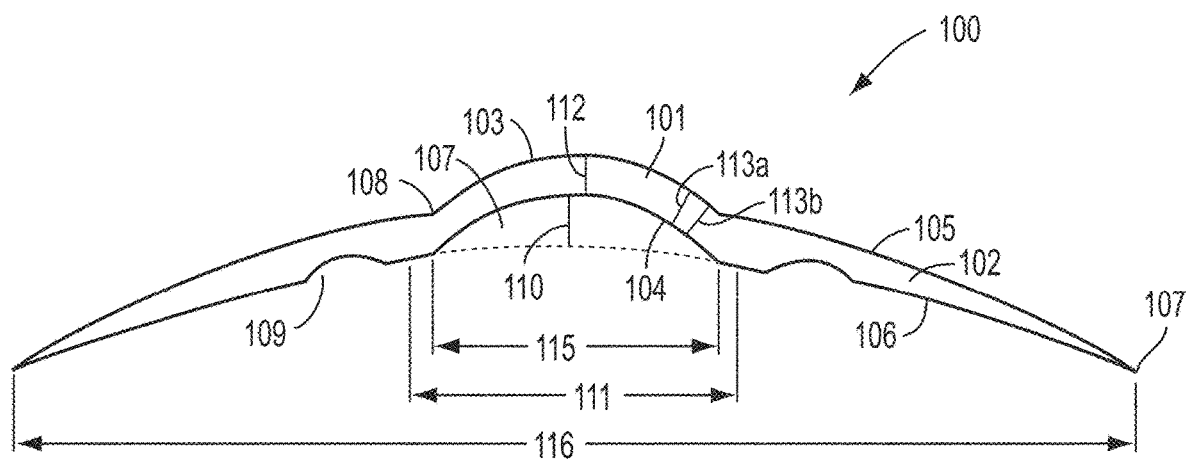
FIG. 1A shows a cross-sectional view of a dynamic contact lens provided by the present disclosure having cavities for tear fluid reservoirs.

Reference is now made in detail to certain embodiments of the present disclosure. While certain embodiments of the present disclosure are described, it will be understood that it is not intended to limit the embodiments of the present disclosure to the disclosed embodiments. To the contrary, reference to embodiments of the present disclosure is intended to cover alternatives, modifications, and equivalents as may be included within the spirit and scope of the embodiments of the present disclosure as defined by the appended claims.

DETAILED DESCRIPTION

As used herein, "posterior" describes features facing toward the eye and "anterior" describes features facing away from the eye when worn by a patient. A posterior surface of a dynamic contact lens or portion thereof refers to a surface that is near to or faces the cornea during wear by a patient.

The anterior surface of a dynamic contact lens or portion thereof refers to a surface that is away from or faces away from the cornea during wear by a patient.

"Substantially" refers to ±10% of a value such as a dimension.

"Substantially conforming to the surface of the cornea" refers to a configuration in which the posterior surface of a portion of a dynamic contact lens is within 3 μm from the surface of the cornea. The gap between the posterior portion of the dynamic contact lens and the cornea can comprise tear fluid.

As used herein, the "modulus" of a material refers to the Young's modulus. The Young's modulus can be determined, for example, according to the method described by Jones et al., *Optometry and Vision Science*, 89, 10, 1466-1476, 2017.

The optical power of the cornea in diopters (D) can be related to the radius of curvature R by the formula D=(1.3375−1)/R, where 1.3375 corresponds to the index of refraction of the aqueous humour and R corresponds to the radius of curvature of the anterior surface of the cornea. The curvature of the cornea is inversely related to the radius of curvature R such that as the radius of curvature increases the curvature of the cornea decreases, and such that as the radius of curvature decreases the curvature of the cornea increases.

While rigid gas permeable (RGP) lenses are known to create tear lenses, RGP lenses do not possess the ability to change conformation. Soft dynamic contact lenses typically conform to the corneal surface in a uniform manner and any thin tear film under the lens is not used and is not sufficient to create any optical power. In the present invention, a dynamic tear lens system is used in conjugation with soft contact lens materials.

Dynamic contact lenses provided by the present disclosure can be fabricated with a dynamic portion that can transition between two or more configurations on the eye where each of the two or more configurations provides a different optical power. When in a configuration in which the dynamic portion or at least a part of the dynamic portion does not conform to the cornea, a lenticular volume is formed between the anterior surface of the cornea and the posterior surface of the dynamic portion of the dynamic contact lens which can fill with tear fluid to form a tear lens for correcting vision. Dynamic contact lenses can be configured to transition between a conforming configuration and one or more non-conforming configurations. Dynamic lenses can be configured to transition between two or more non-conforming configurations.

Dynamic contact lenses provided by the present disclosure can be fabricated with a dynamic portion that can transition between two or more configurations on the eye where each of the two or more configurations provides a different optical power. When in a configuration in which the dynamic portion or at least a part of the dynamic portion does not conform to the cornea, a lenticular volume is formed between the anterior surface of the cornea and the posterior surface of the dynamic portion of the dynamic contact lens which can fill with tear fluid to form a tear lens for correcting vision. In this case, the at least two configurations are both non-conforming and each has a tear lens each providing a different optical power to the eye.

A tear lens is a liquid lens formed between a posterior surface of a dynamic contact lens and the anterior corneal surface. The tear lens combines with other optical surfaces in the system (such as the cornea and the dynamic contact lens) to form a new optical system. The quantitative relationship between the base curve of the dynamic contact lens and the tear lens power can be described by Equation (1):

$$\text{refractive power of tear lens} = (336/R_{BOZ} - 336/K) \tag{1}$$

where $R_{BOZ}$ is the back optic zone radius of the dynamic contact lens in mm, and K is the radius of the anterior surface of the cornea in mm. The base curve refers to the curvature of the posterior surface of the peripheral portion of the dynamic contact lens and when disposed on the cornea is substantially the same as the curvature of the anterior surface of the cornea.

The quantitative relationship between the dynamic contact lens actual back surface base curve and the tear lens can also be described by Equation (2):

$$F_t = (n-1)/R_{BOZ} + (1-n)/RC \tag{2}$$

where $F_t$ is the optical power of the tear lens, n is the refractive index of tear fluid (1.337±0.001), RC is the radius of curvature of the cornea in mm, and $R_{BOZ}$ is radius of the back optic zone of the dynamic contact lens in mm.

For a cylindrically-shaped tear lens, the quantitative relationships are calculated for each meridian.

A cross-section of an example of a dynamic contact lens 100 provided by the present disclosure is shown in FIG. 1A. The lens includes a dynamic portion 101 that bulges away from the base curvature of a peripheral portion 102 and/or bulges away from the base curvature of the peripheral portion adjacent the dynamic portion. This region of the peripheral portion can be referred to as the paracentral peripheral portion which is adjacent to the dynamic portion. The paracentral peripheral has a base curvature. In an as-fabricated and non-conforming configuration, the dynamic portion bulges away from the base curvature of the paracentral peripheral portion. It should be appreciated that 102 represents a curvature that is different from 101 and can be itself be formed from one or more curvatures. The dynamic portion 101 includes a dynamic anterior surface 103, and a dynamic posterior surface 104. The dynamic posterior surface 104 comprises a curvature. The peripheral portion of the dynamic contact lens 102 includes peripheral anterior surface 105, peripheral posterior surface 106, peripheral edge 107, and a lens diameter 116. The peripheral portion 102 is coupled to the dynamic portion 101. Dynamic portion 101 and peripheral portion 102 are coupled at interface 108, also referred to as the transition zone. The peripheral posterior surface comprises cavities 109, which when placed on the cornea fill with tear fluid to provide tear fluid reservoirs. The peripheral posterior surface 106 comprises a peripheral base curvature. The extension of the peripheral base curvature under the region of the dynamic portion 101 is indicated by the dashed line. A SAG (sagittal) height 110 is shown as the distance from the peripheral base curvature to the posterior surface of the lens. As used herein, the SAG height refers to a dimension of the as-fabricated dynamic lens and can be referred to as the as-fabricated SAG height. When applied to the cornea, the distance between the posterior surface of the dynamic portion and the cornea is referred to the gap height. As disclosed herein, the gap height may be the same as the SAG height, however, in many embodiments, the gap height is less than the as-fabricated SAG height. At some gaze angles, the gap height can be less than the as-fabricated SAG height and at other gaze angles, the gap height can be close to the as-fabricated SAG height. The center bulge comprises a plurality of SAG heights depending on the radial distance from the center of the lens. In FIG. 1A the largest SAG height is at the center of the dynamic portion which is located at the center geometric axis of the lens 112. The SAG height decreases toward the periphery of the dynamic portion 115 forming a lens shape. In FIG. 1A, the optical region 111 is slightly larger than the diameter of the dynamic portion. The optical region refers to the region of the lens used for vision. The diameter of the dynamic portion can be larger than that of the optical region. In some embodiments, the diameter of the dynamic portion can be less than the diameter of the optical region. In some embodiments the diameter of the dynamic portion can be similar to or the same as the diameter of the optical region.

As shown in FIG. 1A, the center SAG height 110 is defined as the distance between the extended curvature of the peripheral posterior surface 106 which is configured to lie against the cornea and the posterior surface at the center of dynamic portion 104. The dynamic portion can be characterized by a plurality of SAG heights depending on the location with respect to the center axis of the bulging dynamic portion. The SAG height will be a maximum in the center and will diminish toward the periphery of the dynamic portion. The dynamic portion 101 comprises a center thickness 112 and examples of two radial sagittal thickness are identified as 113a and 113b. In FIG. 1A the diameter of the optical region 111 is shown as being slightly larger than the diameter 115 of the dynamic portion. The dynamic contact lens 100 has a diameter 116. As shown in FIG. 1A, the dynamic portion 101, the peripheral portion 102, and the optical region are co-aligned about the center geometric axis of the dynamic contact lens.

Figure 1B:
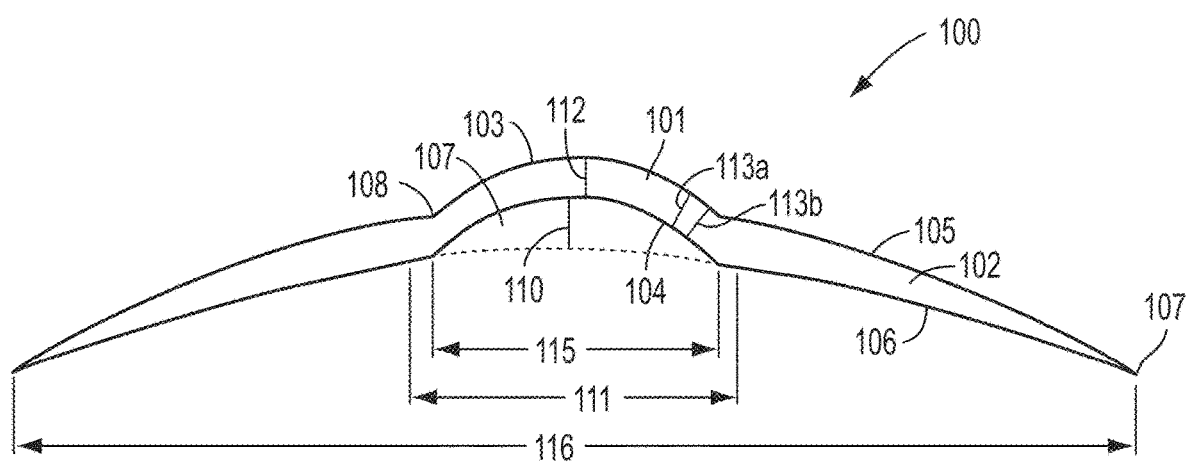
FIG. 1B shows a cross-sectional view of a dynamic contact lens provided by the present disclosure without cavities for tear fluid reservoirs.

FIG. 1B shows a dynamic contact lens similar to that shown in FIG. 1A, but without the cavities for tear fluid reservoirs. The elements in FIG. 1B are defined as for FIG. 1A.

Dynamic contact lens provided by the present disclosure can comprise a peripheral portion comprising a peripheral posterior surface and a peripheral anterior surface opposite the peripheral posterior surface; a dynamic portion; a transition zone coupling the peripheral portion and the dynamic portion; wherein the dynamic portion comprises: a material having a Young's modulus within a range from 0.05 MPa to 50 MPa; and wherein the dynamic portion is characterized by a profile that extends away from the peripheral anterior surface and away from the peripheral posterior surface. The dynamic portion can be characterized by an as-fabricated SAG height within a range from 10 μm to 250 μm. The Young's modulus is within a range, for example, from 0.1 MPa to 20 MPa, from 0.1 MPa to 3 MPa, from 0.1 MPa to 2 MPa, or from 0.1 MPa to 5 MPa. The dynamic portion can be characterized by an as-fabricated SAG height is within a range from 10 μm to 100 μm. The dynamic portion can comprise a maximum thickness within a range from 20 μm to 600 μm, from 50 μm to 500 μm, from 100 μm to 400 μm, or from 50 μm to 300 μm. The dynamic portion can comprise a center thickness within a range from 20 μm to 600 μm, from 50 μm to 500 μm, from 100 μm to 400 μm, or from 50 μm to 300 μm. The dynamic portion is characterized by a substantially uniform thickness, by a center thickness that is the same as a thickness at the transition zone, by a center thickness that is greater than a thickness at the transition zone, or by a center thickness that is less than a thickness at the transition zone. The peripheral portion can comprise an intermediate portion coupled to the dynamic portion characterized by an intermediate radius of curvature; and a distal portion coupled to the intermediate portion characterized by a distal radius of curvature, wherein the intermediate radius of curvature is less than the distal radius of curvature. The transition zone can comprise one or more features configured to facilitate transitioning the dynamic portion between two or more quasi-stable configurations. The dynamic contact lens can comprise one or more cavities in the peripheral posterior surface. The dynamic contact lens can comprise one or more protrusions in the peripheral anterior surface. The dynamic contact lens can comprise one or more grooves in the posterior surface of the peripheral portion. The dynamic contact lens can comprise one or more fenestrations. The dynamic contact lens can comprise one or more cavities in the peripheral posterior surface and one or more protrusions in the peripheral anterior surface, one or more grooves in the posterior surface, and/or one or more fenestrations. A groove or channel can be coupled to one or more fenestrations.

Dynamic contact lens provided by the present disclosure can comprise a dynamic portion comprising a dynamic posterior surface and a dynamic anterior surface opposite the dynamic posterior surface; a peripheral portion comprising a peripheral posterior surface, a peripheral anterior surface opposite the peripheral posterior surface, and a transition zone coupling the peripheral portion and the dynamic portion; wherein the dynamic portion comprises: a material having a Young's modulus within a range from 0.05 MPa to 10 MPa; and an as-fabricated center SAG height from 10 μm to 300 μm.

The material can have a Young's modulus, for example, within a range from 0.05 MPa to 8 MPa, from 0.1 MPa to 6 MPa, from 0.1 MPa to 4 MPa, from 0.1 MPa to 3 MPa, from 0.1 MPa to 2 MPa, or from 0.5 MPa to 1 MPa.

The center SAG height, such as the center as-fabricated SAG height, can be within a range, for example, from 20 μm to 300 μm, from 50 μm to 300 μm, from 10 μm to 200 μm, from 10 μm to 100 μm, from 50 μm to 250 μm, or from 50 μm to 200 μm.

The dynamic contact lens can be configured to produce a tear lens for correcting vision when applied to a cornea.

When the dynamic contact lens is applied to a cornea, the dynamic portion can assume two or more quasi-stable configurations, wherein the two or more quasi-stable configurations are characterized by a different gap between the center dynamic posterior surface and the cornea. The dynamic contact lens can be configured such that the dynamic portion can transition between the two or more quasi-stable states by pressure applied to the dynamic contact lens by the eyelids.

The dynamic portion can have a diameter, for example, from 2.5 mm to 7 mm, from 2.5 mm to 6.5 mm, from 2.5 mm to 6.0 mm, from 2.5 mm to 5 mm, or from 2 mm to 4 mm.

The dynamic posterior surface can have a radius of curvature, for example, from 3 mm to 7.5 mm, from 3 mm to 7 mm, from 3.5 mm to 6.5 mm, from 4 mm to 6 mm.

The dynamic posterior surface of the dynamic contact lens can have a substantially spherical curvature and the dynamic anterior surface can have a substantially spherical curvature. Thus, in certain embodiments, the optical power of the dynamic lens is derived from the tear lens and not from the material forming the lens.

The dynamic portion can have a substantially uniform thickness. For example, the dynamic portion can have a substantially uniform thickness from 20 μm to 300 μm, from 20 μm to 250 μm, from 50 μm to 200 μm, or from 50 μm to 150 μm.

The dynamic portion can have a non-uniform thickness. For example, a dynamic portion having a non-uniform thickness can have a center thickness from 20 μm to 300 μm, from 20 μm to 250 μm, from 50 μm to 200 μm, or from 50 μm to 150 μm.

The transition zone can be configured facilitate flow of tear fluid to a tear lens formed between the dynamic posterior surface and a cornea when the dynamic lens is applied to an eye.

For example, the transition zone can include groove or channels that facilitate the ability of tear fluid to flow into and out of the tear lens defined by the dynamic portion.

The one or more channels can be disposed in the posterior surface of the peripheral portion and can extend from the dynamic portion to the peripheral portion.

For example, each of the one or more channels can extend radially outward from the dynamic portion.

The one or more channels can comprise, for example, from 3 to 20 channels, from 3 to 16 channels, from 3 to 12 channels, from 4 to 10 channels or from 4 to 8 channels.

Each of the one or more channels can have a width, for example, from 100 µm to 1,000 µm, from 100 µm to 800 µm, from 100 µm to 600 µm, from 200 µm to 600 µm, or from 400 µm to 600 µm.

Each of the one or more channels can have a height/depth, for example, from 50 µm to 200 µm, from 50 µm to 150 µm, or from 100 µm to 200 µm.

Each of the one or more channels can have a length, for example, from 1 mm to 7 mm, from 1 mm to 6 mm, from 1 mm to 5 mm, from 1 mm to 4 mm, or from 1 mm to 3 mm.

A groove or channel can have any suitable cross-sectional profile for facilitating the flow of tear fluid.

At least one of the channels can be coupled to one or more fenestrations extending through the peripheral anterior surface. A fenestration can be configured to fluidly couple a tear layer or the anterior surface of the lens to a channel or to the tear film between the peripheral posterior surface of the lens and the cornea. For example, a channel can be coupled to one, two, three or more fenestrations.

Each of the one or more fenestrations can independently have a diameter, for example, from 200 µm to 600 µm, from 300 µm to 500 µm. A fenestration can have any suitable cross-sectional profile to facilitate the flow of tear fluid.

The transition zone can comprise features configured to enhance the flexibility of the dynamic portion. Examples of features to enhance the flexibility of the dynamic portion, to facilitate the ability of the dynamic portion to transition between quasi-stable configurations, and/or to facilitate the ability of the dynamic portion to maintain a quasi-stable configuration include smooth edges, a thinned cross-sectional thickness, grooves, or a combination of any of the foregoing.

For example, a dynamic contact lens provided by the present disclosure can comprise a dynamic portion having a diameter from 2.5 mm to 7 mm, a posterior dynamic surface having a radius of curvature from 3 mm to 7.5 mm, a substantially uniform thickness with a center thickness from 20 µm to 300 µm, one or more channels extending radially outward from the dynamic portion toward the peripheral edge of the lens, where the one or more channels is from 3 to 20 channels, where each channel has a width from 100 µm to 1,000 µm, a height/depth from 50 µm to 200 µm, a length from 1 mm to 7 mm, and one or more fenestrations coupled to each of the one or more channels, where the fenestrations have a diameter from 200 µm to 600 µm.

As another example, a dynamic contact lens provided by the present disclosure can comprise a dynamic portion having a diameter from 2.5 mm to 7 mm, a posterior dynamic surface having a radius of curvature from 3 mm to 7.5 mm, a substantially uniform thickness with a center thickness from 50 µm to 300 µm, one or more channels extending radially outward from the dynamic portion toward the peripheral edge of the lens, where the one or more channels is from 3 to 10 channels, where each channel has a width from 400 µm to 600 µm, a height/depth from 50 µm to 150 µm, a length from 1 mm to 5 mm, and one or more fenestrations coupled to each of the one or more channels, where the fenestrations have a diameter from 300 µm to 500 µm.

Dynamic contact lenses provided by the present disclosure can comprise a dynamic portion, wherein the dynamic portion comprises a conforming configuration configured to provide a first optical power to an eye having a cornea; and at least one non-conforming configuration configured to provide a second optical power to the eye, wherein the second optical power is different than the first optical power; at least one first feature configured to induce a change between the conforming configuration and the at least one non-conforming configuration; and at least one second mechanism configured to induce a change between the at least one non-conforming configuration and the conforming configuration.

Dynamic contact lenses provided by the present disclosure can comprise a dynamic portion, wherein the dynamic portion comprises a first non-conforming configuration configured to provide a first optical power to an eye having a cornea; and at least one second non-conforming configuration configured to provide a second optical power to the eye, wherein the second optical power is different than the first optical power; at least one first feature configured to induce a change between the first non-conforming configuration and the at least one second non-conforming configuration; and at least one second mechanism configured to induce a change between the at least one non-conforming configuration and the conforming configuration.

When applied to an eye, the dynamic portion can assume a configuration in which the posterior surface of the dynamic portion conforms to or substantially conforms to the anterior surface of the cornea. It will be appreciated that in a conforming configuration, a thin tear film will be present between the posterior surface of the dynamic contact lens and the anterior surface of the cornea. For example, the tear film can be from 0.1 µm to 3 µm thick, from 0.5 µm to 2.5 µm thick, or from 1 µm to 2 µm thick. A dynamic contact lens can be designed such that in a conforming configuration, the tear film thickness between the dynamic portion and the cornea can be greater than 3 µm and/or can vary across the dynamic portion to create a lens shape.

When applied to an eye, the dynamic portion can assume a first non-conforming configuration in which the posterior surface of the dynamic portion does not conform to the anterior surface of the cornea. For example, in a first non-conforming configuration the center gap between the anterior surface of the cornea and the posterior surface of the dynamic portion can be greater than 3 µm, such as greater than 5 µm, greater than 10 µm, greater than 20 µm, greater than 30 µm, greater than 40 µm, greater than 50 µm, greater than 60 µm, greater than 70 µm, greater than 80 µm, or greater than 100 µm. For example, in a first non-conforming configuration the center gap between the anterior surface of the cornea and the posterior surface of the dynamic portion can be within a range from 5 µm to 100 µm, from 10 µm to 90 µm, from 10 µm to 70 µm, from 10 µm, to 50 µm, or from 10 µm to 30 µm. The dynamic portion can assume a second conforming configuration in which the center gap between the anterior surface of the cornea and the posterior surface of the dynamic portion which is greater than the center gap in the first non-conforming configuration, and can be within a range, for example, from 10 µm to 200 µm, or from 10 µm to 100 µm. It should be appreciated that the fundamental difference between the two configurations is that one configuration is more conforming to the cornea and the other configuration is less conforming and thus a change in tear lens dimensions is created between the two non-conforming configurations, which provides a change of optical power when the dynamic lens is in either of the two quasi-stable non-conforming configurations.

The dynamic lens is fabricated such that curvature 101 is different from curvature 102 such that the as-fabricated SAG height is small when no tear fluid flows under the dynamic portion and no mechanical force is applied to the lens. However, when tear fluid flows under the dynamic portion such as induced by a gaze change or lid pressure, the as-fabricated SAG assumes some or all of the as-fabricated SAG height, causing the dimensions of the tear lens to change and thereby change the optical power of the dynamic portion. The as-fabricated SAG can be designed based on the desired change in optical power.

The gap height of the tear lens can assume from 10% to 100% of the as-fabricated SAG height during gaze change or upon lid pressure. The percent the gap height can recover is at least in part determined by the flow of tear fluid, the availability of tear fluid to flow under the dynamic portion, and structural features such as tear fluid reservoirs, channels, grooves, fenestrations, transition geometry, peripheral and edge geometry and/or other features such as material properties and surface properties that control and/or facilitate the flow of tear fluid in different portions of the dynamic lens. In effect, the as-fabricated SAG height as well as other structural features of the dynamic lens including, for example, the thickness, material modulus, radius of curvature, and diameter contribute to imparting a restoring force to the dynamic portion in the anterior direction and away from the cornea that produces a pumping force to pull tear fluid beneath the dynamic portion to form a tear lens in a quasi-stable non-conforming configuration. This restoring force can be overcome by application of eyelid pressure to the dynamic lens causing the dynamic portion to move in the posterior direction and toward the cornea to assume another quasi-stable non-conforming or conforming configuration.

In the conforming configuration the distance between the posterior surface of the dynamic portion and the cornea can be, for example, less than 3 µm, less than 2 µm, or less than 1 µm.

A dynamic contact lens can be fabricated such that the dynamic portion is designed to not conform to a cornea. In such embodiments the dynamic portion vaults over the cornea creating a gap height that is equal to or greater than 10 µm to create a tear lens that provides an optical power. For example, an optic zone of 3 mm in diameter with a base curve of 6.2 mm will create a gap height of 40 µm relative to the peri-central base curve; or, for example, an optic zone of 5 mm in diameter with a base curve (BC) of 6.4 mm will create a gap height of 100 µm relative to the peri-central BC. In the conforming configuration the base curvature of the posterior surface of the dynamic portion can be substantially the same as the base curvature of the peripheral portion.

In another embodiment the contact lens is designed such that the dynamic portion is made of a low-modulus material as disclosed herein, e.g., a material having a Young's modulus from 0.05 MPa to 10 MPa, or from 0.1 MPa to 2 MPa, is designed not to conform to a cornea. In such embodiments, the dynamic portion vaults over the corneal curvature to create a gap that is equal to or greater than 10 µm to create a tear lens. For example, an optic zone of 3 mm in diameter with BC of 6.2 mm will create a gap height of 40 µm relative to the peri-central BC; or, for example, an optic zone of 5 mm in diameter with a BC of 6.4 mm will create a gap height of 100 µm relative to the peri-central BC. In the conforming configuration the base curvature of the posterior surface of the dynamic portion can be substantially the same as the base curvature of the peripheral portion.

A conforming configuration represents a quasi-stable state. By quasi-stable is meant that the configuration can be maintained for a period of time unless or until a force is applied to disrupt the quasi-stable equilibrium.

The quasi-stable conforming configuration can be maintained by adhesion forces between the posterior surface of the dynamic portion and the anterior surface of the cornea. The quasi-stable conforming configuration can be maintained by mechanical dynamics of the dynamic contact lens. The quasi-stable conforming configuration can be maintained by a combination of adhesive force and lens mechanical forces.

The adhesion forces can be mediated by capillary forces that include, for example, the cohesive forces within the tear fluid and the adhesive forces between the film of tear fluid and the anterior surface of the cornea. The surface tension of the thin film of tear fluid between the posterior surface of the dynamic portion and the cornea can cause the two surfaces to adhere. With the tear fluid and the anterior ocular surface being hydrophilic, adhesive forces will be favored when the posterior surface of the dynamic portions also hydrophilic. Conversely, when the dynamic posterior surface is hydrophobic the adhesive forces will be less.

Mechanical forces can arise from the selection of the thickness of certain regions of the lens, the selection of the curvature of certain region of the lens, and by the incorporation of features that facilitate manipulation of the lens by the eyelids.

In the conforming configuration, the adhesive forces can extend across the entire dynamic posterior surface or can extend across a portion of the dynamic posterior surface.

In the conforming configuration, the gap between the dynamic posterior surface and the cornea is substantially uniform across the diameter of the dynamic portion. A gap differential can be defined as a difference between the gap distance at the center of the dynamic portion and a gap distance at radial distances away from the center. In the conforming configuration, the gap differential is small and at a minimum. In the conforming configuration the gap differential is smaller than in a non-conforming configuration.

In the conforming configuration the dynamic portion can be configured to provide a first optical power to an eye. The first optical power may be zero (0D). The optical power can be within a range, for example, from 0D to ±6D, from 0D to ±4D, from 0D to ±3D, from 0D to ±2D, or from 0D to ±1D.

The dynamic portion can have one or more quasi-stable non-conforming configurations.

The one or more non-conforming configurations can comprise a single non-conforming configuration, two or more discrete non-conforming configurations, or a plurality of quasi-stable non-conforming configurations, which can be continuous or discrete.

In the conforming configuration the gap differential between the posterior surface of the lens and the cornea at the center of the dynamic portion and the periphery of the dynamic portion toward the transition zone with the peripheral portion, is less in the conforming configuration than in a non-conforming configuration.

In a non-conforming configuration, the dynamic portion is not adhering to the cornea. The dynamic portion extends above or bulges away from the surface of the cornea to provide a lenticular volume between the posterior surface of the dynamic portion and the cornea. The lenticular volume can fill with tear fluid to form a tear lens.

When on an eye, the non-conforming configuration of the dynamic contact lens in conjunction with the tear lens provides a second optical power to the eye, where the first optical power (in the conforming configuration) and the second optical power are not the same. The second optical power in the non-conforming configuration can be more or less than the optical power in the conforming configuration. For example, the second optical power can be less than ±1D, less than ±2D, less than ±3D, less than ±4D, less than ±5D, or less than ±6D of the first optical power. For example, the second optical power can be from 0.1 D to 6D, from 0.1 D to 5D, from 0.1 D to 4D, from 0.1D to 3D, from 0.1D to 2D, or from 0.1D to 1D of the first optical power. For example, the second optical power can be from −0.1D to −6D, from −0.1D to −5D, from −0.1D to −4D, from −0.1D to −3D, from −0.1D to −2D, or from −0.1D to −1D of the first optical power.

In certain dynamic contact lenses, the first optical power does not provide a change in optical power to the eye; and in certain dynamic contact lenses the second optical power does not provide a change in optical power to the eye.

In certain dynamic contact lenses, the conforming configuration provides a first change in optical power to the eye; and the at least one non-conforming configuration provides a second change in optical power to the eye, in addition to the first change in optical power.

For a single non-conforming configuration, the dynamic portion can assume a single configuration in which the dynamic center portion is not adhering to the cornea. The single non-conforming configuration can be quasi-stable. The single non-conforming configuration can have substantially the same shape as the as-fabricated dynamic portion.

A non-conforming configuration can comprise two or more discrete configurations. Each of the two or more discrete non-conforming configurations can impart a different optical power to the eye. The different optical powers are created by the different optical power of the tear lens formed by the dynamic portion. Each of the two or more discrete configurations can be quasi-stable.

A non-conforming configuration can comprise a plurality of configurations which can be discrete or continuous. These discrete or continuous configurations can be quasi-stable or may not be stable. One or more of the plurality of discrete or continuous configurations can be quasi-stable. For example, a quasi-stable configuration included within a plurality of continuous configurations can comprise substantially the shape of the as-fabricated dynamic portion.

A non-conforming configuration can be characterized by a center gap height with respect to the base curvature of the peripheral portion. The posterior surface of the peripheral portion can be characterized by a single curvature, which as shown in FIGS. 1A and 1B, can be extrapolated to extend beneath the dynamic portion of the dynamic contact lens. In non-conforming configurations, the distance between the posterior surface of the dynamic portion and the peripheral base curvature is the gap height with respect to the peripheral base curvature. The gap height can decrease radially from the center of the dynamic portion toward the periphery of the dynamic portion in a non-conforming configuration.

In certain designs, such as for a minus tear lens, the as-fabricated SAG height and the gap height can increase and then decrease toward the transition zone between the dynamic portion with the peripheral portion.

The anterior surface of the lens can have a multifocal structure such that, for example, when the dynamic portion assumes a non-conforming configuration to provide additional optical power to the eye, and the region peripheral to the dynamic portion provides the same optical power as in the conforming configuration.

The entire dynamic lens configuration can be coupled with a multi-focal lens design to provide advantages of a multi-focal lens while also providing additional optical power from the dynamic lens under desired conditions, for example, for intermediate and near vision.

When placed on an eye, the peripheral portion can conform to the cornea, and the peripheral base curvature can be substantially the same as the corneal curvature, and the gap height can be referenced with respect to the anterior surface of the cornea.

In a non-conforming configuration, the center gap height of the dynamic portion can be greater than the center gap height in the conforming configuration.

In a non-conforming configuration, the gap height differential will be greater than the gap height differential in the conforming configuration.

A dynamic contact lens provided by the present disclosure can comprise one or more features configured to induce a change in conformation of the dynamic portion.

The one or more features can induce a change in conformation upon application of pressure to the feature by an eyelid. A mechanism for applying eyelid pressure can be passive, active, or a combination thereof. A passive mechanism can comprise, but does not require, a conscious action by the wearer of a dynamic contact lens. For example, a passive mechanism can comprise changing a gaze angle. An active mechanism can involve a conscious action by the dynamic contact lens wearer to induce transition from one configuration to another. An example of an active mechanism includes consciously blinking or consciously squinting to induce a transition from one configuration of the dynamic portion to another configuration of the dynamic portion. A conscious mechanism can comprise repeated blinking or holding the eyelids closed for a period of time.

The mechanism for inducing a conformational change can also be due to internal forces within the lens that can cause the dynamic portion to bulge once the capillary forces are overcome. For example, for a lens fabricated with a bulge, a bulging conformation can represent a low-energy configuration. After the capillary forces are reduced to release the conforming dynamic portion, the physical structure of the dynamic contact lens will act as a force to cause the dynamic portion to bulge away from the cornea and assume the as-fabricated shape. The mechanism for inducing a transition between conforming and non-conforming states may not involve capillary forces. Mechanical forces within the lens can cause the dynamic portion to transition between configurations. Tear fluid can flow into the volume between the posterior surface of the dynamic contact lens and the cornea to form a tear lens during or after the dynamic portion has transitioned between configurations such as from a conforming configuration to a non-conforming configuration. The mechanical forces can arise from the selection of the design of the dynamic contact lens and the selection of the materials forming different parts of the lens. For example, design elements include the thickness, the rigidity, and/or the radius of curvature of different portions of the as-fabricated dynamic contact lens, and including the disposition of protrusions on the anterior surface of the dynamic contact lens. Examples of material properties include the modulus of the materials forming different portions of the dynamic contact lens.

The at least one first mechanism and the at least one second mechanism can be the same mechanism or can be different mechanisms including, for example, capillary forces and/or internal mechanical forces.

A dynamic contact lens provided by the present disclosure can comprises a center geometric axis.

The dynamic portion can be disposed at the center of the geometric axis, para-central to the center geometric axis, off the center of the geometric axis, or a combination of any of the foregoing. For example, the dynamic portion can be centrosymmetric and be centered at the geometric axis of the dynamic contact lens. A para-central dynamic portion can be symmetrically disposed at a radial distance about the center geometric axis of the dynamic contact lens. A dynamic portion can also be located away from the center of the geometric axis.

In the conforming configuration, the dynamic portion can be configured to substantially conform to the cornea.

In the conforming configuration, the dynamic portion can be configured to adhere to the cornea. By adhesion to the cornea is meant that in a conforming configuration the dynamic portion will assume a quasi-stable configuration in which the posterior surface of the dynamic portion is separated from the anterior surface of the cornea by a thin layer of tear fluid. The adhesion to the cornea can be temporary. The adhesion can be such as to establish a quasi-stable equilibrium. The quasi-stable equilibrium can be disrupted by application of a force.

The dynamic portion can adhere to the corneal surface by capillary forces.

A layer of liquid between two wetted surfaces can be referred to as a capillary bridge. A capillary adhesive force between the two surfaces is caused by capillary action pulling the liquid outward from the narrow gap. The capillary adhesive force pulling the two surfaces toward each other can maintain the relative position of the two surfaces in an equilibrium state. Disrupting the equilibrium such as, for example, by forcing the opposing surfaces apart can reduce the capillary adhesive forces and cause the surfaces to separate.

In a non-conforming configuration, a tear lens can be formed within the volume between the posterior surface of the dynamic portion and the surface of the cornea. The tear lens can provide an additional optical power to the eye. The tear fluid for filling the tear lens can originate from tear fluid reservoirs as disclosed herein, from the tear film between the dynamic contact lens such at the peripheral portion of the dynamic contact lens, from the periphery of the dynamic contact lens such as proximate to the conjunctiva, through fenestrations spanning the thickness of the dynamic lens, or a combination of any of the foregoing. In dynamic contact lenses comprising fenestrations extending from the anterior surface of the dynamic contact lens to the posterior surface, tear fluid can also originate from tear fluid on the anterior surface of the dynamic contact lens.

The dynamic portion of the dynamic contact lens can be configured to provide a different optical power for at least two different depths of vision. The depths of vision can include, for example, near vision, intermediate vision, and distance vision.

For example, a dynamic contact lens can be configured such that when applied to the cornea, the dynamic portion provides a corrected first vision in the conforming configuration, and provides a corrected second vision in the at least one non-conforming configuration.

For example, a dynamic contact lens can be configured such that when applied to the cornea, the dynamic portion provides an uncorrected first vision in the conforming configuration, and provides a corrected second vision in the at least one non-conforming configuration.

For example, a dynamic contact lens can be configured such that when applied to the cornea, the dynamic portion provides a corrected first vision in the conforming configuration, and provides an uncorrected second vision in the at least one non-conforming configuration.

Each of the first vision and the second vision can independently comprise a distance vision, an intermediate vision, or a near vision. For example, a dynamic contact lens can be configured such that when applied to the cornea, the dynamic portion provides an uncorrected first vision in the conforming configuration, and provides a corrected second vision in the at least one non-conforming configuration.

A mechanism for inducing a change in conformation can comprise manipulating tear fluid reservoirs.

Cavities can be formed in the posterior surface of a dynamic contact lens. The cavities can be disposed in the peripheral portion of the lens and outside the optical region so as not to interfere with vision. The cavities can be compressible or non-compressible.

When applied to an eye, the cavities can fill with tear fluid to form tear fluid reservoirs. The tear fluid reservoirs can be compressible or non-compressible. A dynamic contact lens can comprise compressible tear fluid reservoirs, non-compressible tear fluid reservoirs, or a combination thereof.

A tear fluid reservoir can be compressible by application of eyelid pressure. The eyelid pressure can be applied, for example, by changing the gaze angle of the eye, by normal blinking, by intentionally blinking, by squinting, or by a combination of any of the foregoing.

A tear fluid reservoir can be compressed by a force within a range, for example. from 0.1 gm-force to 10 gm-force, from 0.2 gm-force to 8 gm-force, from 0.5 gm-force to 6 gm-force, from 1 gm-force to 5 gm-force, or from 2 gm-force to 4 gm-force.

To be effective in inducing a change in conformation of the dynamic portion, it may only be necessary that the tear fluid reservoir is partially compressible. For example, to induce a change in conformation, an amount of tear fluid can be forced into the tear film gap between the posterior surface of the dynamic portion and the cornea. The amount of tear fluid can be sufficient to widen the gap or otherwise weaken the capillary force and release the capillary adhesion. Subsequently, as the dynamic portion transitions to a non-conforming configuration, tear fluid fills the expanding lenticular volume and at least some of the tear fluid can be drawn from the tear fluid reservoirs. Alternatively, or in addition, tear fluid can be intermittently, continuously, or semi-continuously forced into the gap between the dynamic posterior surface and the cornea by applying eyelid pressure to the tear fluid reservoir to provide one or more discrete non-conforming configurations or one or more continuous non-conforming configurations.

Tear fluid reservoirs can also be involved in a mechanism for transitioning from a non-conforming configuration to a conforming configuration. When released from a fully compressed or partially compressed state, a tear fluid reservoir can be configured to expand. The expanding lenticular volume of the tear fluid reservoir can draw tear fluid from the tear film and from the tear lens. The result of filling the tear fluid reservoirs can be to pull the posterior surface of the dynamic portion against the cornea to establish or to restore a quasi-stable state of the conforming configuration.

The one or more tear fluid reservoirs can be configured to compress when pressure is applied by an eyelid, only during a gaze change. During a gaze change, pressure applied by an eyelid to the anterior surface of the cornea and/or to a compressible tear fluid reservoir can provided by the anterior surface coming into dynamic contact with an eyelid. More force can be applied to a compressible tear fluid reservoir by normal blinking, by intentional blinking, and/or by squinting where the squinting can be held for a certain period of time and with a certain force with the eyes closed.

Thus, the at least one first mechanism, the at least one second mechanism, or both the at least one first mechanism, and the at least one second mechanism can comprise manipulating fluid within one or more tear fluid reservoirs. The tear fluid reservoirs can be fluidly coupled to the tear film or to the tear lens between the posterior portion and the cornea by a tear film between the posterior surface of the peripheral portion and the cornea.

A cavity can be configured such that during compression tear fluid is preferentially pushed beneath the dynamic portion and when released tear fluid is preferentially drawn from beneath the dynamic portion of the dynamic contact lens. This can be accomplished, for example, with appropriate selection of the shape of the cavity/tear fluid reservoir. For example, a suitable shape can comprise a cross-sectional profile that narrows toward the dynamic portion such as a wedge-shaped cavity/tear fluid reservoir.

A dynamic contact lens can comprise one or more tear fluid reservoirs.

A single tear fluid reservoir can comprise a concentric cavity disposed at a radial distance from the center geometric axis of the dynamic contact lens. A single tear fluid reservoir can comprise a cavity disposed in only a part of the peripheral portion. For example, a single tear fluid reservoir can comprise a cavity in the shape of an arc on one half of a peripheral portion of a dynamic contact lens. For example, the arc-shaped cavity can be disposed at a radial distance from the center geometric axis of the dynamic contact lens and configured to be worn such that the arc-shaped tear fluid reservoir is on the lower portion of the dynamic contact lens when worn by a user. A single tear fluid reservoir can be configured such that the reservoir can interact with an eyelid. More than one circular reservoir can be provided such that each reservoir can have, for example, a different internal diameter. A circular reservoir can also have compartments such that when pressure is applied on the reservoir the tear fluid preferentially moves toward the dynamic portion and not within the circular reservoir.

A dynamic contact lens can comprise two or more tear fluid reservoirs such as a plurality of tear fluid reservoirs. The tear fluid reservoirs can be shaped and disposed in the peripheral portion as suitable to interact with one or both eyelids and to induce transitions between conforming and non-conforming configurations. Tear fluid reservoirs can be disposed symmetrically or asymmetrically around the dynamic portion. The tear fluid reservoirs can be disposed outside the optical zone so as not to interfere with vision.

The at least one first mechanism, the at least one second mechanism, or both the at least one first mechanism and the at least one second mechanism can comprise exchanging tear fluid by compressing the dynamic portion and/or compressing the peripheral portion of the dynamic contact lens, when pressure is applied to the dynamic contact lens by an eyelid, during a gaze change. Exchanging tear fluid can comprise exchanging tear fluid between and/or among the tear film between the posterior surface of the dynamic portion and the cornea, the tear film between the peripheral posterior surface and the cornea, the tear lens, one or more tear fluid reservoirs, tear fluid at the periphery of the lens, tear fluid on the anterior surface of the lens, or a combination of any of the foregoing.

The at least one first feature, the at least one second feature, or both the at least one first feature and the at least one second feature can comprise protrusions on an anterior surface of the dynamic contact lens configured to interact with an eyelid.

The dynamic portion and the one or more tear fluid reservoirs can be contiguous. In this design, eyelid motion on the peripheral portion of a tear lens can cause the dynamic center portion to move toward the cornea such that the dynamic portion bulges anteriorly. The dynamic center portion can assume a conforming configuration or a non-conforming configuration when bulging anteriorly. The dynamic center portion can assume a at least two different non-conforming configurations when bulging anteriorly.

Similar features as described for use with tear fluid reservoirs can be used without tear fluid reservoirs. A dynamic contact lens may not have cavities and tear fluid reservoirs and similar action by the eyelids and/or gaze angle of the eye can cause transitions between conformations and the tear lens can exchange tear fluid, for example, with the tear film.

The protrusions can be disposed on the anterior surface of the peripheral portion of the dynamic contact lens outside the optical region so as to not interfere with vision.

The protrusions can be configured to provide a frictional force when dynamic contacted with an eyelid. The frictional force can cause the dynamic contact lens to move on the eye or, for example, can impart a compressive force to the dynamic portion sufficient to reduce the adhesive capillary forces in the conforming state to release and thereby induce a transition from a conforming configuration to a non-conforming configuration. The protrusions can be disposed symmetrically or asymmetrically around the dynamic portion. A protrusion can comprise one or more concentric ridges located at various radial distance from the center of the dynamic contact lens. The protrusions can be discrete features located symmetrically about the dynamic center portion, for example, at angles of 120°, 90°, 60°, 45°, or 30°. The protrusions can be disposed outside the optical region of the dynamic contact lens so as to not interfere with vision.

Protrusions are thickened areas in the anterior surface of a lens and are designed to create mechanical forces when there is dynamic contact between the protrusions and the eyelids. A dynamic contact lens can include one or more protrusions. The one or more protrusions can be disposed at a certain distance from the dynamic portion such as, for example, within a range from 0.5 mm to 5.5 mm, from 1 mm to 5 mm, from 1.5 mm to 4.5 mm, or from 2 mm to 4 mm from the dynamic portion. A protrusion can have dimensions, for example, within a range from 0.5 mm to 3 mm, from 1 mm to 3 mm, or from 1 mm to 2 mm. The one or more protrusions can independently have a height from the anterior surface of the dynamic contact lens, for example, from 10 µm to 500 µm, from 50 µm to 450 µm, from 100 µm to 400 µm, or from 150 µm to 350 µm. The one or more protrusions can independently have any suitable cross-sectional profile such as oval-shaped, kidney-shaped, dome-shaped, or oblong-shaped, and the sides can have different slopes.

In embodiments in which a protrusion overlies a cavity, the protrusion can be designed to be compressible. By compressible in this context is meant that in a configuration in which the cavity is in a compressed state, the protrusion also moves toward the cornea such that the height of the protrusion above the anterior surface of the dynamic lens is less than that in the compressed state. For example, the protrusion may substantially conform to the curvature of the anterior surface to provide a substantially smooth profile.

In embodiments in which a protrusion overlies a cavity, cross-sectional thickness at the overlap can be less than the thickness of an adjacent peripheral portion, the same as the thickness of an adjacent peripheral portion, or greater than the thickness of an adjacent peripheral portion.

The one or more protrusions can include surface features that increase friction such as grooves, depressions, and ridges. A groove, depression, or ridge can have dimensions less than the dimensions of a protrusion. For example, a height or depth of a groove, depression, or ridge can be less than 100 µm, less than 75 µm, less than 50 µm, or less than 25 µm. The dimensions of one or more features for increasing friction between an eyelid and the dynamic lens can be selected to facilitate user comfort.

The location and height of the one or more protrusions can be selected such that motion of the eyelids against the protrusions can induce a change in conformation of the dynamic portion of the dynamic contact lens. The mechanism by which the protrusions can induce a change in conformation can be through changes in capillary forces and/or changes in the internal forces of the dynamic contact lens. The protrusions can be situated such that during down gaze the force of the eyelid against the one or more protrusions causes the dynamic portion to change conformation.

The one or more protrusions can overly a cavity such as a tear fluid reservoir. The one or more protrusions may not overly or can partially overly a cavity such as a tear fluid reservoir.

Figure 23A:
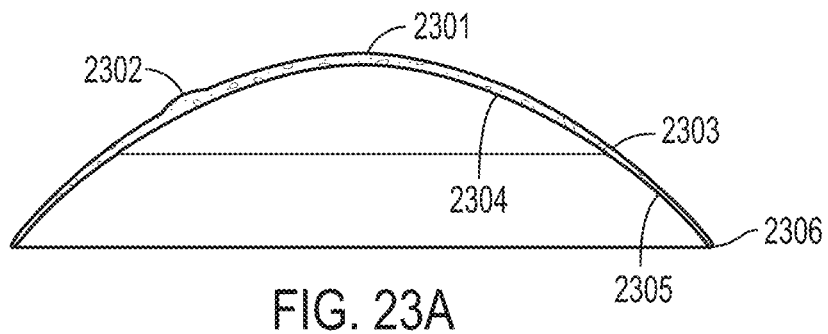
FIGS. 23A-23C show views of a dynamic contact lens having ridges on the anterior surface disposed symmetrically around the dynamic center portion.
Figure 23B:
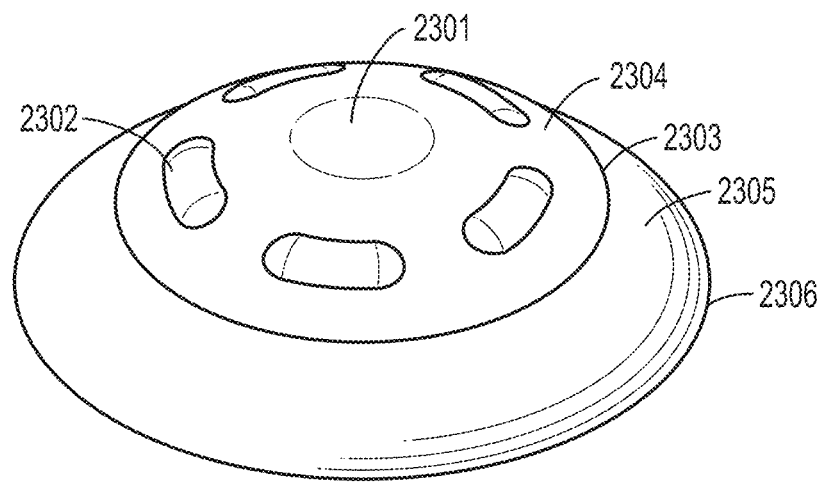
Figure 23C:
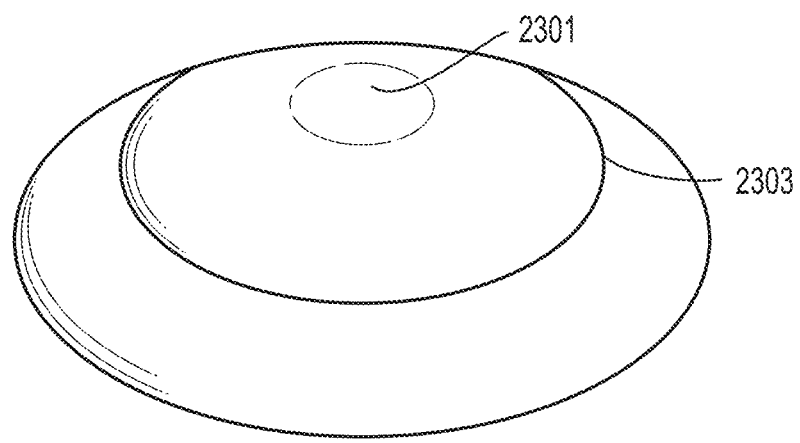

FIGS. 23A-23C show views of a dynamic contact lens having protrusions on the anterior surface. FIG. 23A shows a cross-sectional view of the dynamic contact lens with center dynamic portion 2301 and protrusion 2302. The peripheral portion (2304 and 2305) of the dynamic contact lens is coupled to dynamic portion 2301 and is characterized by two different curvatures. The peripheral portion includes a portion having a first curvature 2304 between the dynamic portion 2301 and the curvature interface 2303, and a portion having a second curvature 2305 between interface 2303 and the edge 2306 of the dynamic contact lens. FIG. 23B shows a view of the anterior surface of the dynamic contact lens including dynamic portion 2301, and five (5) oblong-shaped protrusions 2302 symmetrically disposed at an angle of 72° about the center dynamic portion 2301, and the curvature interface 2303. FIG. 23C shows is a view of the posterior surface of the dynamic lens including dynamic center portion 2301 and curvature interface 2303. The dynamic lens shown in FIGS. 23A-23C does not include cavities in the posterior surface of the dynamic lens.

Figure 24A:
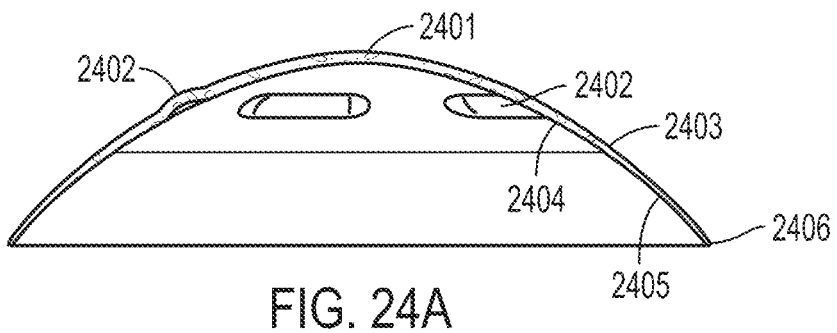
FIGS. 24A-24C show views of a dynamic contact lens having ridges on the anterior surface and overlying reservoirs in the posterior surface disposed symmetrically around the dynamic center portion.
Figure 24B:
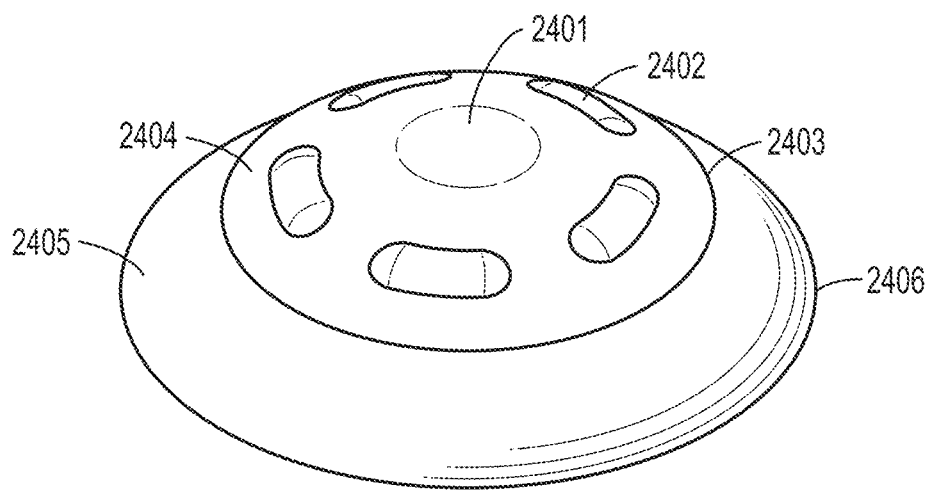
Figure 24C:
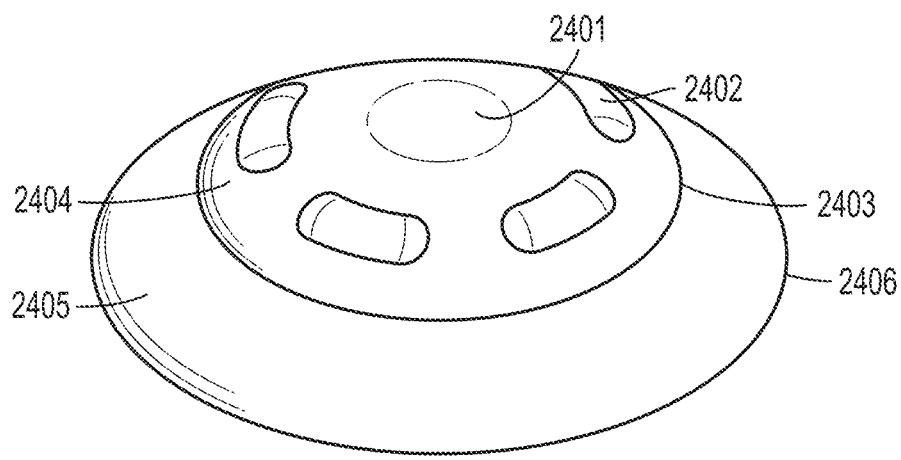

FIGS. 24A-24C show views of a dynamic contact lens having protrusions on the anterior surface aligned with respective cavities in the posterior surface. FIG. 24A shows a side view of the dynamic contact lens with center dynamic portion 2401 and protrusions 2402 on the anterior surface. The peripheral portion (2404 and 2405) of the dynamic contact lens is coupled to dynamic portion 2401 is characterized by two different curvatures. The peripheral portion includes portion having a first curvature 2404 between the dynamic portion 2401 and the curvature interface 2403, and a portion having a second curvature 2405 between curvature interface 2403 and the edge 2406 of the dynamic contact lens. FIG. 24B shows a view of the anterior surface of the dynamic contact lens including dynamic portion 2401, and five (5) oblong-shaped protrusions 2402 symmetrically disposed at an angle of 72° about the center dynamic portion 2401, and the curvature interface 2403. FIG. 24C shows is a view of the posterior surface of the dynamic lens including dynamic center portion 2401, a peripheral portion having a first curvature 2404, a peripheral portion having a second curvature 2405, and curvature interface 2403. The dynamic lens shown in FIGS. 24A-24C includes cavities 2406 in the posterior surface of the dynamic lens. The cavities 2406 on the posterior surface can be aligned with and underlie respective protrusions 2402 on the anterior surface of the dynamic lens.

It should also appreciated that such cavities can be compressible or deformable even if there is not overlying protrusion following for example lid pressure. Such compressibility can be achieved by thinning the lens thickness over the cavity or by increasing the dimension of the cavity, changing its geometry, changing the general geometry of the lens or by changing the rigidity in the cavity area such as by using a material having a lower modulus and/or decreasing the thickness of the peripheral portion in the vicinity of the cavity.

The dynamic tear lens can be fluidly coupled to at least one fenestration to facilitate tear fluid movement from and to the space between the lens and the eye. The number of fenestration can be, for example, from 1 to 50, such as from 1 to 20, or from 3 to 10, and can have an internal diameter, for example, from 50 µm to 600 µm, such as from 100 µm to 300 µm.

Dynamic contact lenses provided by the present disclosure can comprise an optical region, which refers to the region of the dynamic contact lens used for vision.

The dynamic portion overlaps with at least a portion of the optical region. The dimensions of the dynamic portion can be less than the dimensions of the optical region, substantially the same as the optical region, or can be less than the dimensions of the optical region.

Dynamic contact lenses provided by the present disclosure can comprise a peripheral portion coupled to the dynamic portion, wherein the peripheral portion is configured to retain the dynamic contact lens on the cornea. The dynamic portion and the peripheral portion can be coupled at a transition zone. The transition zone can be configured such as dimensioned to facilitate transitions between the conforming and/or non-conforming configurations, control transitions between the conforming and/or non-conforming configurations, stabilize the conforming and/or non-conforming configurations, destabilize the conforming and/or non-conforming configurations, or a combination of any of the foregoing.

For example, the cross-sectional thickness at the transition zone between the peripheral and dynamic portions can be thinner or thicker than the thickness of the adjacent peripheral and/or dynamic portions of the dynamic contact lens. For example, in a cross-sectional profile of a dynamic contact lens, the thickness can gradually increase from the peripheral edge of the lens in the peripheral region toward the transition zone with the dynamic portion. The thickness of the dynamic portion can be substantially uniform and can be the same as the transition zone thickness, thinner than the transition zone thickness, or thicker than the transition zone thickness. The thickness of the dynamic portion can increase from the transition zone thickness to the center of the dynamic portion. The thickness of the dynamic portion can decrease from the transition zone thickness to the center of the dynamic portion.

The transition zone can be configured to facilitate maintaining the quasi-stable conformations, to facilitate transitioning between quasi-stable conformations, and/or to control and/or facilitate exchange of fluid with the tear lens.

A dynamic contact lens can comprise a dynamic portion comprising a first material characterized by a first modulus; and a peripheral portion comprising a second material characterized by a second modulus.

The first material and the second material can comprise the same material, or the first material and the second material can comprise different materials.

The first modulus can be greater than the second modulus, the first modulus can be less than the second modulus, or the first modulus can be the same as the second modulus.

The dynamic portion and the peripheral portion can comprise a single material characterized by a single modulus. As can be appreciated, depending on the thickness of the dynamic lens at a radial distance from the center, the dynamic lens can be characterized by a rigidity that varies with radial distance from the center.

The first modulus can be within a range, for example, from 0.05 MPa to 100 MPa; and the second modulus can within a range from 0.05 MPa to 100 MPa.

The first modulus can be within a range, for example, from 0.1 MPa to 2 MPa; and the second modulus can be within a range from 0.1 MPa to 2 MPa.

For example, the first modulus and the second modulus can independently be within a range, for example, from 0.05 MPa to 10 MPa, from 0.1 MPa to 8 MPa, from 0.15 MPa to 6 MPa, from 0.2 MPa to 4 MPa, from 0.25 MPa to 3 MPa, from 0.3 MPa to 2 MPa, from 0.3 MPa to 1.5 MPa, for from 0.3 MPa to 1.0 MPa.

Each of the first material, the second material, or the single material can independently comprise a silicone, a hydrogel, a silicone hydrogel, or a combination of any of the foregoing. Any suitable material used to fabricate soft contact lenses can be used. Although the dynamic potion can be fabricated from a different material than the non-dynamic portion, a single basic material can be used to fabricate the dynamic contact lens, however, certain regions can be treated or modified to impart desired mechanical properties. For example, the peripheral portion and the dynamic portion can comprise the same basic materials, however, certain regions can have a higher cross-linking density or a lower cross-linking density design, for example, to facilitate the ability of the dynamic portion to exhibit quasi-stable configurations and/or to transition between the quasi-stable configurations in response to force applied to the dynamic contact lens by eyelids.

A dynamic contact lens can comprise a posterior surface; and at least a portion of the posterior surface can comprise a material, a surface treatment, or a combination thereof, selected to control capillary forces between at least a portion of the posterior surface and tear fluid, between the cornea and the tear fluid, between the posterior surface and the cornea, or a combination of any of the foregoing.

The material and/or surface treatment can be selected to provide a surface hydrophobicity, hydrophilicity, polarity, charge, or other attribute that can affect the capillary forces. The properties of the posterior surface can be uniform or can be non-uniform. The surface properties of the posterior surface can be continuous or discontinuous.

Examples of suitable surface treatments include coatings, plasma treatments, and impregnations.

The material itself can be selected to establish a desired surface property.

The properties of the posterior surface of the lens, including the peripheral portion and the dynamic portion, can be the same or can be different in one or more regions of the posterior surface. For example, one surface property may be desirable to control capillary adhesion of the posterior surface of the dynamic portion to the cornea, and a different surface property may be desirable, for example in the regions between the tear fluid reservoirs and the dynamic portion to facilitate exchange of tear fluid.

In a cross-sectional profile, a dynamic portion can comprise a posterior surface which comprises a gap profile between the posterior surface and the cornea. The gap profile can be characterized by a gap differential, wherein the gap differential is the difference between a center gap height and a peripheral gap height. The gap profile comprises a plurality of gap differentials which decrease with radial distance from the center of the dynamic portion toward the perimeter transition zone with the peripheral portion. A maximum gap differential can be defined as the difference between a center gap height and a gap height at perimeter of the dynamic portion.

The conforming configuration can be characterized by a first maximum gap differential; the non-conforming configuration can be characterized by a second maximum gap differential; wherein the second maximum gap differential is greater than the first maximum gap differential.

Dynamic contact lenses provided by the present disclosure can comprise an as-fabricated shape. The as-fabricated shape comprises a dynamic portion that bulges away from the peripheral base curvature of the peripheral portion from the posterior surface toward the anterior surface.

Dynamic contact lenses may not have an as-fabricated dynamic portion that bulges anteriorly. A dynamic portion can have, for example, an anterior surface that is substantially continuous with the anterior surface of the peripheral portion. A tear lens in this configuration can be provided by having the thickness of at least a portion of the dynamic portion be less than the thickness of the transition zone with the peripheral portion. Such configurations can be useful for providing a lens with negative optical power.

In one of the at least one non-conforming configurations a dynamic contact lens can comprise the as-fabricated shape.

A dynamic contact lens can comprise a peripheral portion comprising a peripheral posterior surface, wherein the peripheral posterior surface comprises a peripheral base curvature, and the dynamic portion comprises a dynamic posterior surface, wherein the dynamic posterior surface comprises a dynamic base curvature.

In the conforming configuration the dynamic base curvature can be substantially the same as the peripheral base curvature.

In a non-conforming configuration, the dynamic base curvature can deviate from the peripheral base curvature. For example, the curvature of the dynamic portion can be greater than the peripheral base curvature.

A cornea can be characterized by a corneal curvature. The dynamic portion of a dynamic contact lens can comprise a dynamic posterior surface, wherein the dynamic posterior surface can be characterized by a dynamic base curvature. In the conforming configuration, the dynamic base curvature can be substantially the same as the corneal curvature. In a non-conforming configuration, the dynamic base curvature can deviate from the corneal curvature.

A dynamic contact lens can comprise a peripheral portion comprising a peripheral posterior surface, wherein the peripheral posterior surface comprises a peripheral base curvature, and the dynamic portion can be characterized by a center SAG height with respect to the peripheral base curvature.

The dynamic portion can be characterized by a first center SAG height with respect to the peripheral base curvature and assume a second configuration characterized by a second center SAG height with respect to the peripheral base curvature, wherein the first center SAG height and the second center SAG height are different. The first center SAG height can be greater than the second center SAG height or can be less than the second center SAG height.

The dynamic portion can be configured to assume a first configuration characterized by a first center gap height with respect to the peripheral base curvature and assume a second configuration characterized by a second center gap height with respect to the peripheral base curvature, wherein the first center gap height and the second center gap height are different. The first center gap height can be greater than the second center gap height or can be less than the second center gap height.

A dynamic contact lens provided by the present disclosure can comprise a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

A dynamic contact lens can comprise a dynamic portion comprising a dynamic posterior surface, wherein the dynamic posterior surface can be characterized by a dynamic base curvature; and a peripheral portion coupled to the dynamic portion, wherein the peripheral portion comprises a peripheral posterior surface; and the peripheral posterior surface can be characterized by a peripheral base curvature.

In a first configuration the dynamic base curvature can be substantially the same as the peripheral base curvature; and in a second configuration the dynamic base curvature can deviate from the peripheral base curvature. In the second configuration the dynamic base curvature can be less than the peripheral base curvature.

A dynamic contact lens can comprise a dynamic portion comprising a dynamic posterior surface, wherein the dynamic posterior surface comprises a dynamic base curvature.

In a first configuration the dynamic base curvature can be substantially the same as a corneal curvature; and in a second configuration the dynamic base curvature can deviate from the corneal curvature. In the second configuration the dynamic base curvature can be less than the corneal curvature.

A dynamic contact lens can comprise a peripheral portion comprising a peripheral posterior surface, wherein the peripheral posterior surface can be characterized by a peripheral base curvature; and a dynamic portion coupled to the peripheral portion, wherein the dynamic portion comprises a center thickness, and a center SAG height, a gap height when applied to the cornea, with respect to the peripheral base curvature, or the para-peripheral base curvature adjacent the dynamic portion.

The dynamic portion can be configured to assume a first configuration characterized by a first center gap height with respect to the peripheral base curvature and can be configured to assume a second configuration characterized by a second center gap height with respect to the peripheral base curvature.

The first center gap height and the second center gap height can be different.

The first configuration and the second configuration can be quasi-stable.

A dynamic contact lens can comprise a dynamic portion comprising a posterior surface, wherein the posterior surface comprises a dynamic base curvature.

In a first configuration the posterior surface of the dynamic portion can characterized by a first base curvature; and in a second configuration the posterior surface of the dynamic portion can be characterized by a second base curvature.

The first configuration can be configured to provide a first optical power to an eye having a cornea; and the second configuration can be configured to provide a second optical power to the eye.

The first base curvature can be substantially the same as a corneal curvature.

The dynamic contact lens can further comprise at least one first feature, such as a protrusion, configured to induce a change between the first configuration and the second configuration; and at least one second mechanism configured to induce a change between the second configuration and the first configuration.

In dynamic contact lenses provided by the present disclosure the dynamic portion can be in the shape of a dome and can have a circular cross section.

Dynamic contact lenses provided by the present disclosure can comprise a dynamic portion, wherein the as-fabricated dynamic portion comprises a SAG height and a center thickness, wherein the center thickness is less than the SAG height; and a peripheral portion coupled to the dynamic portion, wherein the peripheral portion is configured to retain the dynamic contact lens on the cornea. With reference to FIG. 1A the SAG height is the distance between the extension of the curvature of the peripheral portion across the dynamic portion and the posterior surface of the dynamic portion at the center axis of the dynamic portion.

The dynamic portion can be characterized by a SAG height, a center thickness, a radial thickness, a posterior surface profile, an anterior surface profile, a diameter, and for spherical profiles, posterior and anterior radii of curvatures.

The as-fabricated SAG height of the dynamic portion (110 in FIG. 1A) can be within a range, for example, from 5 µm to 300 µm, from 10 µm to 250 µm, from 15 µm to 200 µm, from 20 µm to 150 µm, from 30 µm to 125 µm, or from 40 µm to 100 µm.

In a non-conforming configuration, the gap height (110 in FIG. 1A) can be within a range, for example, from 5 µm to 300 µm, from 10 µm to 250 µm, from 15 µm to 200 µm, from 20 µm to 150 µm, from 30 µm to 125 µm, or from 40 µm to 100 µm.

The center thickness (112 in FIG. 1A) of a dynamic contact lens can be within a range, for example, from 10 µm to 600 µm, from 20 µm to 600 µm, from 30 µm to 600 µm, from 40 µm to 500 µm from 50 µm to 400 µm, from 100 µm to 300 µm, from 150 µm to 200 µm, from 50 µm to 100 µm, from 100 µm to 150 µm, from 150 µm to 200 µm, from 200 µm to 250 µm, or from 250 µm to 300 µm.

The dynamic portion (115 in FIG. 1A) can be characterized by a diameter within a range, for example, from 1 mm 7 mm, from 1.5 mm to 6 mm, from 1.5 mm to 5 mm, from 2 mm to 5 mm, from 2 mm to 4 mm, or from 2.5 mm to 3.5 mm.

The transition zone (108 in FIG. 1A) can have a thickness within a range, for example, from 10 µm to 600 µm, from 20 µm to 600 µm, from 30 µm to 600 µm, from 40 µm to 500 µm from 50 µm to 400 µm, from 100 µm to 300 µm, from 150 µm to 200 µm, from 50 µm to 100 µm, from 100 µm to 150 µm, from 150 µm to 200 µm, from 200 µm to 250 µm, or from 250 µm to 300 µm.

The dynamic portion can have a spherical profile and the radius of curvature of the posterior surface and/or the anterior surface can be, for example, within a range from 5 mm to 10 mm, from 4 mm to 9 mm, from 3 mm to 8 mm, from 5 mm to 6 mm, from 6 mm to 7 mm, from 7 mm to 8 mm, from 8 mm to 9 mm, from 9 mm to 10 mm, or from 10 mm to 11 mm.

The dynamic portion of a dynamic contact lens can comprise a posterior surface and an anterior surface.

As fabricated, the shape of the dynamic portion including the posterior and anterior surfaces can comprise an outward bulge or dome in which the dynamic portion extends from the posterior to anterior direction and away from the profile of the peripheral base curvature.

In dynamic contact lenses provided by the present disclosure the dynamic portion can be configured to assume two or more configurations in which each of the two or more configurations do not conform to the surface of the cornea. Thus, a dynamic contact lens can comprise a dynamic portion, wherein the dynamic portion comprises at least one first non-conforming configuration configured to provide a first optical power to an eye having a cornea; and at least one second non-conforming configuration configured to provide a second optical power to the eye, wherein the second optical power is different than the first optical power; at least one first physical feature configured to induce a change between the first non-conforming configuration and the at least one second non-conforming configuration; and at least one second physical feature configured to induce a change between the at least one second non-conforming configuration and the at least one first non-conforming configuration.

A volume of a tear lens can be, for example, within a range from 0.001 µL to 0.01 µL, from 0.001 µL to 0.1 µL, from 0.01 µL to 10 µL, from 0.02 µL to 8 µL, from 0.05 µL to 7 µL, from 0.1 µL to 6 µL, from 0.1 µL to 5 µL, from 0.5 µL to 4 µL, or within a range from 1 µL to 3 µL.

The peripheral portion can have a diameter, for example, within a range from 8 mm to 17 mm, from 8.5 mm to 16.5 mm, from 9 mm to 16 mm, or from 9.5 mm to 15.5 mm.

The peripheral portion can be characterized by base curvature, i.e., the curvature of the anterior surface within a range, for example, from 7 mm to 10 mm, from 7.2 mm to 9.8 mm, from 7.4 mm to 9.6 mm, from 7.6 mm to 9.4 mm, from 7.8 mm to 9.2 mm, or from 8 mm to 9 mm.

In certain dynamic contact lenses provided by the present disclosure, the dynamic portion can be configured to facilitate dynamically changing between configuration when applied to the eye. For example, the dynamic portion can change configuration during dynamic contact with an eyelid induced, for example, by a change in gaze angle, by normal blinking, by intentional blinking, by holding the eyelids closed, or by squeezing the eyelids against the eye.

The posterior and anterior surfaces of the dynamic portion can independently have a spherical profile or a non-spherical profile. For example, the thickness of the dynamic portion can be substantially constant throughout the profile, can be thinner toward the center than toward the transition zone, or can be thicker toward the center than toward the transition zone.

Dynamic contact lenses can have a dynamic portion comprising a posterior surface characterized by a first radius of curvature; and a peripheral portion characterized by at least one second radius of curvature; wherein the first radius of curvature is less than the second radius of curvature. In other words, the dynamic portion extends anteriorly from the peripheral base curvature.

The dynamic portion of a dynamic contact lens comprises a thickness. The thickness of the dynamic portion can comprise a center thickness, which refers to the thickness of the dynamic portion at the physical center of the dynamic portion, and a plurality of radial thicknesses that span the segment of the dynamic portion from the center to the transition zone of the dynamic portion with the peripheral portion.

The thickness of the dynamic portion can be substantially uniform across the profile. In certain lenses, the thickness can vary or be non-uniform across the profile. For example, the center thickness can be greater than each of the plurality of radial thicknesses. The thickness of the dynamic portion can be radially symmetric about the center axis of the dynamic portion.

The thickness of the dynamic portion may not be uniform across the profile. The thickness can be greater toward the center or less toward the center compared to the periphery. The thickness of the dynamic portion can also vary across the profile.

The dynamic portion and the optical portion can be aligned with the optical axis of the dynamic contact lens. The optical axis of the dynamic contact lens refers to the center axis of the lens. In some embodiments, the dynamic portion is not aligned with the optical axis of the lens.

The optical region can be characterized by a diameter within a range, for example, from 1 mm to 8 mm, from 2 mm to 7 mm, or from 3 mm to 6 mm.

The dynamic portion and the peripheral portion of a dynamic contact lens provided by the present disclosure can comprise a silicone, a hydrogel, or a silicone hydrogel.

The dynamic portion and the peripheral portion of a dynamic contact lens can comprise the same material. The dynamic portion and the peripheral portion can comprise different materials characterized, for example, by different physical and/or mechanical properties. The dynamic portion and the peripheral portion can be characterized by materials having a different modulus, and the portions can exhibit different rigidities.

The dynamic portion and the peripheral portion can also be characterized by a rigidity. The cross-sectional rigidity is proportional to the material modulus time the cube of the cross-sectional thickness. As can be appreciated, when the peripheral portion comprises a single material, the cross-sectional rigidity increases as the thickness increases from the edge of the peripheral portion toward the transition zone with the dynamic portion.

Dynamic contact lenses provided by the present disclosure can comprise a deformable dynamic portion and a peripheral portion coupled to the deformable dynamic portion. The dynamic portion can be configured to deform to accommodate a depth of vision. The peripheral portion can be configured to retain the dynamic contact lens on a cornea.

When applied to the eye, lenticular volumes between the posterior surface of the dynamic portion and the anterior surface of the cornea can fill with tear fluid to form a tear lens. In a dynamic contact lens, the dynamic portion is configured to change shape depending on the distance of vision. The change in configuration of the dynamic portion provides a dynamic tear lens. The configuration of the dynamic portion can change continuously or can assume discrete configurations. It should be appreciated that a dynamic contact lens having a dynamic portion can be fabricated having a dome extending outward (posterior to anterior direction) from the curvature of the peripheral portion. It should also appreciated that when the fabricated lens with a dome extending outward is worn by the user, the dome can extend outward less than as-fabricated. In other words, when applied to the cornea, the dynamic contact lens can stretch outwardly.

The first and second configurations correspond to different optical powers imparted by the tear lens. The first configuration can be appropriate for distance vision and the second configuration can be appropriate for near vision. The first configuration can be appropriate for near vision and the second configuration can be appropriate for distance vision.

An objective of the dynamic portion is to facilitate changing the optical power of the dynamic portion in response to the viewing distance of an eye. For example, in a first configuration suitable for distance vision the dynamic portion will be disposed proximate the anterior corneal surface, and for near vision the dynamic portion will extend away from the cornea to form a tear lens.

In certain dynamic contact lenses, the optical power of the dynamic portion does not change when the configuration of the dynamic portion changes. In other words, the change in optical power of the dynamic portion is predominately or solely due to a change in the optical power of the tear lens. For example, the thickness of the dynamic portion and the relative cross-sectional profiles of the posterior and anterior surfaces of the dynamic portion do not change as the dynamic portion assumes different configurations. The shape of the peripheral portion may not change appreciably when the configuration of the dynamic portion changes. The peripheral portion can be configured to retain the dynamic contact lens on the cornea, keeping the dynamic contact lens centered on the optical region of the cornea and minimizing translation of the dynamic contact lens on the cornea. For example, translation of the lens on the cornea can be less than ±1.5 mm, less than ±1.0 mm, or less than ±0.5 mm.

In the different configurations, the center thickness of the dynamic portion and the radial thicknesses of the dynamic portion may not appreciably change. For example, the dynamic portion can comprise a plurality of radial thicknesses, and the plurality of radial thicknesses in a first configuration is substantially the same as the corresponding radial thicknesses in a second configuration.

The uniform profile of the dynamic portion with changing configurations can also be considered in terms of the curvature. In certain dynamic contact lenses, the dynamic portion will not have an optical power and the posterior and anterior surfaces of the dynamic portion will have spherical profiles characterized by the same radius of curvature. The radius of curvature can be defined by the diameter of the dynamic portion, the thickness of the peripheral portion at the transition zone with the dynamic portion, and the gap height.

In certain dynamic contact lenses, the dynamic portion can comprise a posterior surface comprising a first radius of curvature, the dynamic portion can comprise an anterior surface comprising a second radius of curvature, and a ratio of the first radius of curvature to the second radius of curvature in the first configuration is the same as the ratio in the at least one second configuration.

In certain dynamic contact lenses, the dynamic portion can be characterized by a plurality of radial thicknesses, wherein each of the plurality of radial thicknesses is substantially the same throughout the range of gap heights accessible to the dynamic portion.

The configuration of the dynamic portion can be configured to change upon application of a force applied to the dynamic contact lens by eyelids. The force can be applied to the peripheral portion, a region of the peripheral portion and/or to the dynamic portion.

The eyelid force can be applied by changing a gaze angle such as gazing forward for distance vision or by gazing downward such as for near vision. The eyelid force can be applied by normal blinking, or by intentional blinking. Intentional blinking can involve, hold the eyelids closed for a period of time, squeezing the eyelids closed for a period of time, and/or repeating either of the foregoing multiple times.

The eyelid forces can be used to transition the dynamic portion from one configuration to another and/or to accelerate the transition from one configuration to another.

As the dynamic portion changes configuration caused by force applied by the eyelids, the optical power of the tear lens can change.

As fabricated, the dynamic portion of a dynamic contact lens extends anteriorly to form a dome with respect to the extended profile of the peripheral portion of the dynamic contact lens.

In a configuration in which the dynamic portion is proximate to the anterior surface of the cornea, the dynamic portion can be held in this quasi-stable configuration by a combination of adhesive and cohesive capillary forces. As the thickness of the layer of tear film decreases the adhesive forces between the posterior surface of the dynamic portion and the anterior surface of the cornea will become greater than the cohesive forces of the tear fluid, thereby causing the dynamic portion to assume a quasi-stable configuration in which the dynamic portion substantially conforms to the surface of the cornea.

The transition of the dynamic portion between or among the two or more configurations induced by eyelid forces can be facilitated using various methods and features.

In certain methods the capillary forces holding the dynamic portion against the cornea can be broken by increasing the separation between the two surfaces. This can be accomplished, for example, by pushing tear fluid between the surfaces thereby reducing the adhesive force and causing the posterior surface of the dynamic portion to release. Depending on the construction, upon release the dynamic portion can assume a fully extended dome-shaped configuration and tear fluid can be pulled from the transition zone between the posterior surface of the peripheral portion and the cornea to fill the tear lens with tear fluid. Alternatively, or in conjunction with, repeated blinking can be used to facilitate the movement of tear fluid into and/or from the tear lens. The blinking can comprise intentional blinking whereby a user can achieve a desired vision correction without the dynamic portion being fully extended.

In certain methods frictional forces imparted by an eyelid to the peripheral portion can be used to change the configuration of the dynamic portion and hence the optical power of the tear lens. In such methods an eyelid can grab the peripheral portion and physically squeeze the dynamic contact lens toward the center to impart a force sufficient to overcome the capillary forces holding the dynamic portion against the cornea and thereby cause the posterior surface dynamic portion to release and provide a tear lens. Examples of physical lens features that could be used to facilitate the ability of an eyelid to impart a mechanical force include protrusions such as ridges on the anterior surface of the peripheral portion of the dynamic contact lens, thickening in the peripheral portion, features to increase friction between the edge of the peripheral portion and the conjunctiva, and use of multiple curvatures in the peripheral portion.

The dynamic portion in an extended configuration can be brought against the corneal surface by intentional blinking.

Figure 2A:
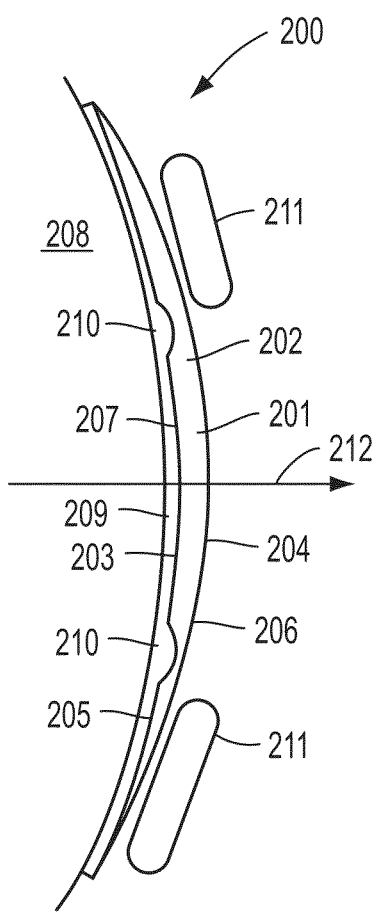
FIG. 2A shows a cross-sectional view of a dynamic contact lens provided by the present disclosure having a dynamic portion and with tear fluid reservoirs, in which the dynamic portion is proximate to the anterior surface of the cornea as can be appropriate for uncorrected distance vision.
Figure 2B:
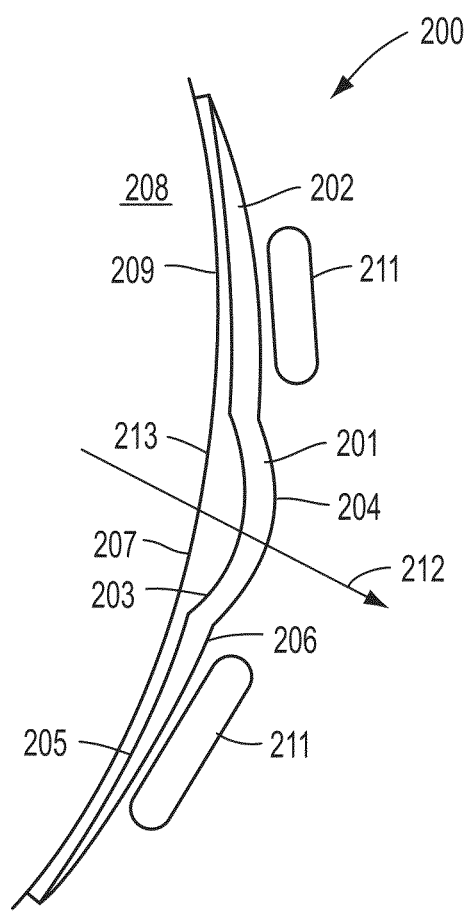
FIG. 2B shows a cross-sectional view of a dynamic contact lens provided by the present disclosure having a dynamic portion and with tear fluid reservoirs, in which the dynamic portion bulges away from the cornea to provide a space for a tear lens as can be appropriate for corrected near vision.

Cross-sections of a dynamic tear lens are shown in FIGS. 2A and 2B. FIG. 2A shows a dynamic tear lens in a configuration suitable for uncorrected distance vision. FIG. 2B shows a dynamic tear lens in a configuration suitable for corrected near vision.

FIGS. 2A and 2B include dynamic contact lens 200, having a dynamic portion 201 and a peripheral portion 202. The dynamic portion 201 including inner posterior surface 203 and inner anterior surface 204, and the peripheral portion 202 including peripheral posterior surface 205 and peripheral anterior surface 206. The dynamic contact lens 200 lies against the anterior surface 207 of cornea 208. A tear film 209 lies between the posterior surfaces 203/205 of the dynamic contact lens 200 and the anterior surface 207 of cornea 208. Tear fluid fills tear fluid reservoirs 210. Eyelids 211 are toward the periphery of the dynamic contact lens and do not compress the tear fluid reservoirs (see FIG. 2A). The direction of view is aligned with the optical axis 212 as consistent with uncorrected distance vision.

In FIG. 2A as suitable for uncorrected distance vision the dynamic portion 201 conforms to and/or is proximate to the anterior surface of the cornea. Tear fluid reservoirs 210 disposed in the peripheral posterior surface 205 are filled with tear fluid. Eyelids 211 are away from tear fluid reservoirs 210.

In FIG. 2B as suitable for corrected near vision, as the eye moves downward 212 to focus on a near object (downward gaze), the eyelids 211 move over the tear fluid reservoirs (219 in FIG. 2A), compressing the reservoirs to force tear fluid toward the dynamic portion. Simultaneously, the adhesion of the inner posterior surface 203 against the anterior corneal surface 209, is reduced causing dynamic portion 201 to bulge outward and away from the cornea 208. A tear lens 213 is formed between the inner posterior surface 203 and the anterior surface 209 of the cornea 208, which serves to correct near vision. Other elements shown in FIG. 2B are identified as in FIG. 2A.

Figure 2C:
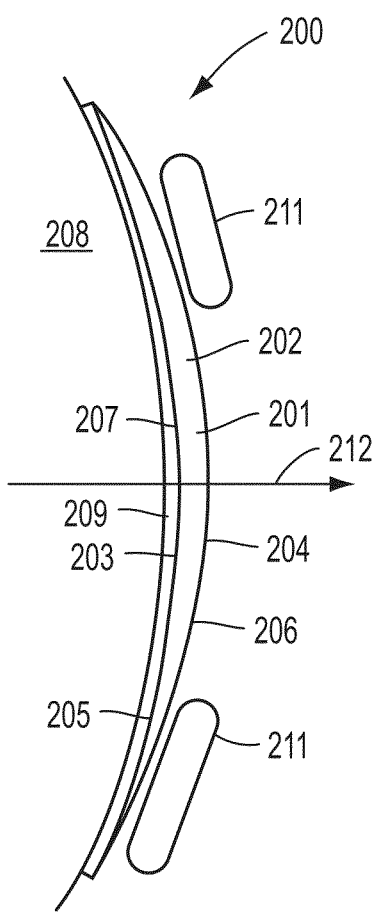
FIG. 2C shows a cross-sectional view of a dynamic contact lens provided by the present disclosure having a dynamic portion and without tear fluid reservoirs, in which the dynamic portion is proximate to the anterior surface of the cornea as can be appropriate for uncorrected distance vision.
Figure 2D:
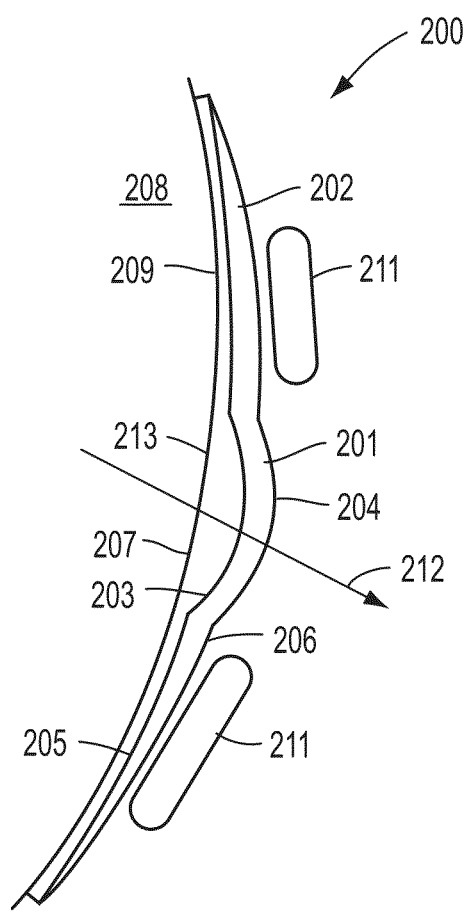
FIG. 2D shows a cross-sectional view of a dynamic contact lens provided by the present disclosure having a dynamic portion and without tear fluid reservoirs, in which the dynamic portion bulges away from the cornea to provide a space for a tear lens as can be appropriate for corrected near vision.

FIGS. 2C and 2D show dynamic contact lens configurations similar to those shown in FIGS. 2A and 2B, respectively, where the dynamic contact lens does not comprise tear fluid reservoirs. The elements in FIG. 2C and FIG. 2D are as defined in FIG. 2A.

FIGS. 3A-3D show optical coherence tomography (OCT) images of cross-sections of examples of dynamic contact lenses provided by the present disclosure on a cornea. FIGS. 3A-3D show dynamic contact lenses 300, outwardly bulging dynamic portion 301 and peripheral portion 302. The dynamic contact lenses are disposed on cornea 306. FIG. 3A shows a dynamic contact lens without a gap and without a bulge when an inner dynamic portion is lying proximate the corneal surface. FIGS. 3B-3D show dynamic contact lenses having a gap height of 43 μm, 84 μm, and 105 μm, respectively. The bulge of the inner dynamic portion shown in FIGS. 3B-3D creates a tear lens 304 for correcting vision.

In addition to or as an alternative to the above methods, changing the configuration of the dynamic portion can be facilitated by manipulating the flow of tear fluid to and from tear fluid reservoirs.

A dynamic contact lens provided by the present disclosure can comprise a plurality of cavities disposed on the posterior surface of the peripheral portion. In can be desirable that the cavities are outside the optical region of the lens so as not to interfere with vision.

A dynamic contact lens can be fabricated such that the posterior surface of the peripheral portion comprises one or more cavities.

The one or more cavities can be configured to provide one or more tear fluid reservoirs when the dynamic contact lens is applied to the cornea.

The one or more cavities can be configured to provide one or more compressible tear fluid reservoirs when the dynamic contact lens is applied to the cornea. The thickness of the peripheral portion between the cavity and the anterior surface of the peripheral portion can be sufficiently thin such that a force applied by an eyelid can compress the cavity. The eyelid force can be imparted by blinking, intentional blinking, or by the motion of an eyelid moving over the cavity.

The cavities can be disposed and configured in any suitable manner to facilitate the transition of the dynamic portion between two or more configurations.

For example, the one or more cavities can be disposed symmetrically about the dynamic portion. The one or more cavities can be disposed asymmetrically about the dynamic portion.

The one or more cavities can comprise one or more concentric rings, one or more grooves, one or more wedge-shaped cavities, and/or one or more rounded cavities.

The cavities can be continuous around the dynamic portion or can comprise a plurality of separate cavities. The cavities can be elongated such as oblong or wedge-shaped where the long axis points toward the center of the lens. The separate cavities can be fluidly coupled with channels to facilitate filling and flow of tear fluid between the cavities and/or between the cavities and the dynamic portion.

For example, a separate cavity can have a width within a range from 0.1 mm to 5 mm, a length within a range from 0.1 mm to 5 mm, and a depth within a range from 10 μm to 200 μm.

The cavities can be continuous, semi-continuous or separated. A continuous cavity refers to a single cavity disposed around the dynamic portion. An example of a continuous cavity is a concentric ring or a plurality of concentric rings. The concentric rings can have any suitable cross-sectional shape. For example, the cross-sectional shape can be rounded, oval, square, rectangular, triangular, and/or angled. Multiple concentric rings can be fluidly coupled by one or more fluid channels.

An example of separated fluid cavities is multiple cavities disposed about the dynamic portion of the dynamic contact lens. The multiple cavities can be disposed symmetrically about the dynamic portion such as separated by 45°, or can be disposed at intervals around the dynamic portion. For example, groups of cavities can be disposed about the dynamic portion, for example, at 120°, 90°, 60°, 45°, or 30° intervals or any other suitable interval. The separated cavities can have any suitable dimension and cross-sectional shape. For example, the separated cavities can have a hemispherical or triangular cross-sectional shape. The cavities can be oval, oblong, cylindrical, circular or any other suitable cross-sectional shape. The cavities can be symmetrical or can be characterized by a length different than the width.

The one or more cavities can be disposed at a certain distance from the dynamic portion such as, for example, within a range from 0.5 mm to 5.5 mm, from 1 mm to 5 mm, from 1.5 mm to 4.5 mm, or from 2 mm to 4 mm from the dynamic portion. A cavity can have dimensions, for example, within a range from 0.5 mm to 3 mm, from 1 mm to 3 mm, or from 1 mm to 2 mm. The one or more cavities can independently have a height from the anterior surface of the dynamic contact lens, for example, from 10 µm to 500 µm, from 50 µm to 450 µm, from 100 µm to 400 µm, or from 150 µm to 350 µm. The one or more cavities can independently have any suitable cross-sectional profile such as oval-shaped, kidney-shaped, dome-shaped, or oblong-shaped, and the sides can have different slopes.

Semi-continuous cavities refer to separated cavities that are fluidly coupled by channels formed in the posterior surface of a dynamic contact lens. The channels can allow tear fluid to flow between adjacent tear fluid reservoirs.

When disposed on a cornea, the cavities can fill with tear fluid to form tear fluid reservoirs.

When compressed by motion of an eyelid or dynamic contact by an eyelid with a change in gaze angle, tear fluid can be pushed toward the dynamic portion of the dynamic contact lens to break the capillary forces holding the dynamic portion against the cornea and/or to cause the SAG height to increase. The tear fluid reservoirs can provide a source of tear fluid for filling the tear lens, thereby facilitating a faster response in changing from one configuration to another.

When eyelid pressure is removed, the reservoirs can expand and act to pull tear fluid from the tear lens to fill the reservoirs with tear fluid, effectively pulling the dynamic portion toward the cornea. The cavities and resulting tear fluid reservoirs can serve to push and pull tear fluid to and from the tear lens. The cavities can serve to modify the internal mechanical properties of a dynamic contact lens to facilitate the transition of the dynamic portion between quasi-stable configurations.

Figure 4B:
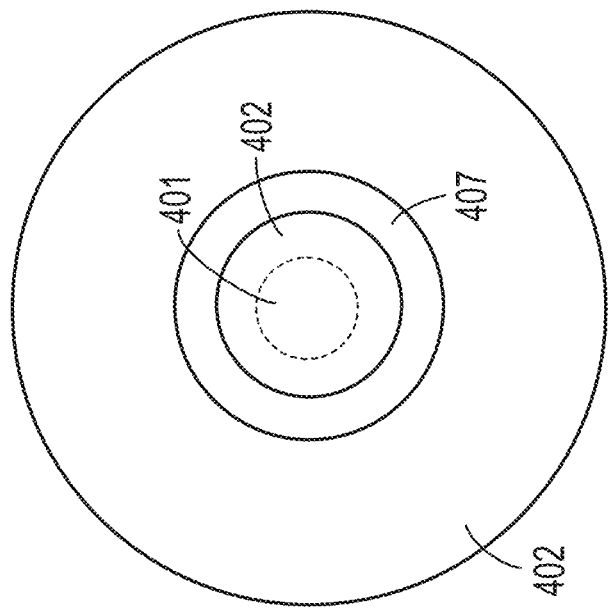
FIGS. 4A and 4B show cross-sectional views of a dynamic contact lens provided by the present disclosure having wedge-shaped tear fluid reservoirs.
Figure 4A:
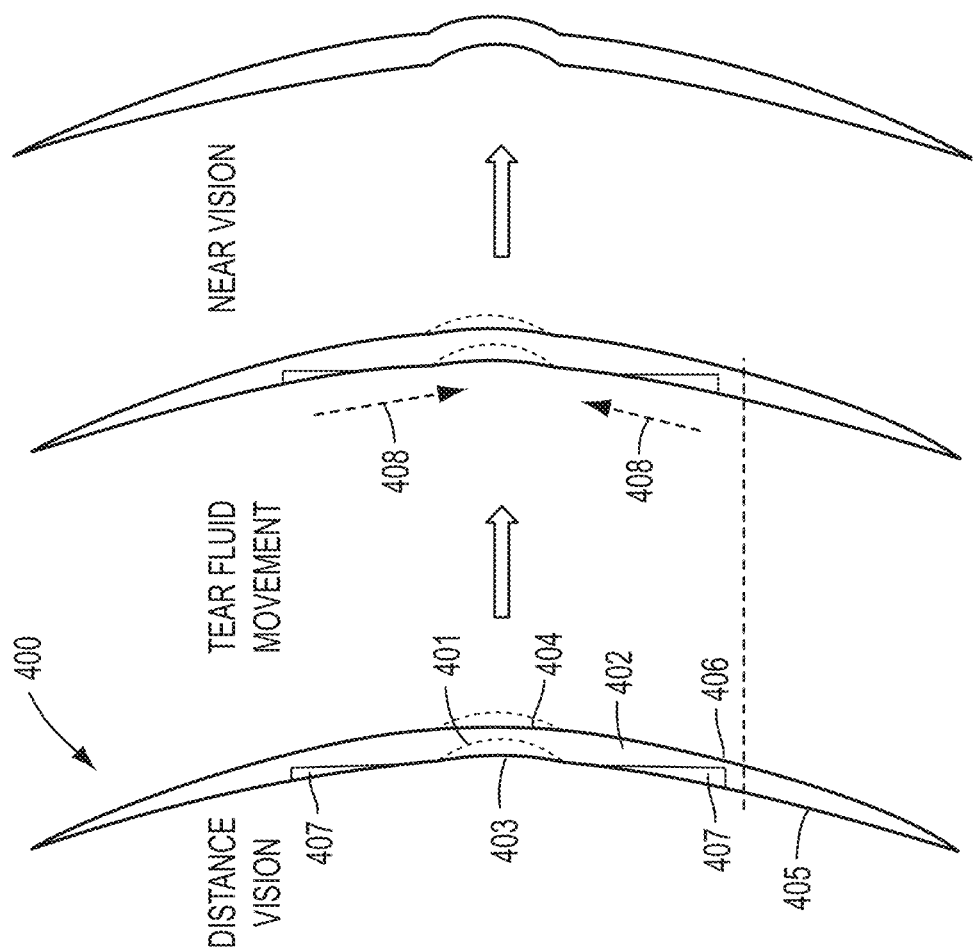

FIGS. 4A-4D show a dynamic contact lens provided by the present disclosure in which the tear fluid reservoirs comprise grooves. The dynamic contact lenses 400 shown in FIGS. 4A-4D include dynamic portion 401, peripheral portion 402, inner posterior surface 403, inner anterior surface 404, peripheral posterior surface 405, and peripheral anterior surface 406. Cavities in the form of grooves in the peripheral posterior surface of the lens provide tear fluid reservoirs 407. As shown in FIG. 4A for uncorrected far vision, the posterior surface of the dynamic portion has a curvature corresponding to the anterior surface of the cornea (not shown). As shown in FIG. 4B pressure applied by eyelids (not shown) on the grooved tear fluid reservoir 407 cause tear fluid to be pushed toward the dynamic portion as shown by the arrows 408. The cross-section of the tear fluid reservoir 407 is narrow toward the dynamic portion and deeper away from the dynamic portion. As shown in FIG. 4C the dynamic portion then deforms outward to form a bulge beneath which a tear lens forms. Simultaneously, the tear fluid reservoirs compress to lie against the cornea. The tear lens can correct near vision. FIG. 4D shows a bottom view of the lens including dynamic portion 401, concentric tear fluid reservoir 407, and peripheral portion 402.

Figure 5A:
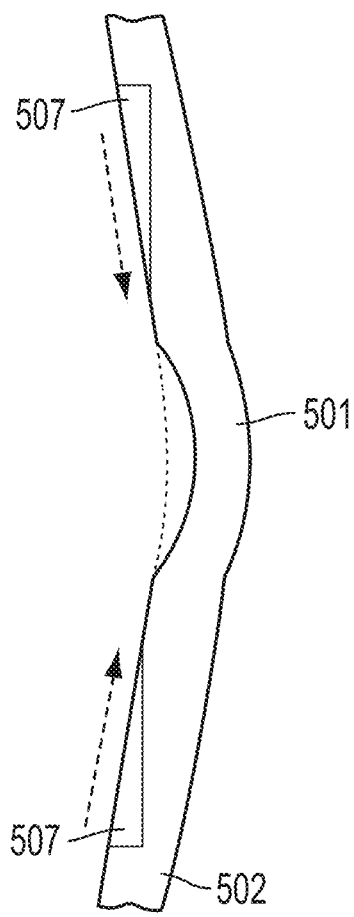
FIGS. 5A and 5B show cross-sectional and bottom views, respectively, of a dynamic contact lens having separate tear fluid cavities in the posterior surface of the peripheral portion symmetrically disposed around the center dynamic portion.
Figure 5B:
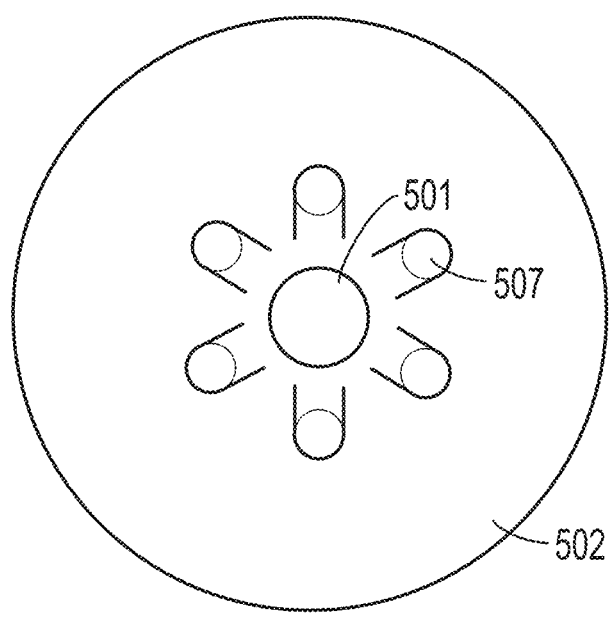

FIGS. 5A and 5B show a cross-section and bottom view, respectively, of a dynamic contact lens having separate cavities for retaining tear fluid. In the cross-section shown in FIG. 5A, wedge-shaped cavities 507 are disposed around the deformable dynamic portion 501. In the bottom view shown in FIG. 5B, the cavities 507 are symmetrically disposed in the peripheral portion 402 around the dynamic portion 501.

The cavities can be wedge shaped with the narrower portion directed toward the dynamic portion of the dynamic contact lens.

Figure 6:
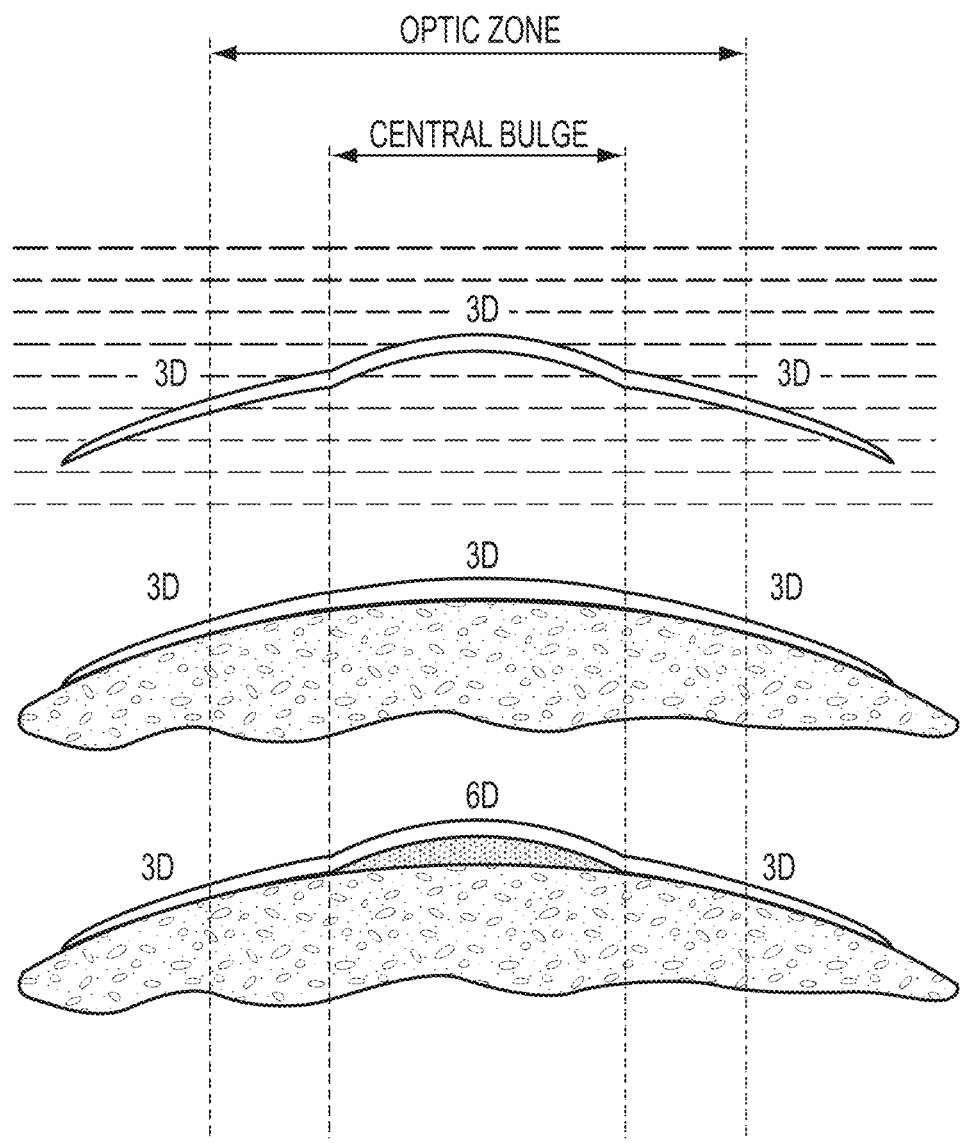
FIG. 6 shows three (3) cross-sectional views of a dynamic contact lens provided by the present disclosure.

FIG. 6 shows three (3) cross-sectional views of a dynamic contact lens provided by the present disclosure. The top view shows an as-fabricated lens immersed in water. The dynamic portion of the lens is at the center of the geometric axis of the lens and bulges outward, away from the base curvature of the peripheral portion. The middle view shows the dynamic contact lens applied to a cornea. The dynamic portion substantially conforms to the curvature of the cornea, and the base curvature of the dynamic portion is substantially the same as the base curvature of the peripheral portion. In the lower view in which the dynamic contact lens is applied to the cornea, the dynamic portion assumes a second configuration in which the dynamic portion bulges outward and away from the cornea. The base curvature of the dynamic portion is not the same as the base curvature of the peripheral portion. A tear lens is formed between the posterior surface of the dynamic portion and the anterior surface of the cornea. As a result of the tear lens, the dynamic contact lens in the lower view provides a +3 diopter (+3D) optical power compared to the conforming configuration illustrated in the middle view. The optical zone of the eye is located between the dynamic portion and the peripheral edge of the lens.

Figure 7:
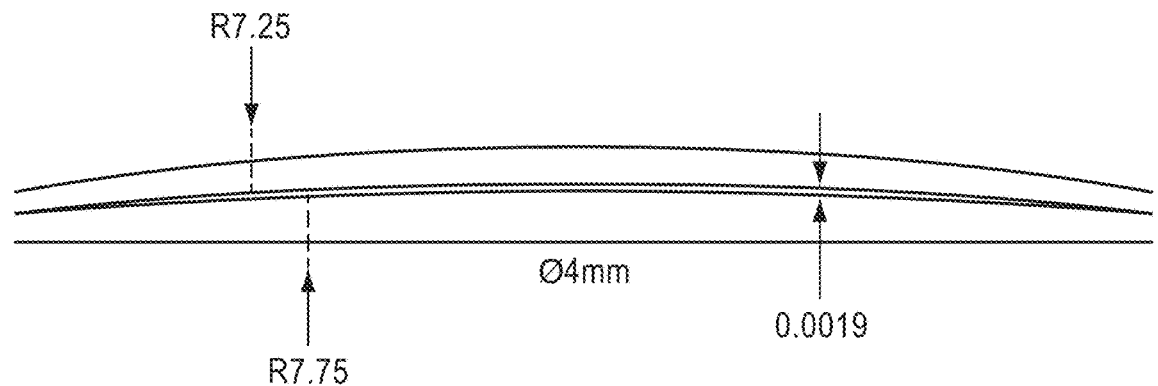
FIG. 7 shows a cross-sectional view of a dynamic contact lens used to calculate the relationship between vault height and optical power of a tear lens.

For example, based on calculations, for lenses having a certain diameter, a change from one non-conforming configuration to a second conforming configuration that provides +3 diopters to the eye requires a certain gap difference (vault height). For example, for lenses having a 2 mm-optical diameter, a change from one non-conforming configuration to a second conforming configuration that provides +3 diopters to the eye requires a 5 µm gap difference between a non-conforming configuration and a conforming configuration. Or, as in the example shown in FIG. 7, for a lens having a 4 mm-optical diameter, a gap increase of 19 µm, or, for a lens having a 5 mm optical diameter, a gap increase of 30 µm, provides an additional +3 diopters (+3D) of optical power. For these calculations the anterior corneal base curvature was R7.75 mm, and the anterior surface of the dynamic portion had a curvature of R7.25 mm when bulged anteriorly.

Figure 8:
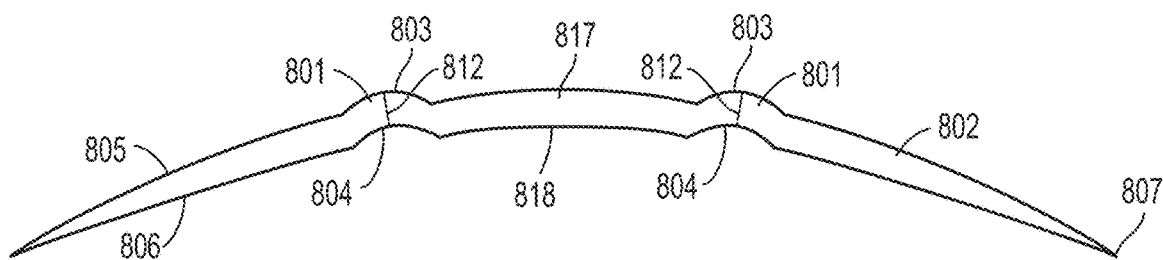
FIG. 8 shows a cross-sectional view of a dynamic contact lens with a para-peripheral tear fluid reservoir.

FIG. 8 shows a cross-sectional view of a dynamic contact lens having a para-peripheral tear fluid reservoir. The dynamic contact lens includes dynamic portion 801 with anterior surface 803 and posterior surface 804, peripheral portion 802 with anterior surface 805 and posterior surface 806, peripheral edge 807, center portion 817, and center posterior surface 818, and center thickness 812 of dynamic portion 801. The curvature of posterior surface 818 is the same as or similar to the base curvature of the posterior surface of peripheral portion 806.

Figure 9A:
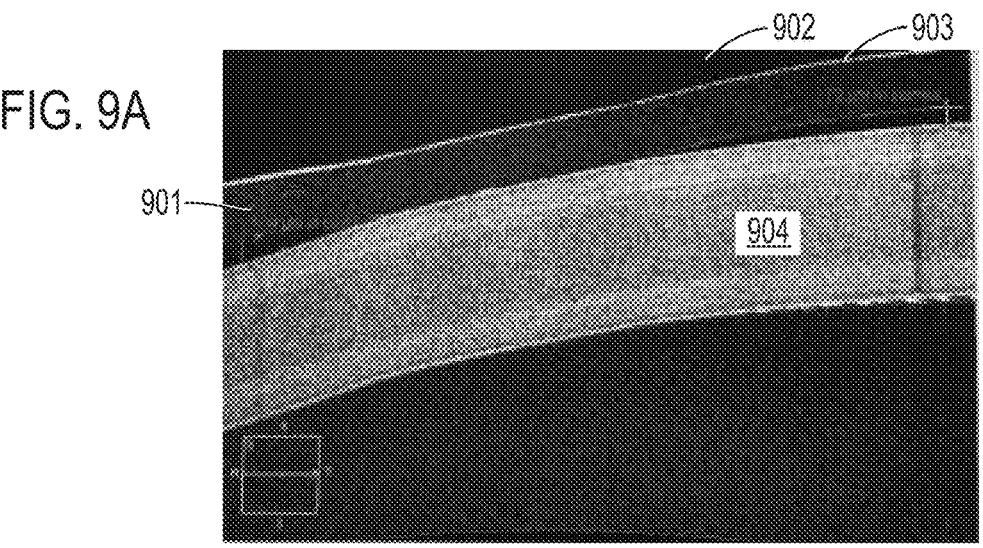
FIGS. 9A-9C show OCT images of a dynamic contact lens provided by the present disclosure applied to a cornea including the dynamic portion and a tear fluid reservoir.
Figure 9B:
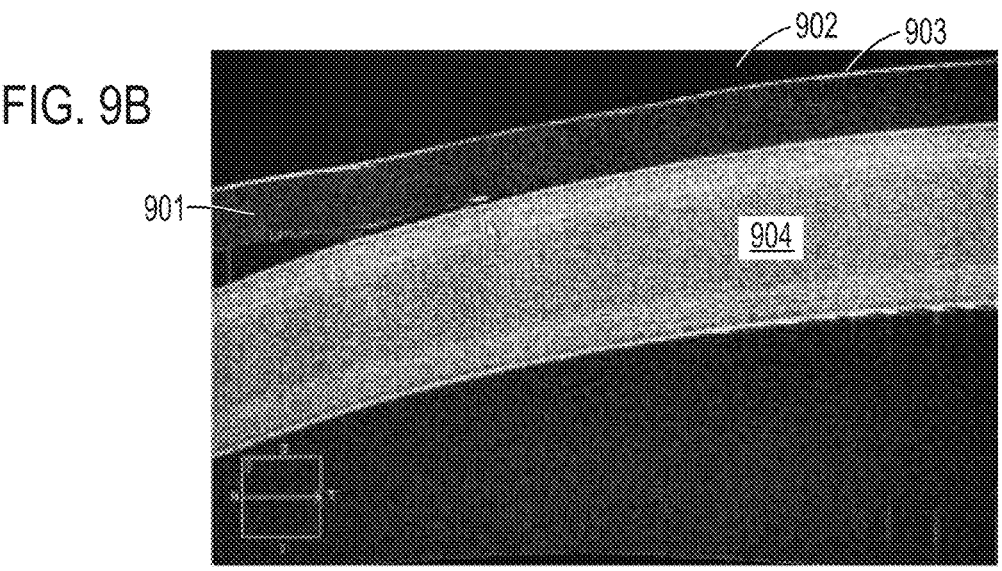
Figure 9C:
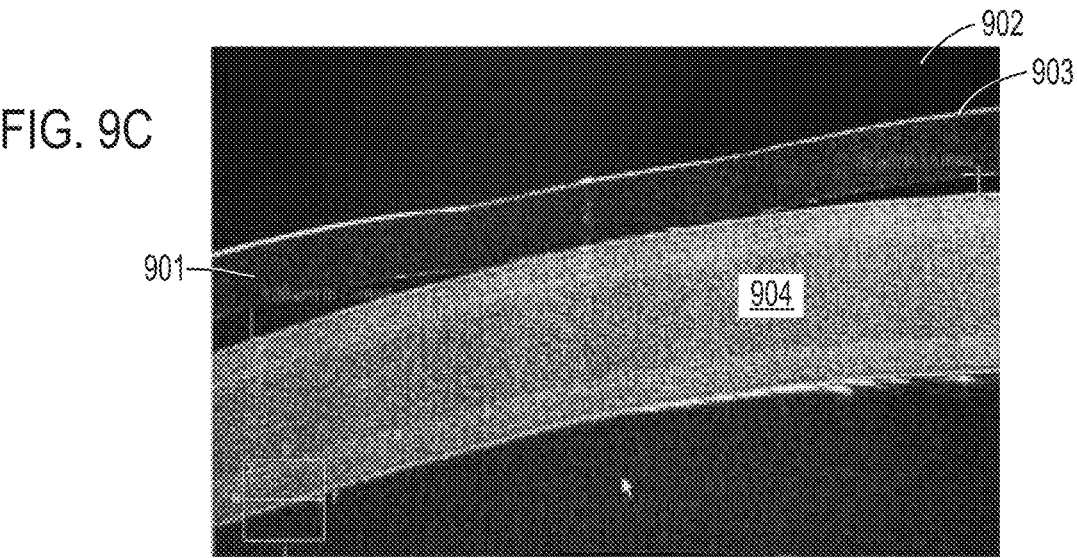

FIGS. 9A-9C show cross-sectional views of a dynamic contact lens provided by the present disclosure applied to a cornea 904. FIG. 9A shows a tear fluid reservoir 901 having a SAG height of 104 µm (left) and a tear lens 902 beneath the dynamic portion 903 of the lens having a SAG height of 72 µm (right). In FIG. 9B, the dynamic portion 903 substantially conforms to the surface of the cornea 904, and the SAG height of the tear fluid reservoir 901 increases to 144 µm. In FIG. 9C, after a pressure from 0.1 µm-force to 10 µm-force is applied to the tear fluid reservoir 901 shown in FIG. 9B, the dynamic portion 903 bulges away from the cornea 904 to reform the tear lens 902 with a SAG height of 76 µm, and the SAG height of the tear fluid reservoir 901 is reduced to 120 µm.

Figure 10:
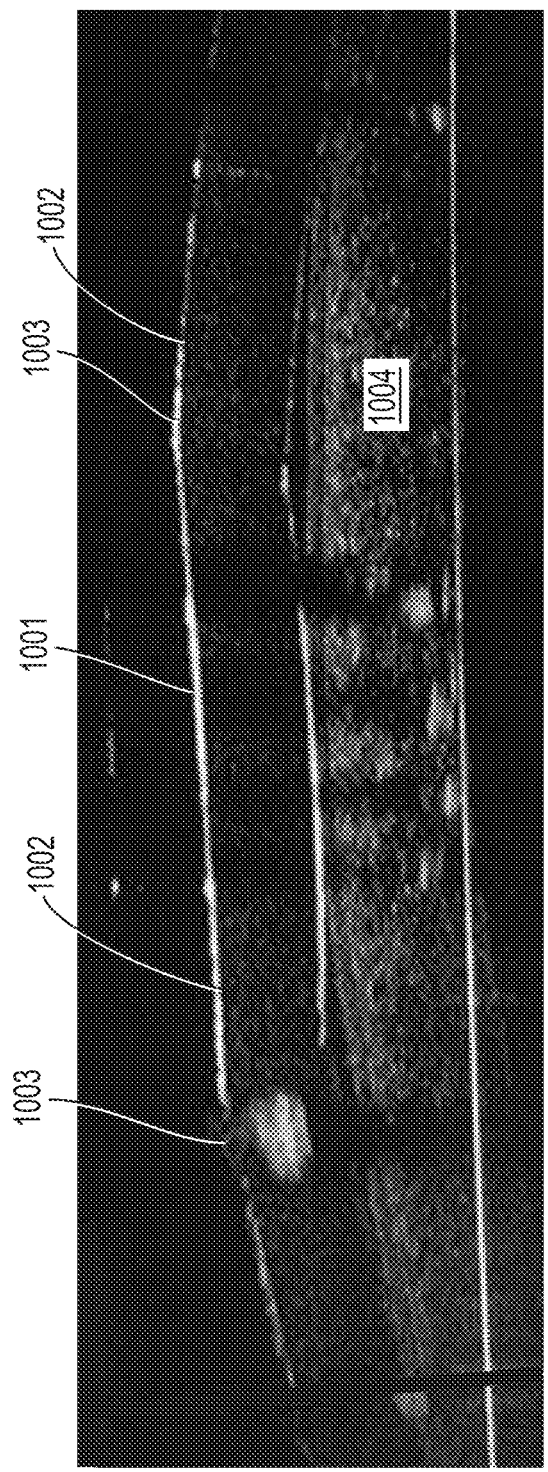
FIG. 10 shows a cross-sectional view of a dynamic contact lens provided by the present disclosure with a para-central dynamic portion.

For the dynamic contact lens shown in FIG. 10, the dynamic portion 1003 with tear lenses 1002 located paracentrally around the central geometric axis of the dynamic contact lens. The center portion of the dynamic contact lens conforms to the surface of the cornea 1004.

Symmetrically disposing the cavities and tear fluid reservoirs about the dynamic portion can render the function of the dynamic contact lens independent of orientation on the eye. Having the dynamic contact lens be rotationally symmetric can facilitate a user's ability to wear the dynamic contact lens.

This push/pull action of the compressible cavities to facilitate the transition of the dynamic portion from one configuration to another can serve as the only mechanism for changing configuration or can be augmented by intentional blinking. For example, intentionally blinking can help to stabilize the configuration in which the dynamic portion is proximate to the corneal surface, for example, by expelling tear fluid from or by thinning the tear fluid layer between the dynamic portion and the cornea.

Dynamic contact lenses provided by the present disclosure can have a dynamic portion but not include a mechanism for transitioning between configurations. A dynamic contact lens can have an as-fabricated shape in which the dynamic portion bulges anteriorly from the base curvature of the posterior surface of the peripheral portion. When applied to a cornea, the dynamic portion forms a tear lens. However, unlike a dynamic tear lens, in this embodiment, the dynamic contact lens can produce a tear lens that does not change configuration with a change in eyelid pressure on the lens. In certain embodiments, of the contact lenses the dynamic portion can be configured to resist deformation. With reference to a contact lens having a dynamic portion configured to assume conforming and at least one or more conforming configuration, or multiple non-conforming configurations a contact lens having a static tear lens will assume a single non-conforming configuration when placed on the cornea. The contact lens, dynamic portion, and peripheral portion of a lens configured to have a static tear lens can be dimensioned as for a contact lens in which the dynamic portion is configured to assume multiple configurations. Contact lenses having a static tear lens can be suitable for correcting vision of an irregular cornea, treating astigmatism, and for corneal wound healing. An example of a contact lens provided by the present disclosure configured to have a static tear lens is shown in FIG. 1B. FIG. 1B shows cross-section view of a contact lens having a dynamic portion and a peripheral portion. When applied to a cornea, a tear lens can be formed between the posterior surface of the dynamic portion 1001, and the anterior surface of the cornea (not shown).

Dynamic contact lenses provided by the present disclosure can comprise one or more fenestrations.

The one or more fenestrations can be disposed in the peripheral portion of the lens and outside the optical region so as not to interfere with vision.

The one or more fenestrations can extend through the thickness of the peripheral portion can fluidly couple the anterior surface and the posterior surface of the peripheral portion. The fenestrations can facilitate the flow of tear fluid to the tear film adjacent the epithelium, and depending on the lens configuration, can facilitate the flow of tear fluid to and from the dynamic tear lens and/or can facilitate the exchange of tear fluid along the epithelium to promote eye health.

The one or more fenestrations can be fluidly coupled to one or more cavities. The fenestrations can allow tear fluid to flow from the anterior surface of the dynamic contact lens into one or more cavities, which can facilitate the transition of the dynamic portion between different configurations.

Fenestrations can be fluidly coupled to channels in the posterior surface of the dynamic contact lens. The channels can extend from the peripheral region of the lens to the dynamic portion. Channels can also fluidly couple fluid cavities which may or may not be fluidly coupled to the dynamic region of the dynamic contact lens.

FIGS. 33A-41B show cross-sectional views of examples of dynamic contact lenses provided by the present disclosure.

Figure 33A:
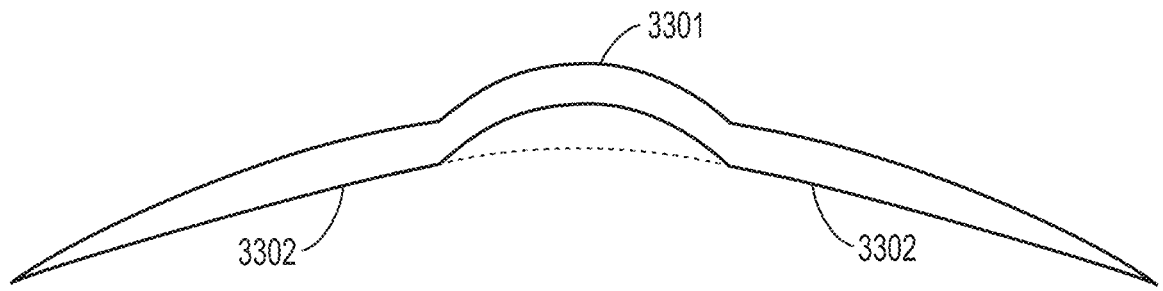
FIGS. 33A-41B show cross-sectional views of examples of dynamic contact lens provided by the present disclosure in conforming and non-conforming configurations as well as a less non-conforming configuration and a more non-conforming configuration.
Figure 33B:
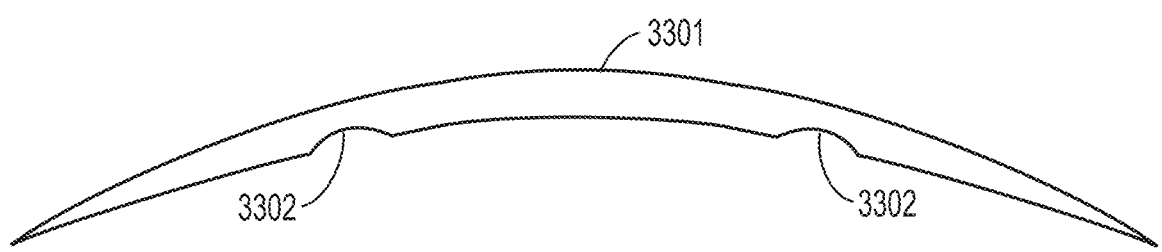

FIGS. 33A and 33B show cross-sectional views of a dynamic contact lens having a center dynamic portion 3301 and cavities 3302 in the posterior surface of the dynamic lens. The dynamic portion 3301 has a substantially uniform thickness. The profile of the dynamic lens is shown in a non-conforming configuration (FIG. 33A) and in a conforming configuration (FIG. 33B). In the non-conforming configuration, the cavities are in a compressed state, and in the conforming configuration the cavities are in a non-compressed state.

Figure 34A:
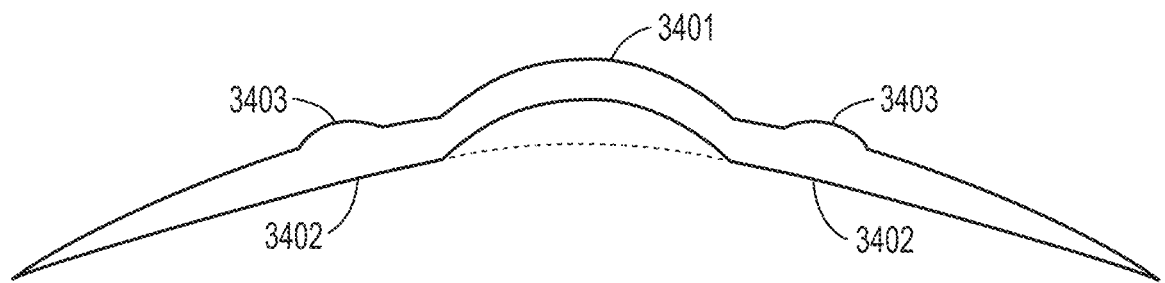
Figure 34B:
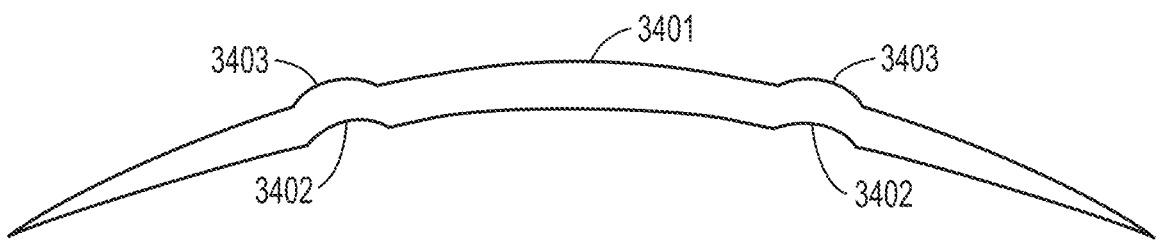

FIGS. 34A and 34B show cross-sectional views of a dynamic contact lens having a center dynamic portion 3401, cavities 3402 (in a compressed state) in the posterior surface of the dynamic lens, and protrusions 3403 on the anterior surface of the dynamic lens and overlying respective cavities 3402. The profile of the dynamic lens is shown in a non-conforming configuration (FIG. 34A) and in a conforming configuration (FIG. 34B). In the non-conforming configuration, the cavities are in a compressed state, and in the conforming configuration the cavities are in a non-compressed state. The protrusions 3403 facilitate the ability of cavities to compress with pressure applied by an eyelid.

Figure 35A:
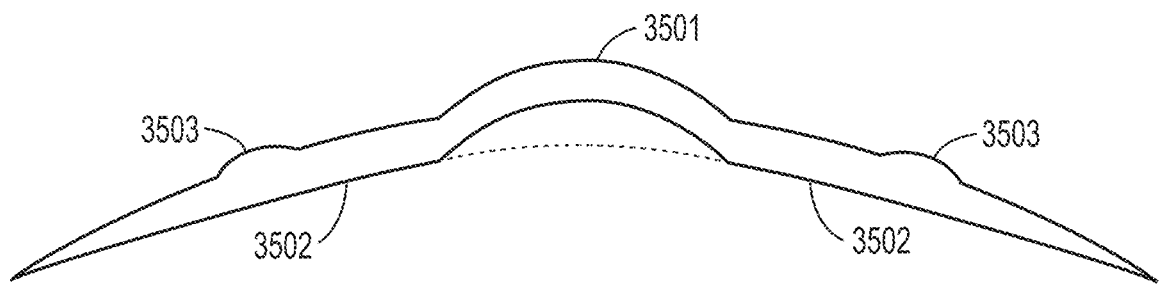
Figure 35B:
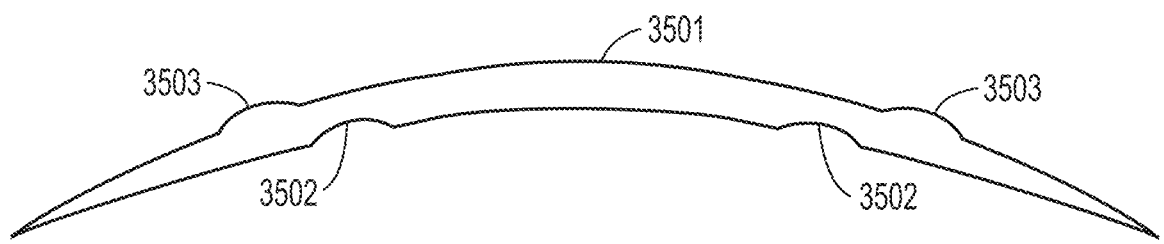

FIGS. 35A and 35B show cross-sectional views of a dynamic contact lens similar to that shown in FIGS. 34A and 34B, but with the protrusions not aligned with cavities. The dynamic lenses shown in FIGS. 35A and 35B have a center dynamic portion 3501, cavities 3502 in the posterior surface of the dynamic lens, and protrusions 3503 on the anterior surface of the peripheral portion of the dynamic lens and not overlying cavities 3502. The profile of the dynamic lens is shown in a non-conforming configuration (FIG. 35A) and in a conforming configuration (FIG. 35B). In the non-conforming configuration, the cavities are in a compressed state, and in the conforming configuration the cavities are in a non-compressed state. The protrusions 3503 facilitate the ability of cavities to compress with pressure applied by an eyelid.

Figure 36A:
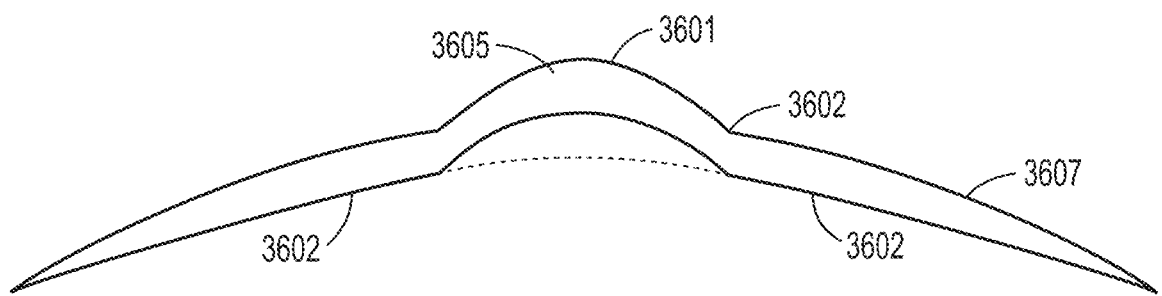
Figure 36B:
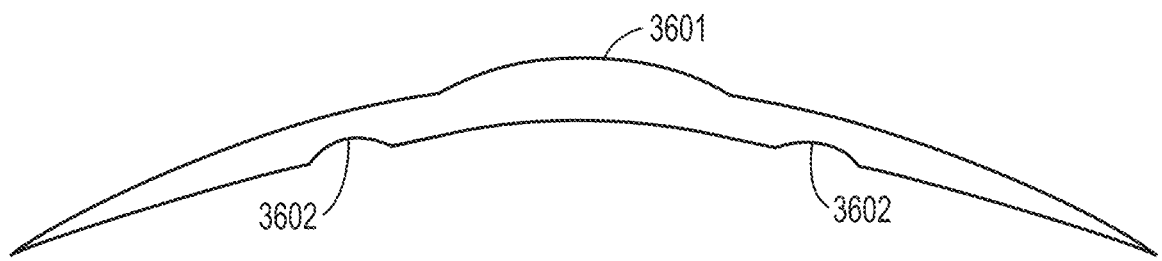

FIGS. 36A and 36B show cross-sectional views of a dynamic contact lens having a center dynamic portion 3601 and cavities 3602 in the posterior surface of the dynamic lens. The dynamic portion 3601 has a non-uniform thickness such that the center 3605 is thicker than at the perimeter transition zone 3606 with the peripheral portion 3607. The profile of the dynamic lens is shown in a non-conforming configuration (FIG. 36A) and in a conforming configuration (FIG. 36B). In the non-conforming configuration, the cavities 3602 are in a compressed state, and in the conforming configuration the cavities 3602 are in a non-compressed state.

Figure 37A:
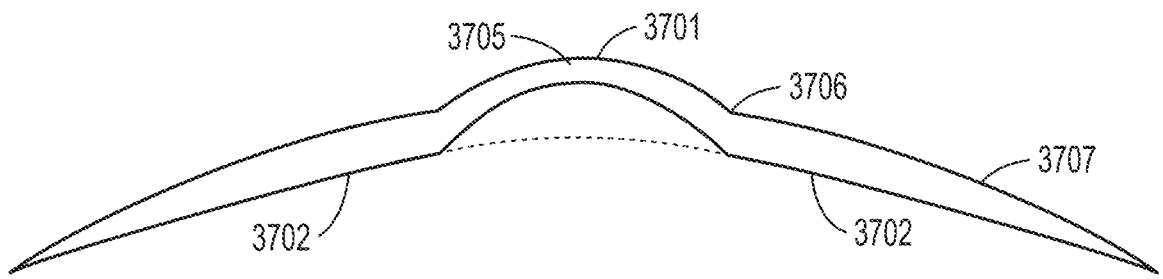
Figure 37B:
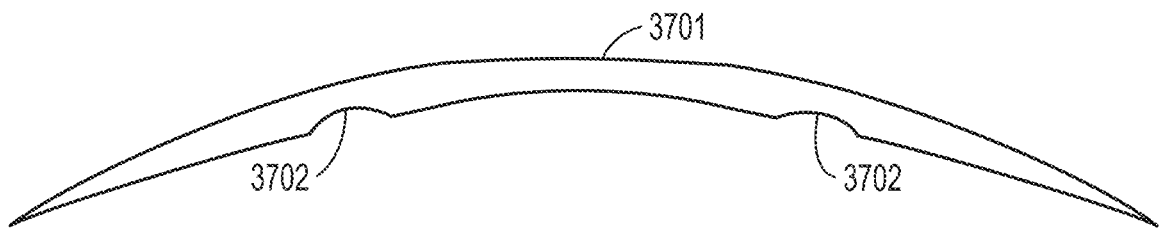

FIGS. 37A and 37B show cross-sectional views of a dynamic contact lens having a center dynamic portion 3701 and cavities 3702 in the posterior surface of the dynamic lens. The dynamic portion 3701 has a non-uniform thickness such that the center 3705 is thinner than at the perimeter transition zone 3706 with the peripheral portion 3707. The profile of the dynamic lens is shown in a non-conforming configuration (FIG. 37A) and in a conforming configuration (FIG. 37B). In the non-conforming configuration, the cavities 3702 are in a compressed state, and in the conforming configuration the cavities 3702 are in a non-compressed state.

Figure 38A:
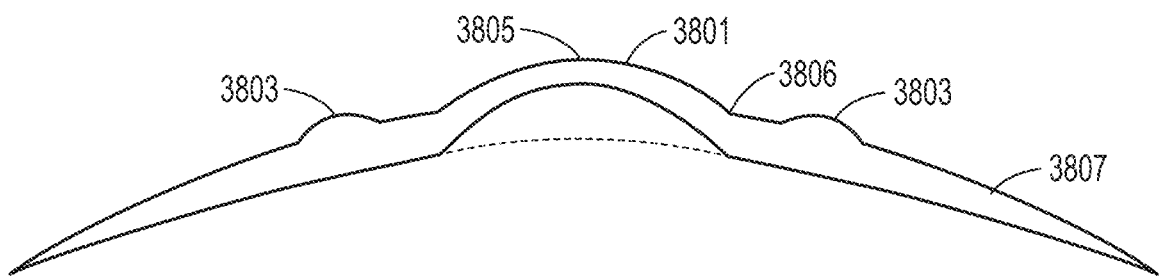
Figure 38B:
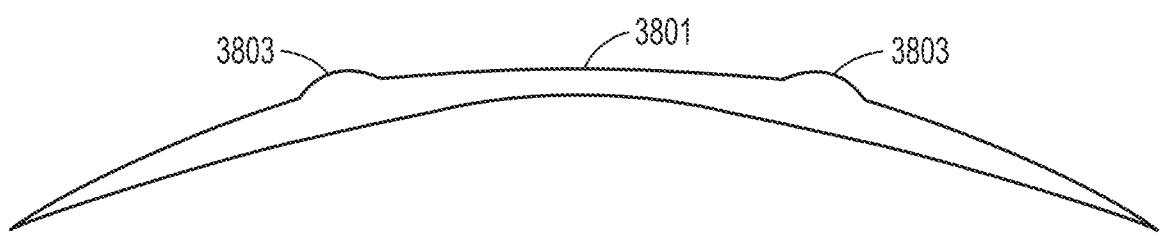

FIGS. 38A and 38B show cross-sectional views of a dynamic contact lens having a center dynamic portion 3801 and protrusions 3803 in the anterior surface of the dynamic lens. The dynamic portion 3801 has a non-uniform thickness such that the center 3805 is thinner than at the perimeter transition zone 3806 with the peripheral portion 3807. The profile of the dynamic lens is shown in a non-conforming configuration (FIG. 38A) and in a conforming configuration (FIG. 38B).

Figure 39A:
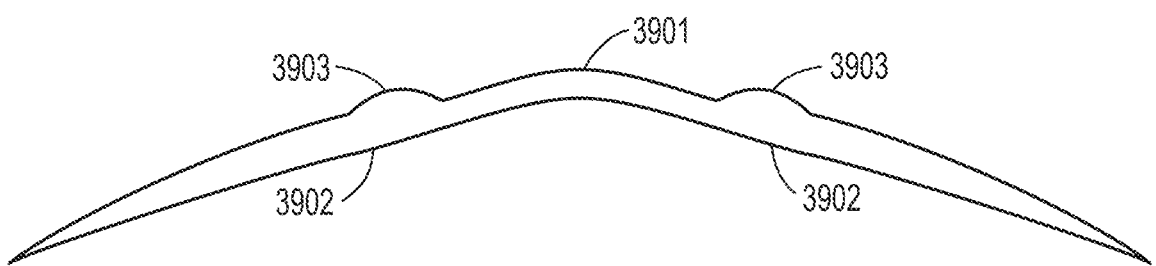
Figure 39B:
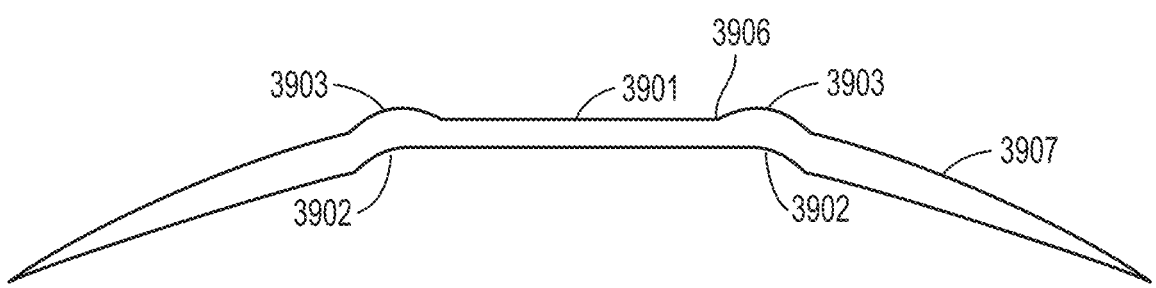

FIGS. 39A and 39B show cross-sectional views of a dynamic contact lens having a center dynamic portion 3901, cavities 3902 in the posterior surface of the dynamic lens, and protrusions 3903 overlying respective cavities 3902. The dynamic portion 3901 has a non-uniform thickness such that the center 3805 is thinner than at the perimeter transition zone 3906 with the peripheral portion 3907. The profile of the dynamic lens is shown in a non-conforming configuration (FIG. 39A) and in a conforming configuration (FIG. 39B). In the non-conforming configuration, the cavities 3902 are in a non-compressed state, and in the conforming configuration the cavities 3902 are in a compressed state. In the conforming configuration the protrusions 3903 are compressible to provide a substantially smooth anterior surface.

Figure 40A:
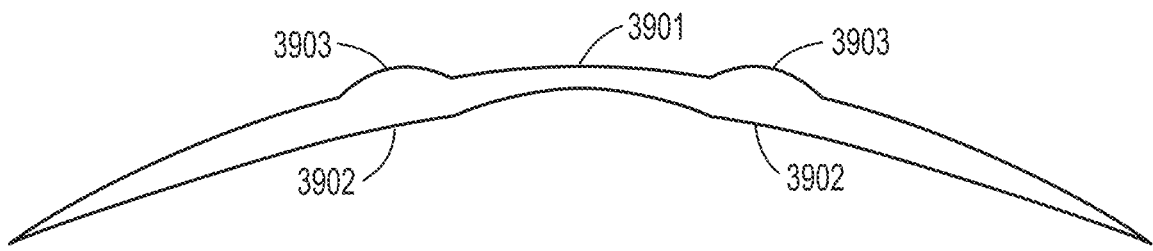
Figure 40B:
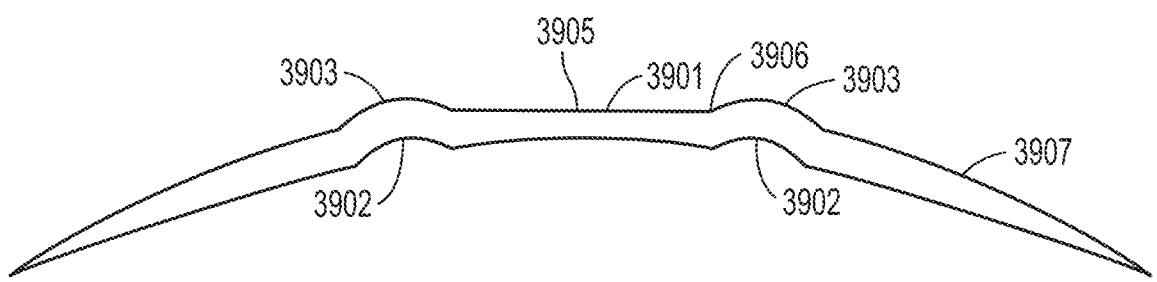

FIGS. 40A and 40B show cross-sectional views of a dynamic contact lens having a center dynamic portion 4001, cavities 4002 in the posterior surface of the dynamic lens, and protrusions 4003 overlying respective cavities 4002. The dynamic portion 4001 has a non-uniform thickness such that the center 4005 is thinner than at the perimeter transition zone 4006 with the peripheral portion 4007. The profile of the dynamic lens is shown in a non-conforming configuration (FIG. 40A) and in a conforming configuration (FIG. 40B). In the non-conforming configuration, the cavities 4002 are in a non-compressed state, and in the conforming configuration the cavities 4002 are in a compressed state. The protrusions 4003 are not compressible or are partially compressible such that they protrude from the anterior surface.

Figure 41A:
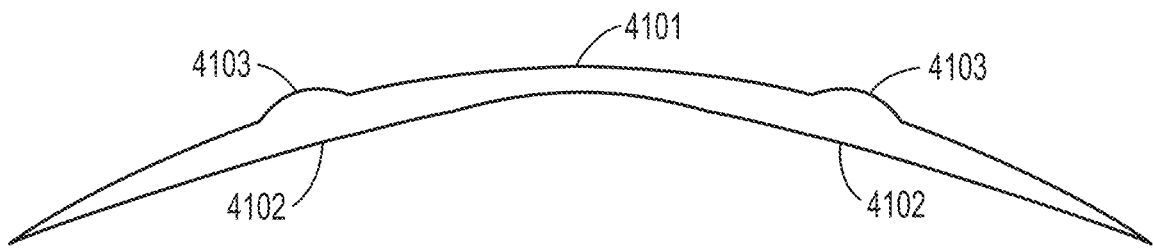
Figure 41B:
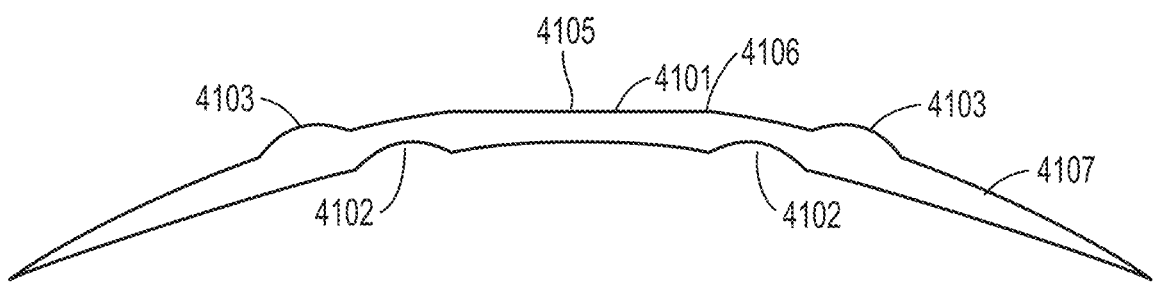

FIGS. 41A and 41B show cross-sectional views of a dynamic contact lens having a center dynamic portion 4101, cavities 4102 in the posterior surface of the dynamic lens, and protrusions 4103 that are not aligned with cavities 4102. The dynamic portion 4101 has a non-uniform thickness such that the center 4105 is thinner than at the perimeter transition zone 4106 with the peripheral portion 4007. The profile of the dynamic lens is shown in a non-conforming configuration (FIG. 41A) and in a conforming configuration (FIG. 41B). In the non-conforming configuration, the cavities 4102 are in a non-compressed state, and in the conforming configuration the cavities 4102 are in a compressed state. The protrusions 4103 are not compressible or are partially compressible such that they protrude from the anterior surface.

FIGS. 33A-41B show dynamic contact lenses in a non-conforming and conforming configuration. The dynamic contact lenses can assume at least one second non-conforming configuration in which the gap height is different than in another non-conforming configuration. The conforming configuration and the one or more non-conforming configurations are quasi-stable.

The posterior surface of the dynamic portion, the posterior surface of the peripheral portion, or the posterior surfaces of both the dynamic portion and the peripheral portion can comprise a surface treatment.

The surface treatment can be configured to control, modify, and/or select the adhesive and cohesive force of tear fluid to the posterior surface of the dynamic portion, the posterior surface of the peripheral portion, or the posterior surfaces of both the dynamic portion and the peripheral portion.

A surface treatment may be applied to all or to a portion of the inner posterior surface and/or the peripheral posterior surface of a dynamic contact lens.

In dynamic contact lenses comprising cavities, a surface treatment may be applied to the walls of the cavities and/or to channels extending from the cavities.

A surface treatment can comprise, for example a coating, a thin film, a chemical treatment, a plasma treatment or a combination of any of the foregoing.

A surface treatment can be selected to modify the hydrophobicity/hydrophilicity of the posterior surface of the dynamic portion, the posterior surface of the peripheral portion or the posterior surfaces of both the dynamic portion and the peripheral portion.

A surface treatment can be selected to control and/or to tailor the capillary forces between the posterior surface of the dynamic portion and the cornea.

A surface treatment can be selected to control and/or facilitate the flow of tear fluid to and from the tear lens.

A posterior surface of a dynamic contact lens can comprise a material selected to control the hydrophilicity/hydrophobicity of the posterior surface. A posterior surface can comprise a material selected to control the charge of the posterior surface, the polarity of the posterior surface, or a combination thereof.

Dk refers to oxygen permeability, i.e., the amount of oxygen passing through a device such as a dynamic contact lens over a given period of time and pressure difference conditions. Dk is express in units of $10^{-11}$ (cm/sec)(mL $O_2$)(mL×mm Hg), also known as a barrer. Oxygen transmissibility can be expressed as Dk/t, where t is the thickness of the structure such as a dynamic contact lens and therefore Dk/t represents the amount of oxygen passing through a dynamic contact lens of a specified thickness over a given set of time and pressure difference conditions. Oxygen transmissibility has the units of barrers/cm or $10^{-9}$ (cm/sec) (mL $O_2$)(mL×mm Hg).

Eye health is promoted by lens materials having oxygen permeability. For dynamic contact lenses, it is generally desirable that the oxygen permeability be greater than about 80 Dk. This high oxygen permeability can be difficult to obtain for high modulus materials and/or for thicker material cross-sections.

The dynamic portion and the peripheral portion of a dynamic contact lens can comprise a material characterized by an oxygen permeability from about 10 Dk to about 500 Dk, from about 50 Dk to about 400 Dk, from about 50 Dk to about 300 DK, and in certain embodiments from about 50 DK to about 100 Dk.

A dynamic contact lens may comprise silicone or silicone hydrogel having a low ionoporosity. For example, a dynamic contact lens may comprise silicone hydrogel or silicone comprising a low ion permeability, and the range of water can be from about 5% to about 35%, such that the Dk is $100 \times 10^{-11}$ or more. The low ion permeability may comprise an Ionoton Ion Permeability Coefficient of no more than about $0.25 \times 10^{-3}$ cm$^2$/sec, for example no more than about $0.08 \times 10^{-3}$ cm$^2$/sec.

A dynamic contact lens may comprise a wettable surface coating disposed on at least the anterior surface of the dynamic contact lens, such that the tear film is smooth over the dynamic contact lens. The wettable surface coating may comprise a lubricious coating for patient comfort, for example to lubricate the eye when the patient blinks. The wettable coating may create a contact angle no more than about 80°. For example, the coating may create a contact angle no more than about 70°, and the contact angle can be within a range from about 55° to 65° to provide a surface with a smooth tear layer for vision. For example, the wettable coating can be disposed on both an upper surface and a lower surface of the device, i.e., on the anterior and posterior surface of the dynamic contact lens. The upper surface may comprise a wettable coating extending over at least the inner optic portion.

A wettable coating may comprise one or more suitable materials. For example, the wettable coating may comprise polyethylene glycol (PEG), and the PEG coating can be disposed on Parylene™. Alternatively, the wettable coating can comprise a plasma coating, and the plasma coating may comprise a luminous chemical vapor deposition (LCVD) film. For example, the plasma coating may comprise at least one of a hydrocarbon, for example, $CH_4$, $O_2$, or fluorine containing hydrocarbon, for example, $CF_4$ coating. Alternatively, or in combination, a wettable coating may comprise a polyethylene glycol (PEG) coating or 2-hydroxyethyl-methacrylate (HEMA). For example, a wettable coating may comprise HEMA disposed on a Parylene™ coating, or a wettable coating A dynamic contact lens provided by the present disclosure can have a water content, for example, from 10 wt % to 70 wt %, such as from 30 wt % to 60 wt %, where wt % is based on the total weight of the dynamic contact lens.

Dynamic contact lenses provided by the present disclosure can be fabricated using any method suitable for fabricating contact lenses and in particular soft contact lenses. Examples of suitable methods include compression molding. The dynamic contact lenses can be fabricated such that as fabricated, the dynamic portion bulges outward to form a dome, a para-central bulge, or other anteriorly directed surface profile.

Methods of fabricating a dynamic contact lens comprise, for example, forming a dynamic contact lens comprising: a dynamic portion, wherein the dynamic portion comprises a SAG height and a center thickness, wherein the center thickness is less than the SAG height; and a peripheral portion is coupled to the dynamic portion, wherein the peripheral portion is configured to retain the dynamic contact lens on the cornea. Methods of fabricating a dynamic contact lens comprise, for example, forming a dynamic contact lens comprising: a dynamic portion characterized by a dynamic base curvature; and a peripheral portion is coupled to the dynamic portion, wherein the peripheral portion comprises a peripheral base curvature, wherein the dynamic base curvature is different than the peripheral base curvature. For example, the radius of the curvature of the dynamic portion can be less than the radius of curvature of the peripheral portion. For example, the radius of the curvature of the dynamic portion can be less than the radius of curvature of the para-central peripheral portion, where the para-central peripheral portion is the part of the peripheral portion adjoining the transition zone and the dynamic portion. The material used to fabricate a dynamic lens can be a material suitable for use in conventional soft contact lenses. The material can comprise, for example, a Young's modulus from 0.05 MPa to 30 MPa, from 0.1 MPa to 20 MPa, from 0.1 MPa to 10 MPa, from 0.1 MPa to 5 MPa, or from 0.1 MPa to 2 MPa.

Dynamic contact lenses provided by the present disclosure can be fabricated with an as-fabricated SAG height. The as-fabricated center SAG height refers to the distance from the posterior surface at the center of the dynamic portion to the extension of the base curve for the paracentral peripheral portion adjacent the dynamic portion. The as-fabricated center SAG is shown as element 110 in FIG. 1A where the dashed line is the extension of the base curve of the paracentral peripheral portion beneath the dynamic portion. The as-fabricated SAG height is the maximum gap that can be achieved when the lens is placed on the cornea and the dynamic portion if filled with tear fluid to form a tear lens. Depending on a number of factors including the availability of tear fluid, a dynamic portion with an as-fabricated SAG height of 40 µm, can produce, for example, a quasi-stable tear lens having a gap of 40 µm, 30 µm, 20 µm, and/or 10 µm. A dynamic portion with an as-fabricated SAG height of 100 µm, can produce, for example, a quasi-stable tear lens having a gap of 100 µm, 90 µm, 80 µm, 70 µm, 60 µm, 50 µm, 40 µm, 30 µm, and/or 10 µm.

Dynamic contact lenses provided by the present disclosure can be used to correct or to improve vision.

Methods for correcting vision in a patient can comprise applying a dynamic contact lens provided by the present disclosure to an eye of a patient in need of corrected vision.

Correcting vision can comprise correcting hyperopia, myopia, astigmatism, or presbyopia.

Methods provided by the present disclosure comprise treating presbyopia by applying a dynamic contact lens provided by the present disclosure to a presbyopic eye of a patient.

Dynamic contact lenses provided by the present disclosure can be designed to dynamically correct vision. For example, presbyopia is characterized by the inability of the eye to focus on close objects. The dynamic portion of dynamic contact lenses provided by the present disclosure can dynamically change configuration to accommodate either distant vision or near vision. For example, as relevant to presbyopia, in a first configuration appropriate for viewing distant objects the dynamic portion of a dynamic contact lens can lie proximate the cornea. In this configuration there is no tear lens and distance vision is uncorrected. Then, when the patient views a near object, the dynamic portion of the dynamic contact lens can assume a second configuration that corrects the presbyopia and facilitates clearly viewing near objects. This is accomplished without changing the radial thickness of the dynamic portion or by changing the curvature ratio of the dynamic portion. Rather, as the dynamic portion bulges outward, the lenticular volume expands to provide a tear lens that serves to dynamically correct the near-term vision. The tear lens changes the optical power of the dynamic portion of the dynamic contact lens.

Dynamic contact lenses provided by the present disclosure can also be used as multi-focal lenses to correct presbyopia and to prevent progression of myopia.

Static configurations of dynamic contact lenses provided by the present disclosure can be used to compensate for an irregular cornea, to treat astigmatism, or for corneal wound healing.

Dynamic contact lenses incorporating a tear lens can correct vision resulting from an irregularly shaped cornea. An irregularly shaped cornea can be permanent or temporary such as resulting from ocular surgery including photorefractive keratectomy or corneal cross-linking procedures. The tear lens can correct astigmatism. For treatment of such conditions a dynamic contact lens provided by the present disclosure having a static tear lens can be appropriate.

Dynamic contact lenses provided by the present disclosure can be used to enhance or to restore visual acuity following ocular therapy. Ocular therapies can involve manipulation of the ocular tissue and can be associated with a lesion external to the optical region. Ocular therapies can involve incising an ocular tissue and implanting a device within the optical region. In certain embodiments, ocular therapies involve ablating at least a portion of the stroma and/or epithelium. Ocular therapies can include, for example, cataract surgery including phacoemulsification, conventional extracapsular cataract extraction, and intracapsular cataract extraction; glaucoma surgery including laser trabeculoplasty, irdotomy, irdectomy, sclerotomy, goniotomy, drainage implant surgery, and canaloplasty; corneal surgery including corneal transplant surgery, penetrating keratopalsty, keratoprosthesis, pterygium excision, corneal tattooing, and osteo-ondonto-keratoprosthesis; and photorefractive therapy including photorefractive keratectomy (PRK) and laser-assisted in-situ keratomileusis (LASIK). Ocular therapy can also involve treating a wound to the eye, wherein the treatment may or may not involve ocular surgery. Ocular therapy can comprise cataract surgery, corneal inlay surgery, corneal transplant surgery, or treatment of an ocular trauma wound. Ocular therapy can comprise incising the cornea and/or perforating the cornea at a site external to the optical region.

In general, ocular therapies such as cataract surgery, corneal inlay surgery, and corneal transplant surgery can be distinguished from ocular therapies involving manipulation only to the optical region of the cornea or primarily to the optical region of the cornea. In the former ocular therapies, which can be considered implantation surgeries in that a device is implanted into an ocular tissue as an adjunct or as a replacement for an ocular tissue that is removed, the procedures involve manipulation of ocular tissue external to the optical region as well as to the optical region itself. The latter therapies are exemplified by refractive surgeries in which the optical region of the cornea is sculpted to correct refractive visual error. Examples of refractive surgeries include, for example, PRK and LASIK. Ocular therapies involving manipulation of the optical region of the cornea are encompassed to the extent that the therapy also involves manipulation of ocular tissue external to the optical region. For example, LASIK involves making an incision in the stroma external to the optical region to form a flap. The flap is then lifted back to expose the stroma, which is then ablated using a laser to provide a shape for refractive correction. Furthermore, ocular manipulation involving tissue external to the optical region and photorefractive surgery involving manipulation of tissue within the optical region can be combined. For example, corneal inlay surgery and associated photorefractive surgery such as LASIK surgery can be combined.

Dynamic contact lenses provided by the present disclosure may be used to treat the cornea following corneal inlay surgery or corneal onlay surgery. Corneal inlays and onlays are tiny lenses or other optical devices inserted into the cornea to reshape the front surface of the eye, i.e., the anterior surface of the cornea, to improve vision and in some cases, can resemble small contact lenses. The primary use of current corneal inlays is to improve near vision and to address presbyopia. In some cases, corneal inlay surgery can be combined with photorefractive surgery such as LASIK to correct both presbyopia and common refractive errors such as nearsightedness, farsightedness, and/or astigmatism.

Dynamic contact lenses provided by the present disclosure may be used to treat the cornea following cataract surgery. In certain embodiments, ocular therapy comprises cataract surgery. Cataract surgery involves the removal and replacement of the natural lens of the eye that has developed opacification, which is referred to as a cataract.

Dynamic contact lenses provided by the present disclosure may be used to treat the cornea following corneal transplantation surgery. Corneal transplantation therapies include, for example, penetrating keratoplasty, lamellar keratoplasty, deep anterior lamellar keratoplasty, and endothelial keratoplasty.

Dynamic contact lenses provided by the present disclosure when applied to an eye of a patient following ocular therapy speed healing of ocular defects. Ocular defects include incisions and perforations of the cornea and/or other ocular tissue.

Dynamic contact lenses provided by the present disclosure may be used to treat the cornea following cross-linking therapy. Corneal cross-linking is a technique that strengths the chemical bonds in the cornea and thereby facilitate the ability of the cornea to resist irregular changes to the corneal shape known as ectasia.

Dynamic contact lenses provided by the present disclosure may be used to treat the cornea following photorefractive therapy such as, for example, PRK and LASIK. Refractive eye surgery is used to improve the refractive state of the eye and includes procedures such as, for example, automated lamellar keratoplasty (ALK), laser assisted in-situ keratomileusis (LASIK), photorefractive keratectomy (PRK), laser assisted sub-epithelium keratomileusis (LASEK), EPI-LASIK, radial keratotomy, mini-asymmetric radial keratotomy, arcuate keratotomy, limbal relaxing incisions, thermal keratoplasty, laser thermal keratoplasty, intrastromal corneal ring segment removal, and phakic intraocular lens implantation. Following any of these procedures there is a period of time before optimal vision is restored. For example, in LASIK, optimal vision is typically achieved within about 24 hours following surgery. During this recovery period, in addition to sub-optimal visual acuity, a patient may experience discomforts such as photophobia or light sensitivity and/or a burning sensation. Methods for reducing the time to achieve optimal vision and for reducing or eliminating discomfort associated with refractive eye surgery are desired.

PRK is a surgical procedure in which a laser is used to shape the stroma to correct for photorefractive error. In the process, the epithelium overlying the portion of the ablated stroma is removed to form an epithelial defect.

LASIK is a surgical procedure used to correct refractive vision errors such a myopia, hyperopia, and astigmatism in which a laser is used to reshape the cornea to improve visual acuity, e.g., the clearness and sharpness of an image. The LASIK procedure involves both a surgical cutting and laser sculpting of the cornea. During LASIK, the eye is immobilized by application of a soft corneal suction ring. A flap in the outer cornea is then created using a blade or laser leaving a hinge on one end of the flap. The flap is then folded back to expose the stroma, or middle section of the cornea. A laser is then used to vaporize the corneal stroma to remove tissue to reshape the cornea to correct vision. After the stromal layer is reshaped, the flap is repositioned over the eye and remains in position by natural adhesion. Optimal visual acuity is usually achieved within about 24 hours following surgery.

Dynamic contact lenses provided by the present disclosure can be configured to correct refractive error such as astigmatism. The lenses provide a smooth spherical anterior surface and minimize lens-induced distortions by reducing flexure of the inner optical portion and by maintaining lens centration during wear. Reduced flexure of the inner optical portion can, in part, be accomplished by increasing the rigidity of the inner portion and by creating a tear lens. Centration of the inner optical portion minimizes astigmatic and prismatic effects caused by tilting of the optic and also minimizes edge distortion.

While the foregoing has focused on ocular therapies associated with intentional manipulation of the eye, it can be appreciated that dynamic contact lenses and methods of using the dynamic contact lens can also be useful in treating other injuries to the eyes such as, for example, the treatment of trauma wounds. Trauma to the eye can also cause edema and compromise the interfaces between the various ocular tissue. Thus, in addition to post-surgical methods, dynamic contact lenses provided by the present disclosure are useful in healing trauma wounds to the eye. Trauma includes, for example, physical trauma such as blunt trauma and penetrating trauma, chemical trauma, blast injury, burn, and psychological trauma. Treatment of a trauma wound may involve surgical procedures such as removing an embedded physical object or removing scar tissue. To the extent that the trauma produces edema and optical irregularities, application of a dynamic contact lens will lead to faster visual recovery and, by stabilizing the involved ocular tissue, accelerate healing. Trauma may also cause defects to ocular tissue including to the anterior surface of the cornea and involve the epithelium and/or stroma and may cause damage to internal ocular tissue. Wound healing thus includes healing wounds associated with physical damage to ocular tissue not necessarily caused by surgical procedures.

Dynamic contact lenses provided by the present disclosure may also be used as preventative devices. For example, dynamic contact lenses may be used to protect an eye from a potential injury such as injury due to physical trauma, protection from chemicals, protection from particulates, and protection from edema. As a preventative device, a dynamic contact lens can be applied to the eye prior to an anticipated exposure to a potential injury. When worn for protecting the eye from a potential injury, a dynamic contact lens can provide a physical barrier, a chemical barrier by virtue of the seal to the anterior surface of the eye, and/or may prevent or minimize edema caused by non-physical force such as blast pressure or by trauma to other parts of the body. In certain embodiments, protecting the eye form potential injury includes protected the eye from gases, vapors, dust, or smoke. In certain embodiments, protecting includes protected from edema.

EXAMPLES

Embodiments provided by the present disclosure are further illustrated by reference to the following examples, which describe dynamic contact lenses and uses of dynamic contact lenses provided by the present disclosure.

Example 1

Optical Function of a Dynamic Contact Lens in an Eye Model

Figure 11:
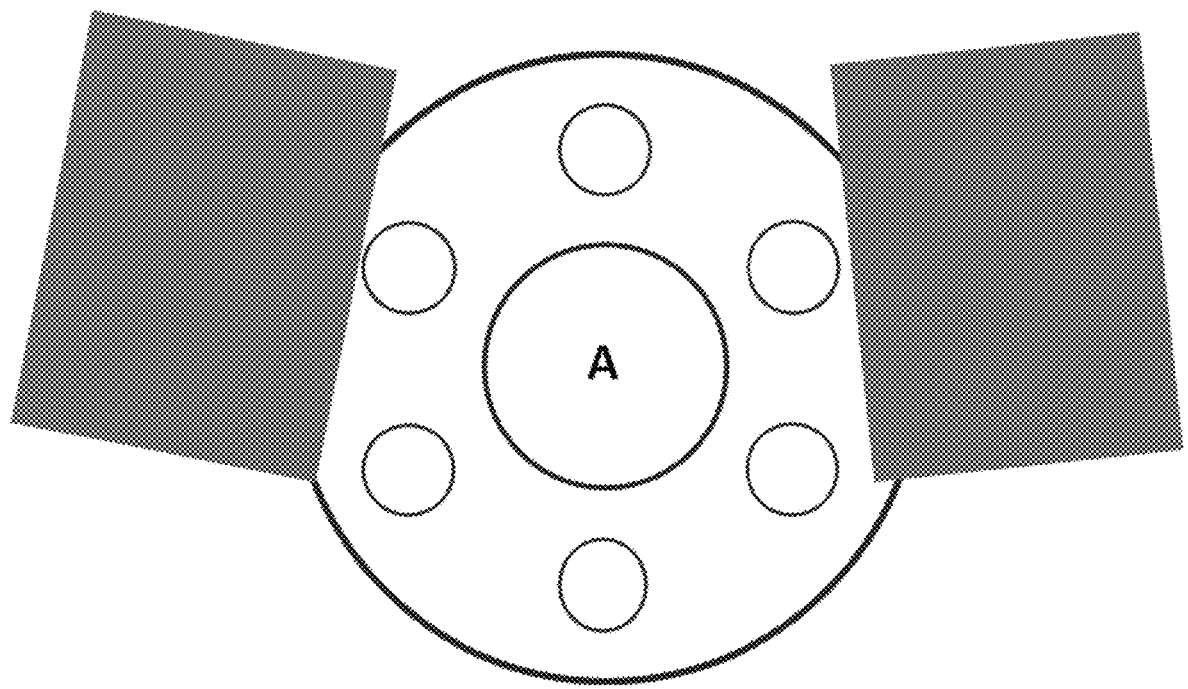
FIG. 11 shows an illustration representative of a photograph of a dynamic contact lens provided by the present disclosure on a test bench model of an eye globe and eyelid with no eyelid pressure applied over the peripheral portion.

A view of a dynamic contact lens having a dynamic portion is shown in FIG. 11. The letter "A" was applied to the model cornea and a dynamic contact lens was applied over the letter and the model cornea. The features on the left and right sides of the simulated eyelids. In FIG. 11, no pressure was applied to the cornea.

Figure 12:
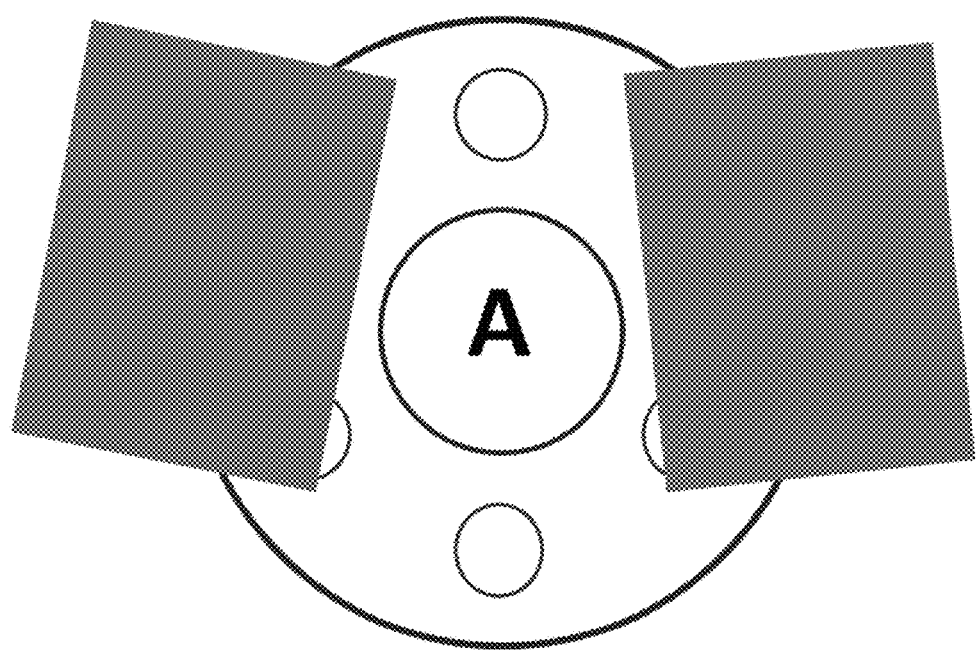
FIG. 12 shows an illustration representative of a photograph of the model of FIG. 11 with eyelid pressure applied over the peripheral portion.

As shown in FIG. 12, upon pressure being applied to the dynamic contact lens by moving the simulated eyelids toward the center, i.e., toward the dynamic portion, the refraction of the dynamic center portion transitioned to a more posterior optical power. As a result, the size of the letter "A" is about 170% larger.

Figure 13:
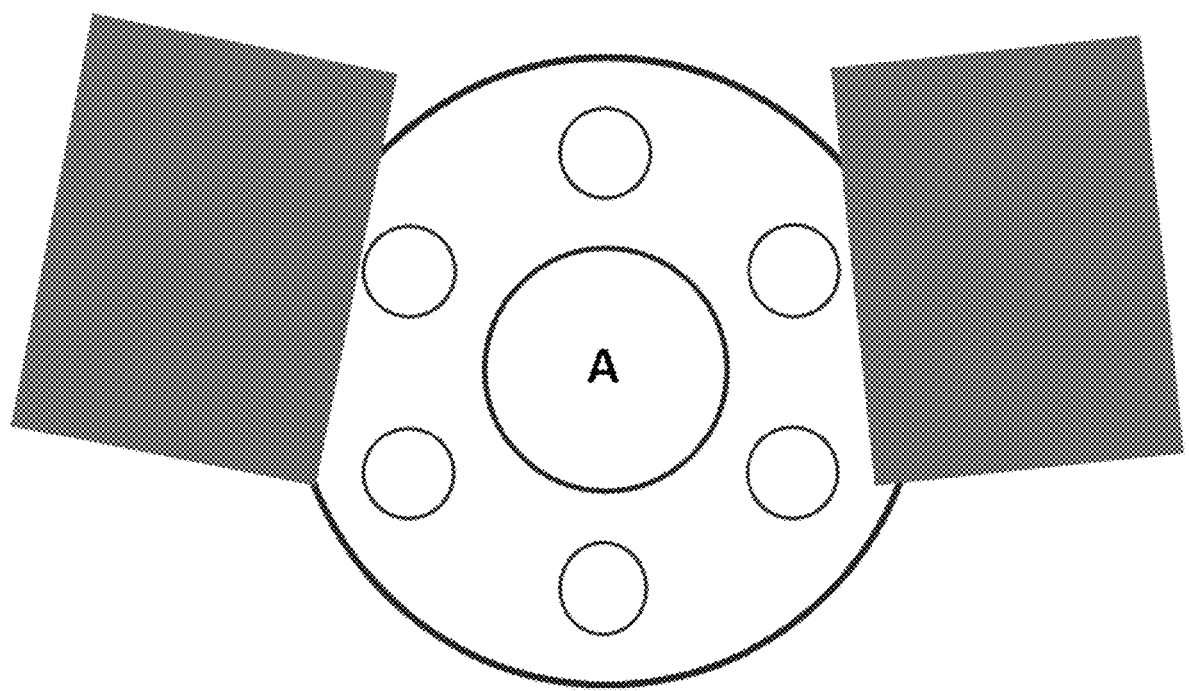
FIG. 13 shows an illustration representative of a photograph of the model of FIGS. 11 and 12 with eyelid pressure released.

As shown in FIG. 13, when the artificial eyelid pressure was released from the lens by moving the simulated eyelids away from the center dynamic portion, the refractive power of the dynamic center portion returned to the initial optical power within about 100 msec.

A saline solution was used to simulate tear fluid.

Example 2

Optical Function of Dynamic Contact Lens Having a Tear Fluid Reservoir in an Eye Model A dynamic contact lens having a dynamic portion and peripheral tear fluid reservoir was placed over an eye model and imaged by OCT.

Figure 14A:
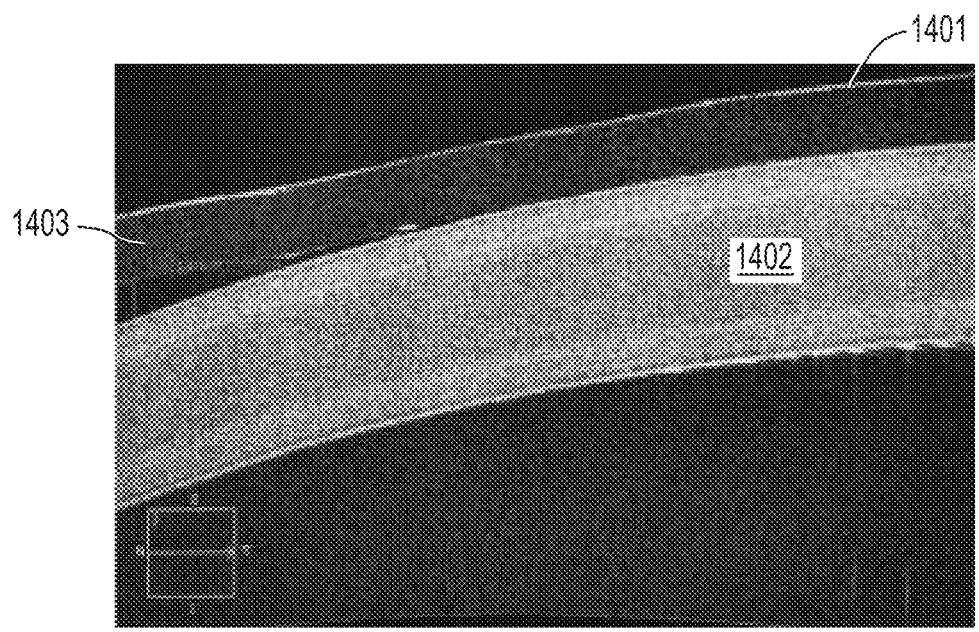
FIG. 14A shows an OCT image of a dynamic contact lens provided by the present disclosure in a conforming configuration.

As shown in FIG. 14A, the dynamic portion 1401 on the far-right side of the image is in a conforming state. There is no tear lens between the lens and the model cornea 1402. A tear fluid reservoir 1403 having a height of 144 µm is apparent on the left side of the image.

Figure 14B:
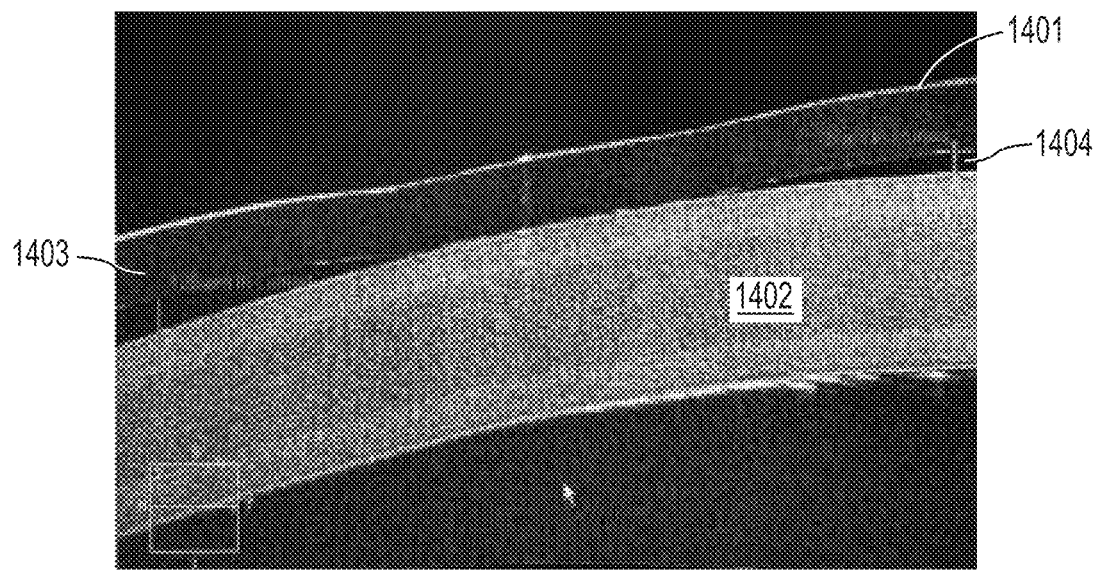
FIG. 14B shows an OCT image of a dynamic contact lens provided by the present disclosure in a non-conforming configuration.

As shown in FIG. 14B, when light pressure was applied over the tear fluid reservoir, the height of the reservoir 1403 decreased to 120 µm and the dynamic portion 1401 assumed a non-conforming configuration to form a tear lens 1404 having a gap height of 76 µm.

Example 3

Optical Function of a Lens in an Eye Model

A dynamic contact lens with a dynamic portion was placed over a human eye of a 50-year-old man.

The dynamic contact lens had the following properties: 8.9 mm base curvature, 14.5 mm diameter, 100 µm central thickness, thickness at 10 mm radius was 200 µm, the SAG was 200 µm, and the diameter of the dynamic portion was 20 mm.

The refractive correction of the eye was measured using a standard auto-refractometer.

The refractive correction of the eye was determined to be −2.25D and the corneal base curvature was 7.4 mm.

Figure 15:
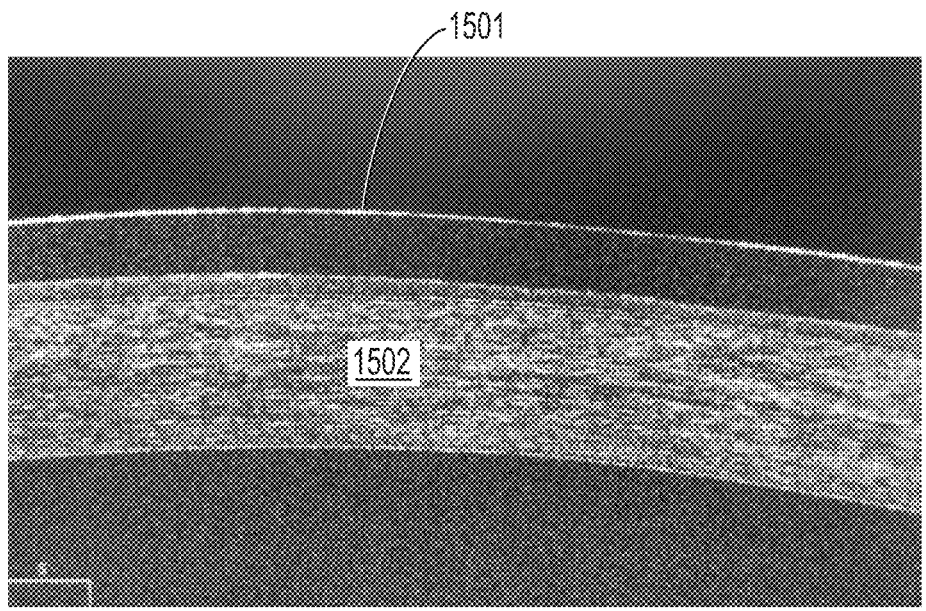
FIG. 15 shows an OCT image of a dynamic contact lens provided by the present disclosure in which the dynamic portion conforms to the cornea.

A dynamic contact lens with a dynamic portion was placed over the eye. The dynamic portion 1501 conformed to the cornea 1502 with no apparent gap between the posterior surface of the dynamic portion and the cornea as shown by the OCT image of FIG. 15. The refractive correction needed for the eye was +3.5D and the anterior curvature of the lens was 7.52 mm. This indicated that the optical power of the lens was −5.75D (to correct −2.25D (needed for the uncorrected eye)+3.5D (additional myopic shift by the lens)).

Figure 16:
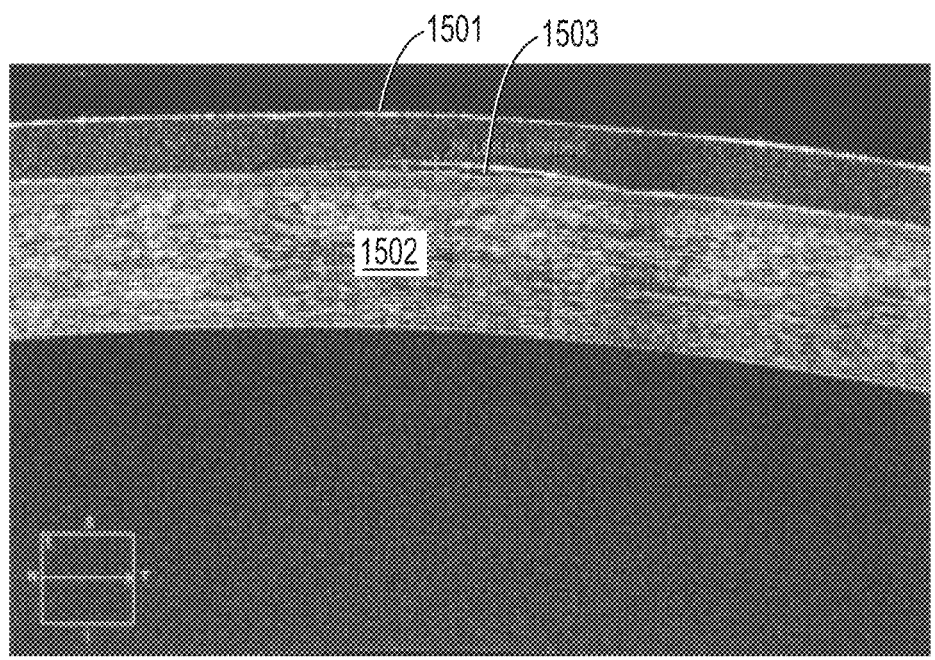
FIG. 16 shows an OCT image of a dynamic contact lens provided by the present disclosure in which the dynamic portion is in a non-conforming configuration to provide a tear lens having a gap height of 28 µm.

Pressure was then applied to the peripheral portion of the dynamic contact lens. The dynamic portion 1501 assumed a non-conforming configuration as shown by the OCT image in FIG. 16. A gap 1503 is evident between the posterior surface of the dynamic portion and the cornea 1502. The refractive correction needed for the eye in the non-conforming configuration was −2.75D, indicating the power of the tear lens 1503 added an optical power to the optical system of +6.25D (+3.5D plus 2.75D of hyperopic shift).

Example 4

Tear Lens Formation on a Human Eye

A dynamic contact lens provided by the present disclosure was applied to a human eye.

Figure 17A:
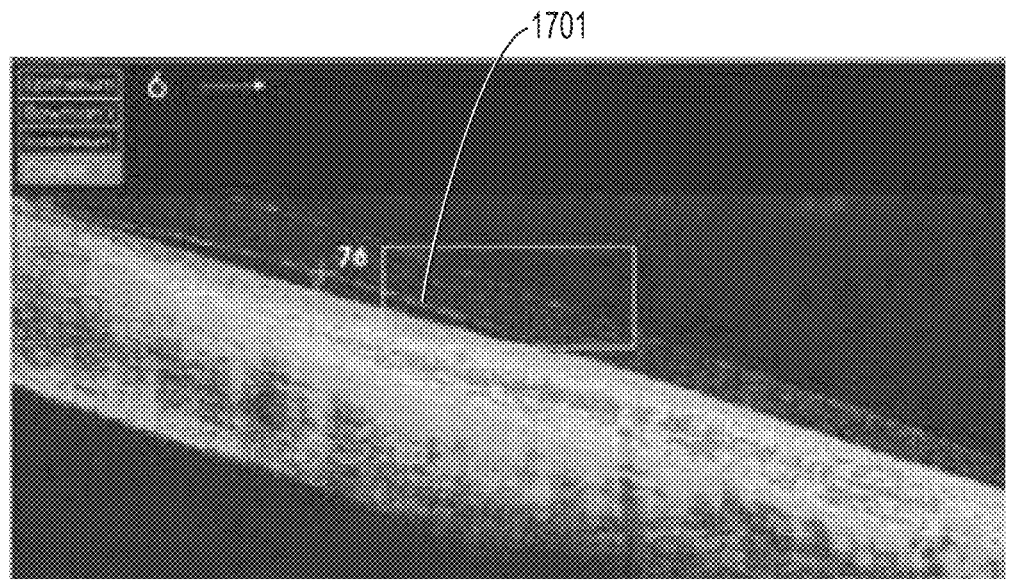
FIG. 17A shows an OCT image of a dynamic contact lens provided by the present disclosure forming a tear lens with the cornea.
Figure 17B:
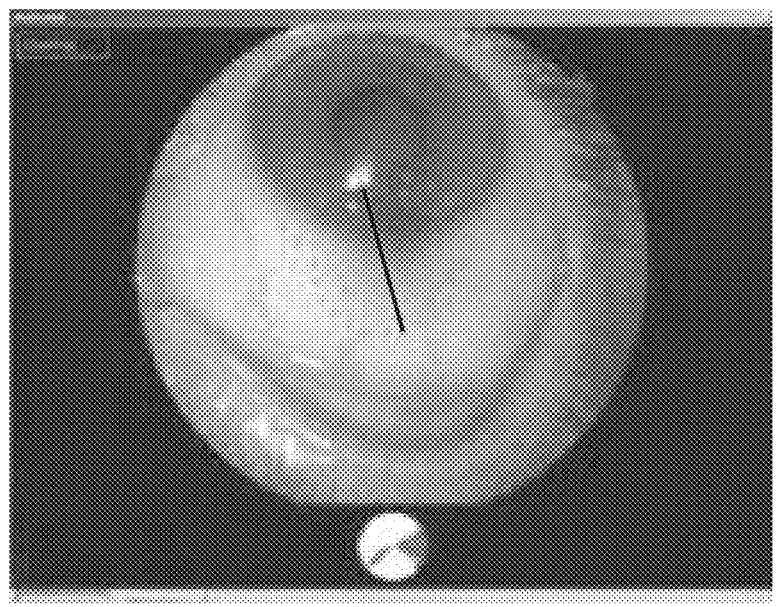
FIG. 17B shows an image of an eye corresponding to the OCT image of FIG. 17A.

FIG. 17A shows a tear fluid reservoir 1701 having a height of 76 µm in primary gaze. The region of the human eye imaged with the OCT is identified in FIG. 17B by the segment.

Example 5

Para-Central Dynamic Portion

A dynamic contact lens having a dynamic portion was applied over a human cornea. The dynamic portion 1003 was located in the para-central region of the dynamic contact lens. As shown in FIG. 10, the non-conforming dynamic portion is para-central to the lens center. In the conforming configuration the dynamic portion will add positive optical power to the eye.

Example 6

Example Dynamic Contact Lens Configurations and Dimensions

Figure 18:
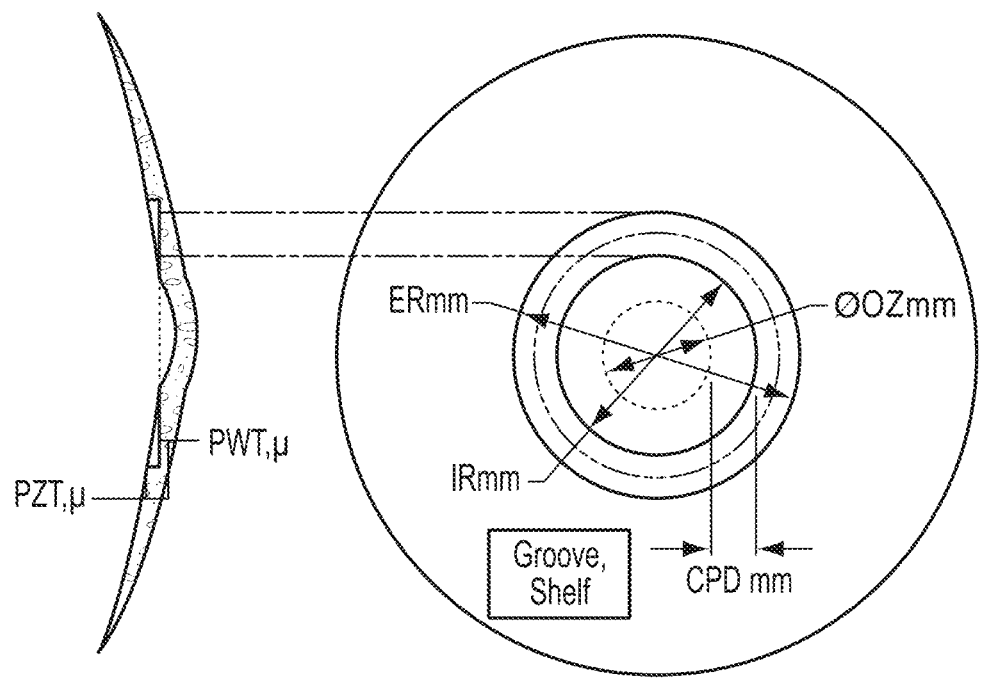
FIGS. 18-20 show different cavity configurations for providing tear fluid reservoirs.
Figure 19:
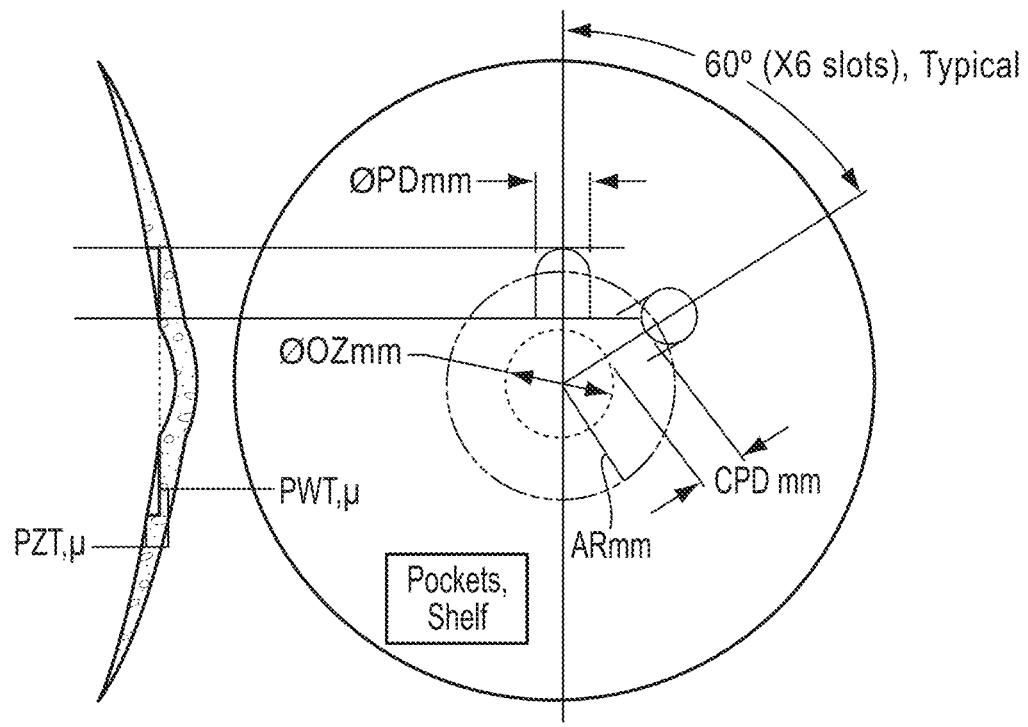
Figure 20:
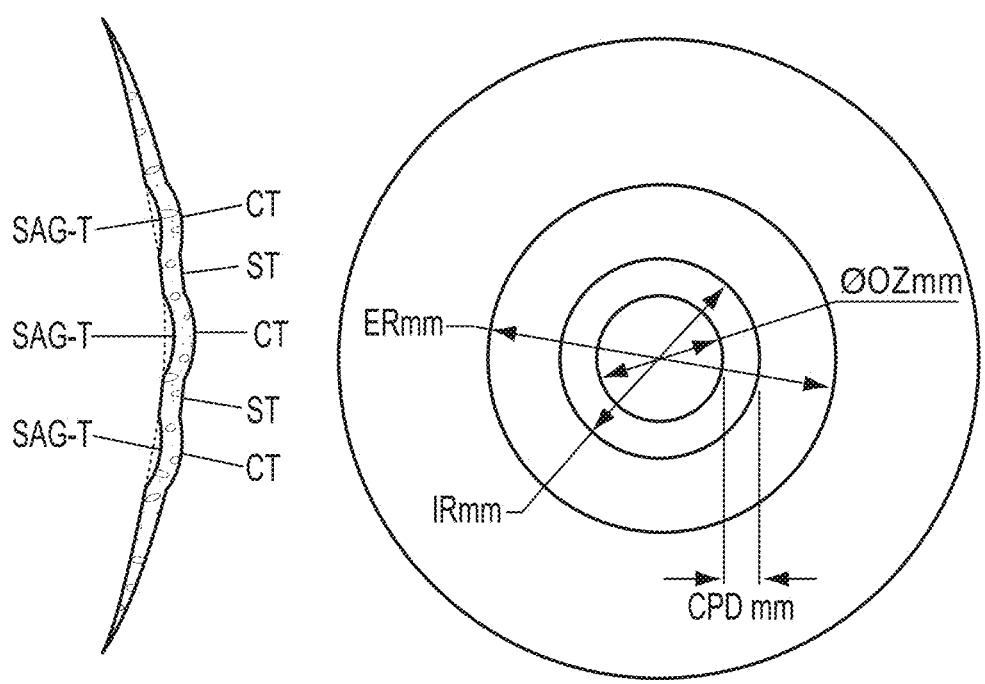

Examples of dynamic contact lens configurations and dimensions are shown in FIGS. 18-20.

FIG. 18 shows a dynamic contact lens having a peripheral 360° groove with an open path/ledge toward the center bulge. The dynamic lens is designed such that tear fluid can be directed to the center when pressure is applied over a sector of the groove by the lower eyelid.

FIG. 19 shows a dynamic contact lens having six (6) tear fluid pockets in the peripheral portion with an open path/ledge toward the center bulge. The dynamic lens is designed such that tear fluid can be directed to the center when pressure is applied over a sector of the groove by the lower eyelid.

FIG. 20 shows a dynamic contact lens having a peripheral 360° groove having dimensions similar to that of the dynamic portion.

Example 7

Minus Lens Having a Dynamic Portion

Figure 21:
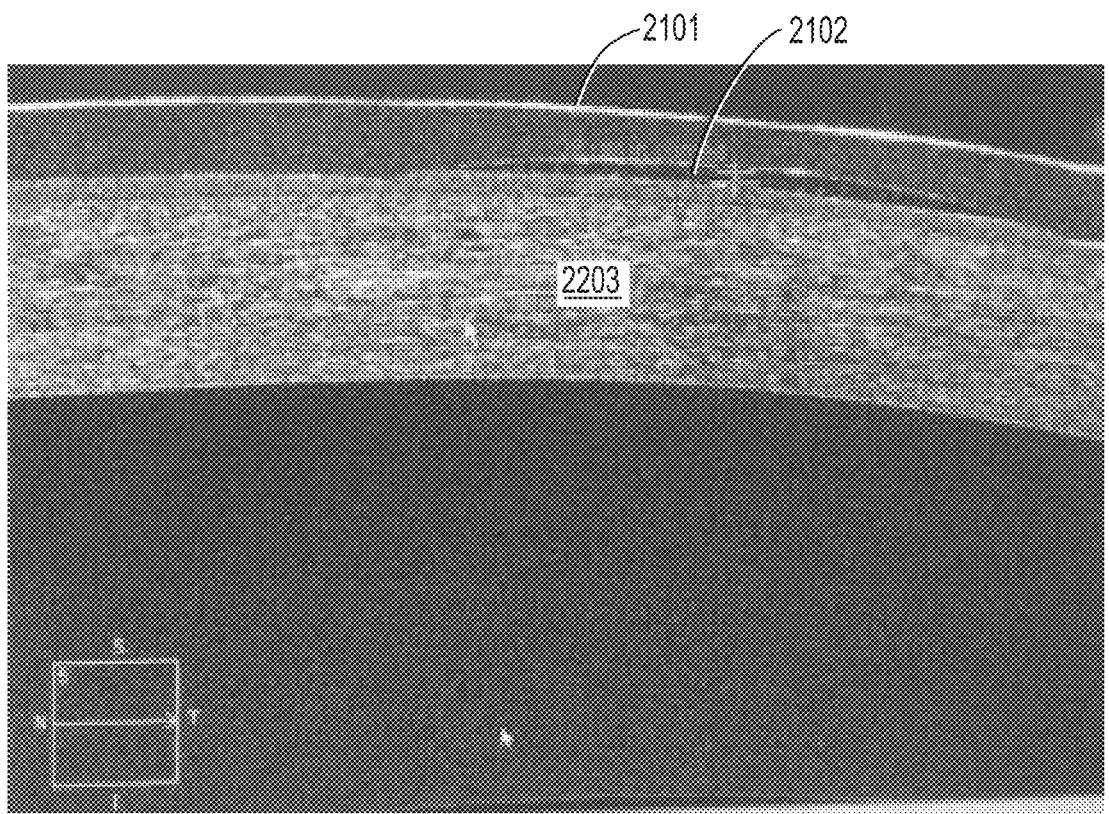
FIG. 21 shows an OCT image of an example of a dynamic contact lens provided by the present disclosure forming a minus tear lens.
Figure 22:
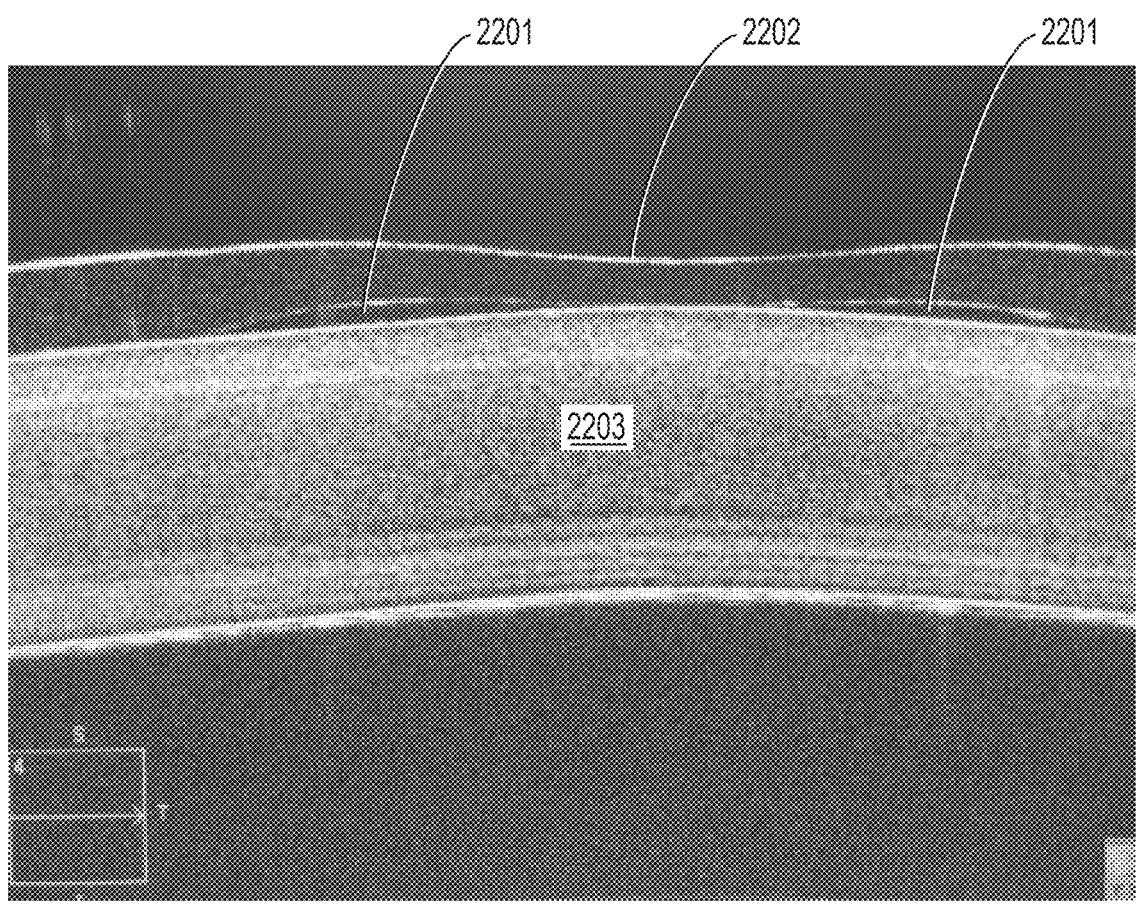
FIG. 22 shows an OCT image of a dynamic contact lens provided by the present disclosure forming a minus tear lens.

FIG. 21 shows an OCT image of central dynamic portion 2101 forming a minus tear lens 2102. The thickness of the dynamic portion decreases toward the center of the dynamic portion. FIG. 22 shows a minus tear lens 2202 in which the center of the lens conforms to the cornea 2203. The thickness of the center of the dynamic portion is less than the thickness at the transition zone with the peripheral portion.

Example 8

Effect of Lens Parameters on Internal Forces See Example 11 Below

Figure 25A:
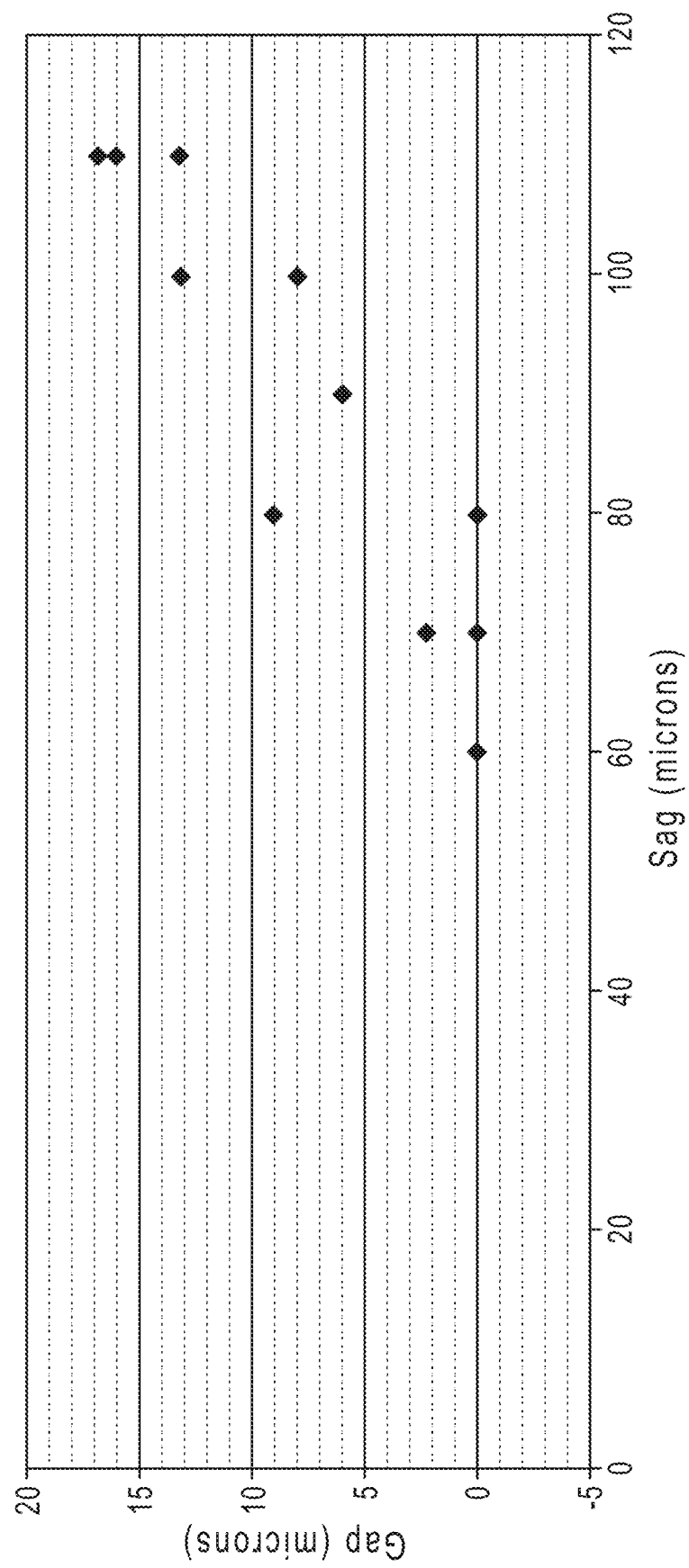
FIG. 25A is a graph showing the height of the gap between the posterior surface of the dynamic center portion and the cornea with respect to the gap height of the dynamic center portion for the as-fabricated dynamic contact lens.
Figure 25B:
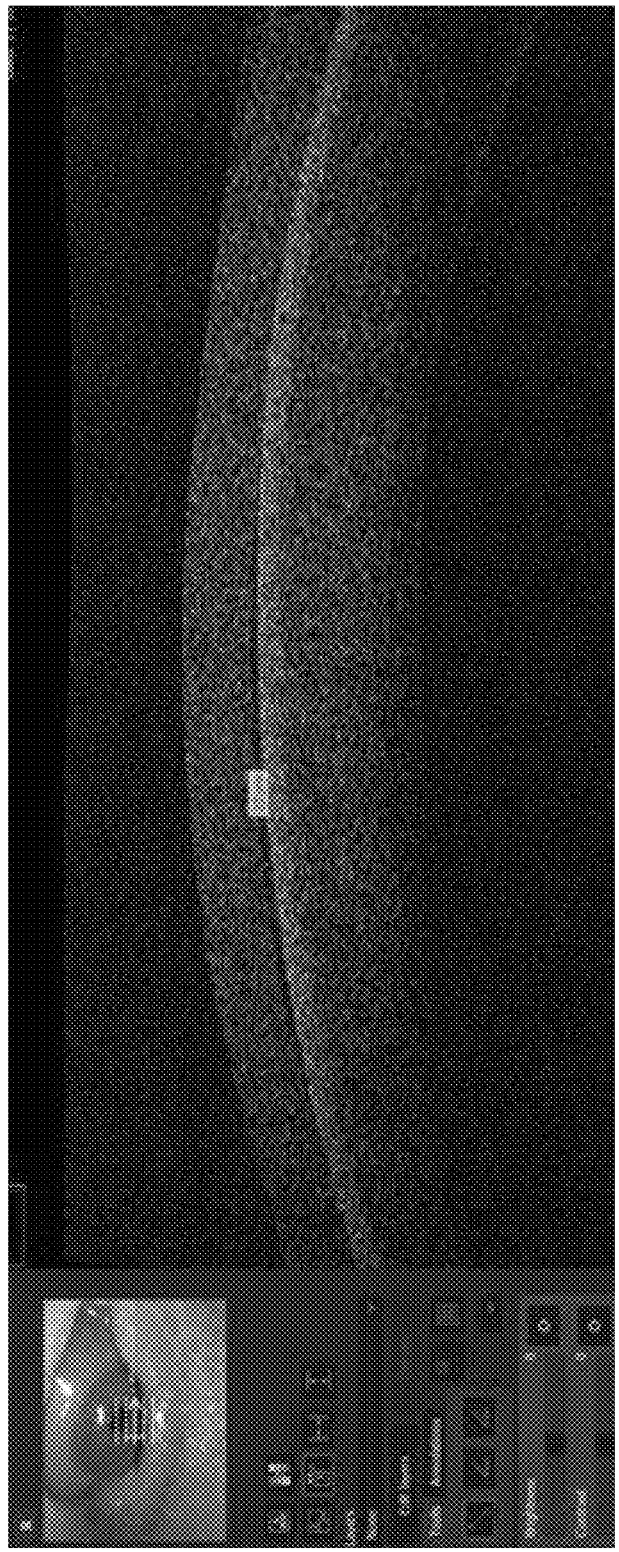
FIG. 25B shows an OCT image of a dynamic contact lens with an as-fabricated SAG height of 40 µm, which when placed on an eye exhibits a tear lens within the gap height of 37 µm.
Figure 25C:
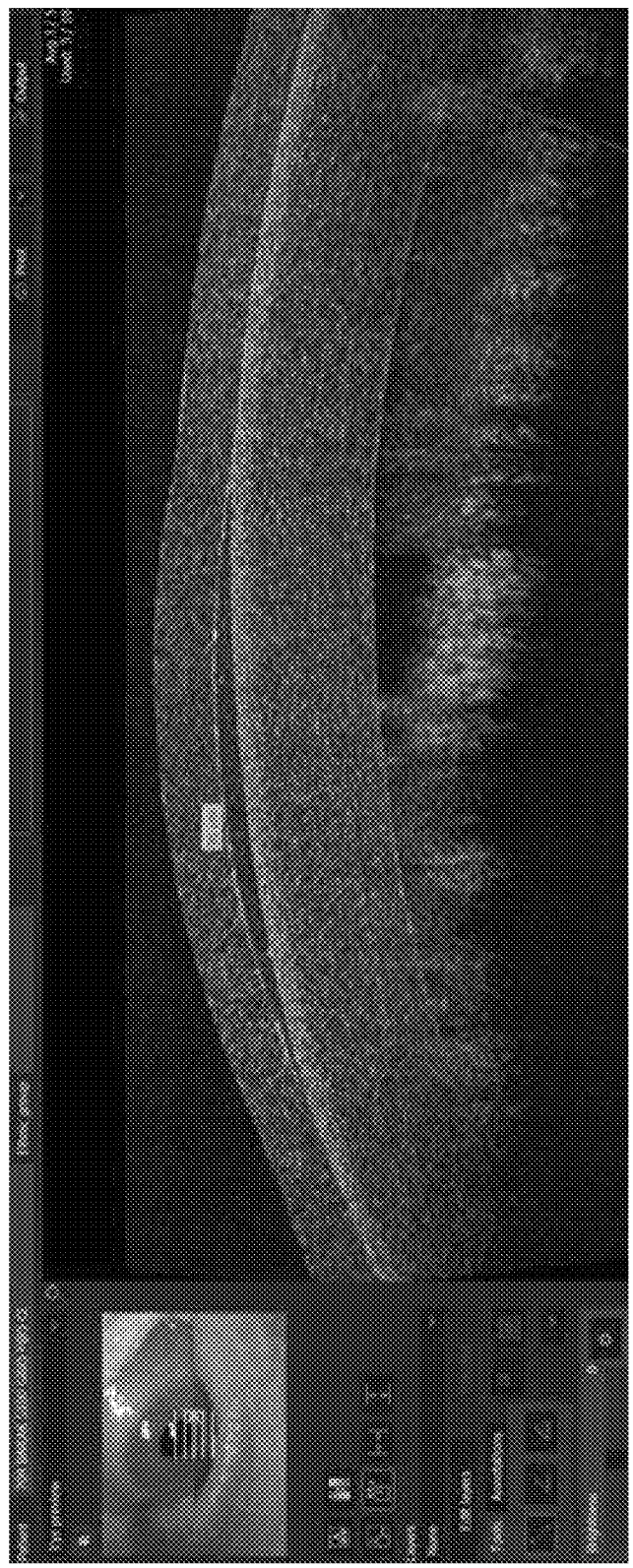
FIG. 25C shows an OCT image of a dynamic contact lens with an as-fabricated SAG height of 100 µm, which when placed on an eye exhibits a tear lens within the gap height of 96 µm.

The effect of the as-fabricated shape of the dynamic portion on the shape of the dynamic portion when applied to an eye of a patient is shown in FIGS. 25A-25C.

FIG. 25A shows the relationship of the gap between the posterior surface of the dynamic portion and the cornea, to the as-fabricated SAG height of the dynamic portion.

For example, referring to FIG. 25A, for a dynamic contact lens made of silicone hydrogel with a Young's modulus of 0.76 MPa and having an as-fabricated center SAG height of about 100 µm over a diameter of 3 mm (equivalent to a radius of curvature of 4.72 mm), when applied to an eye with an anterior curvature of 7.6 mm, the gap between the posterior surface at the center of the dynamic portion and the cornea is about 10 µm. The gap height is a balance between the restoring force created by the as-fabricated SAG height and the availability of tear fluid. The gap height will depend on the availability of tear fluid. For examples, as shown in FIG. 25A, the gap height is only about 10% the as-fabricated SAG height. With additional tear fluid, the gap height can be up to 100% the as-fabricated SAG height. The availability of tear fluid can be controlled and/or facilitated by including fluid reservoirs, channels, fenestrations, and other physical features that facilitate exchange of tear fluid with the tear lens within the gap defined by the dynamic portion. The dynamic lenses had a diameter of 14.5 mm, a dynamic portion with a diameter of 3 mm, a central thickness of 200 µm and were made of silicone hydrogel.

FIG. 25B shows an OCT image of a dynamic contact lens made of silicone hydrogel with a Young's modulus of 0.76 MPa with an as-fabricated SAG height of 40 µm over a diameter of 3 mm (equivalent to a radius of curvature of 6.19 mm) on an eye with an anterior curvature of 7.6 mm and having a tear lens with a gap height of 37 µm.

FIG. 25C shows an OCT image of a dynamic contact lens made of silicone hydrogel with a Young's modulus of 0.76 MPa with an as-fabricated SAG height of 100 µm over a diameter of 3 mm (equivalent to a radius of curvature of 4.72 mm) on an eye with an anterior curvature of 7.6 mm and having a tear lens with a gap height of 96 µm.

To create the tear lenses shown in FIGS. 25B and 25C, tear fluid was provided under the peripheral portion and allowed to flow underneath the dynamic portion to form a tear lens. Both images demonstrate that the dynamic lens can realize its full pre-fabricated potential SAG to create a tear lens under the entire pre-fabricated SAG. Thus, using a soft contact lens material, and provided the dynamic lens has an as-fabricated central dynamic portion with a smaller radius of curvature than the peripheral or para-peripheral portion, a gap with a height greater than 10 µm will be formed between the dynamic portion and the cornea. See also graph in FIG. 25A. Furthermore, when more tear fluid is available to form the tear lens between the dynamic portion and the cornea, the dynamic portion can vault further away from the cornea.

The availability of tear fluid can depend on several factors including the geometry of the lens, features that facilitate the flow or exchange of tear fluid such as reservoirs, channels, and fenestrations, the as-fabricated SAG height, and pressure applied to the lens by the eyelids. Dynamic contact lenses having as-fabricated SAG heights from 60 µm to 110 µm (distance between the posterior surface of the dynamic portion at the center of the lens and the base curvature of the peripheral portion) were fabricated, applied to an eye and the gap between the posterior surface of the dynamic portion and the cornea measured. The relationship between the as-fabricated SAG height and the gap height reflects the internal mechanical forces induced by the pre-fabricated dome on the geometry of a quasi-stable non-conforming configuration. The greater the pre-fabricated SAG height, the greater the pumping force that is generated.

Figure 26A:
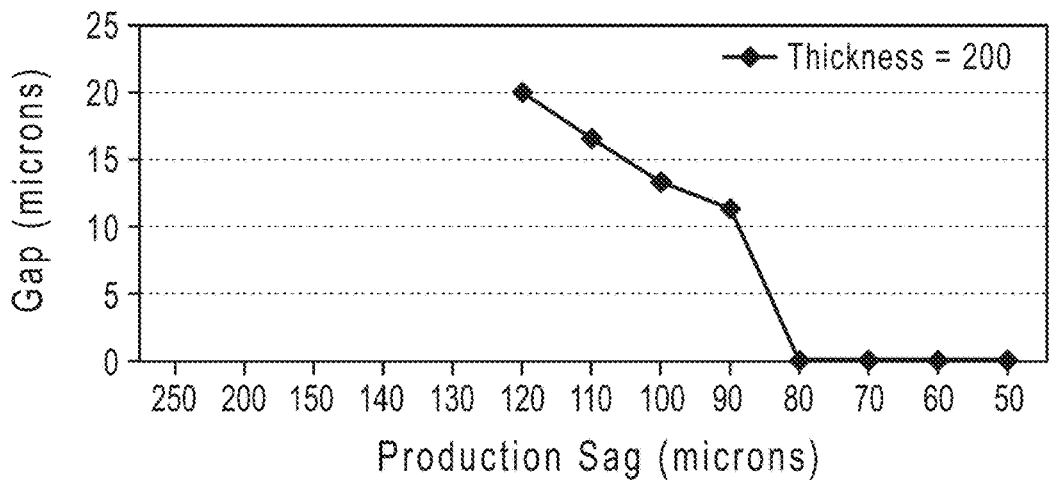
FIGS. 26A-26C are graphs the height of gap between the posterior surface of the dynamic center portion and the cornea with the SAG height of the dynamic center portion for the as-fabricated dynamic contact lens for different thicknesses of the dynamic center portion.
Figure 26B:
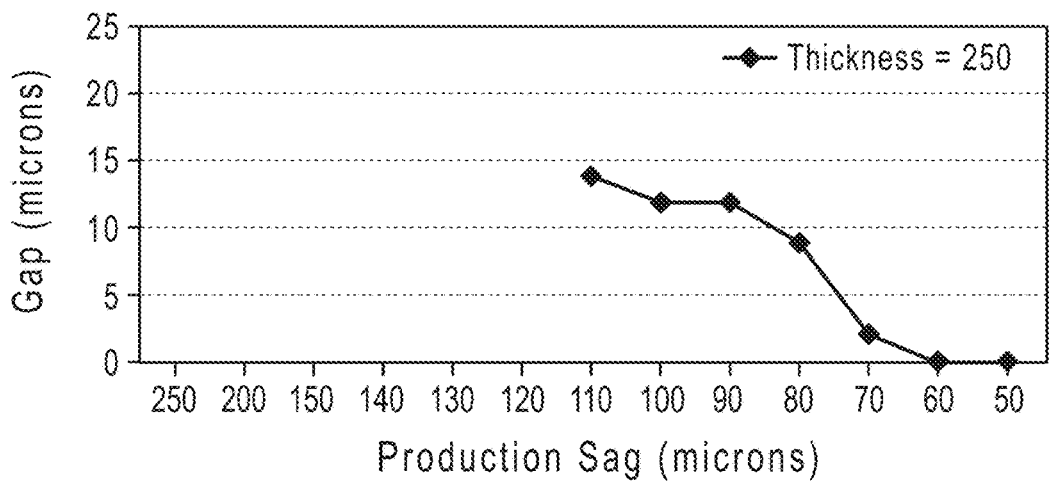
Figure 26C:
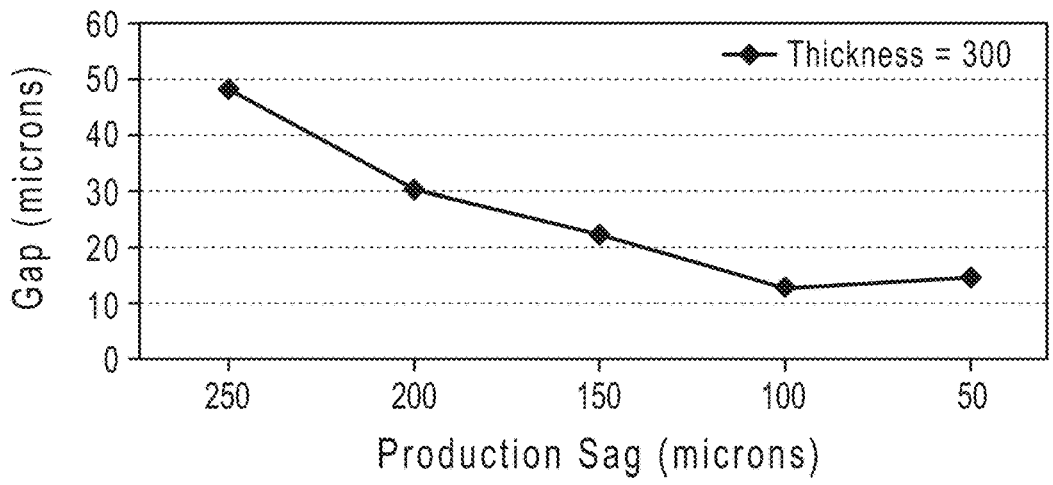

The internal mechanical forces can also be increased by increasing the thickness of the dynamic portion, by decreasing the diameter of the dynamic portion, and by increasing the Young's modulus of the material forming the dynamic portion. These effects are illustrated in FIGS. 26A-26C, which show graphs of the measured gap between the posterior surface of the center of the dynamic portion and the cornea with the as-fabricated SAG height for dynamic portions having thicknesses of 200 µm (FIG. 26A), 250 µm (FIG. 26B), and 300 µm (FIG. 26C). As can be appreciated, FIGS. 26A-26C represent dynamic portions having an increasing rigidity.

As the as-fabricated thickness of the dynamic portion increased, the internal forces increased, and the gap height increased. The silicone hydrogel lenses had a modulus of 0.76 MPa, a lens diameter of 14.5 mm, a dynamic portion diameter of 3 mm, and a base curvature of 8.9. For each dynamic portion thickness, the as-fabricated SAG height was varied from 50 µm to 250 µm.

Example 9

Dynamic Lens with Peripheral Ridges

Figure 27:
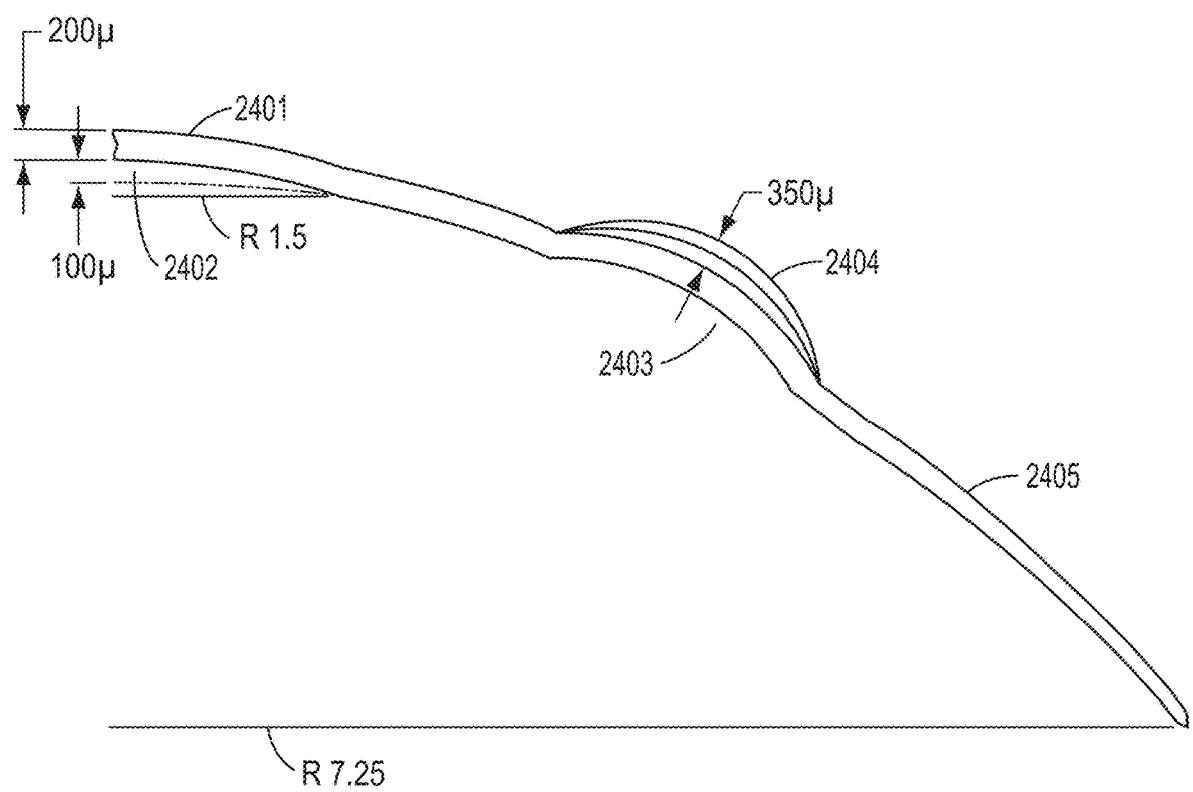
FIG. 27 shows a cross-section of a portion of a dynamic contact lens having a fluid reservoir and a ridge overlying the fluid reservoir.

A schematic of a cross-sectional view of a dynamic contact lens having a ridge on the anterior surface of the peripheral portion is shown in FIG. 27. The dynamic lens had a diameter of 14.5 mm, a center thickness of 200 µm, a pre-fabricated SAG of 200 µm, the diameter of the dynamic portion was 3 mm, and the peripheral ridge had an elevation of 350 µm and a total thickness including the thickness of the peripheral portion of 550 µm. The dynamic lens shown in FIG. 27 includes a dynamic portion 2401 with a thickness of 200 µm and an as-fabricated SAG height 2402 of 100 µm, a cavity 2403 in the peripheral portion 2405, and a protrusion 2404 with various thicknesses up to 350 µm overlying the cavity 2403.

Figure 28:
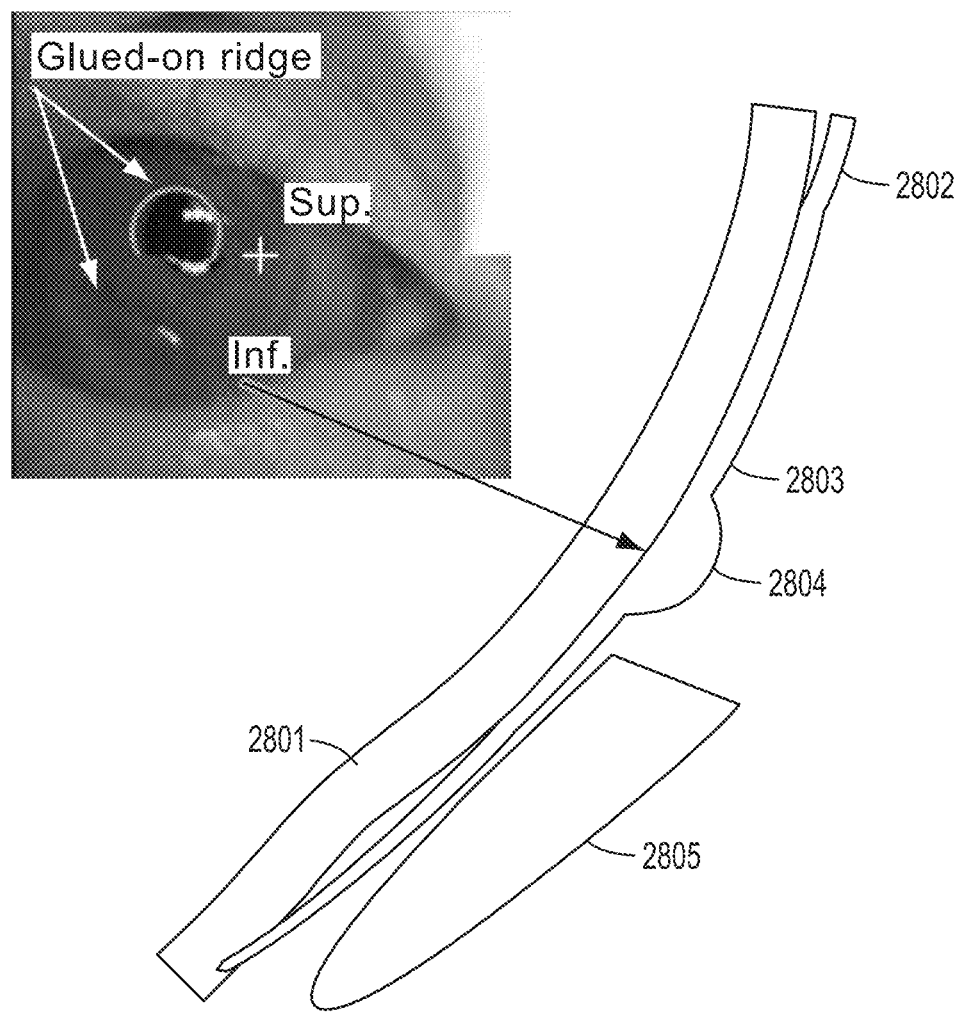
FIG. 28 shows (1) a photograph of a dynamic lens having a glued-on ridge on an eye (upper left), and (2) a schematic cross-section of a portion of a dynamic contact lens having a ridge on the anterior surface of the dynamic contact lens (lower right).

A photograph of the lens placed over an eye is shown in FIG. 28. FIG. 28 shows a photograph of a dynamic contact lens with a glued-on ridge on an eye (upper left), and a schematic cross-sectional view (lower right) of the dynamic lens on a cornea 2801 including the dynamic portion 2802, the peripheral portion 2803, the ridge 2804, and eyelid 2805.

Figure 29:
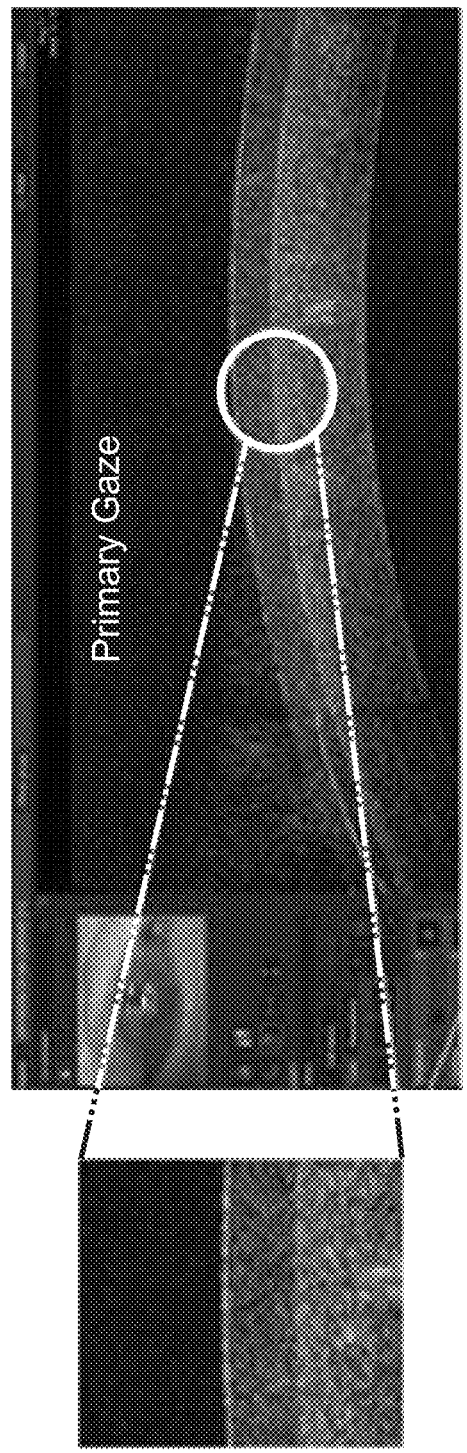
FIG. 29 shows an OCT image of cross-sections of a dynamic contact lens having a ridge on a cornea with primary (forward) gaze.
Figure 30:
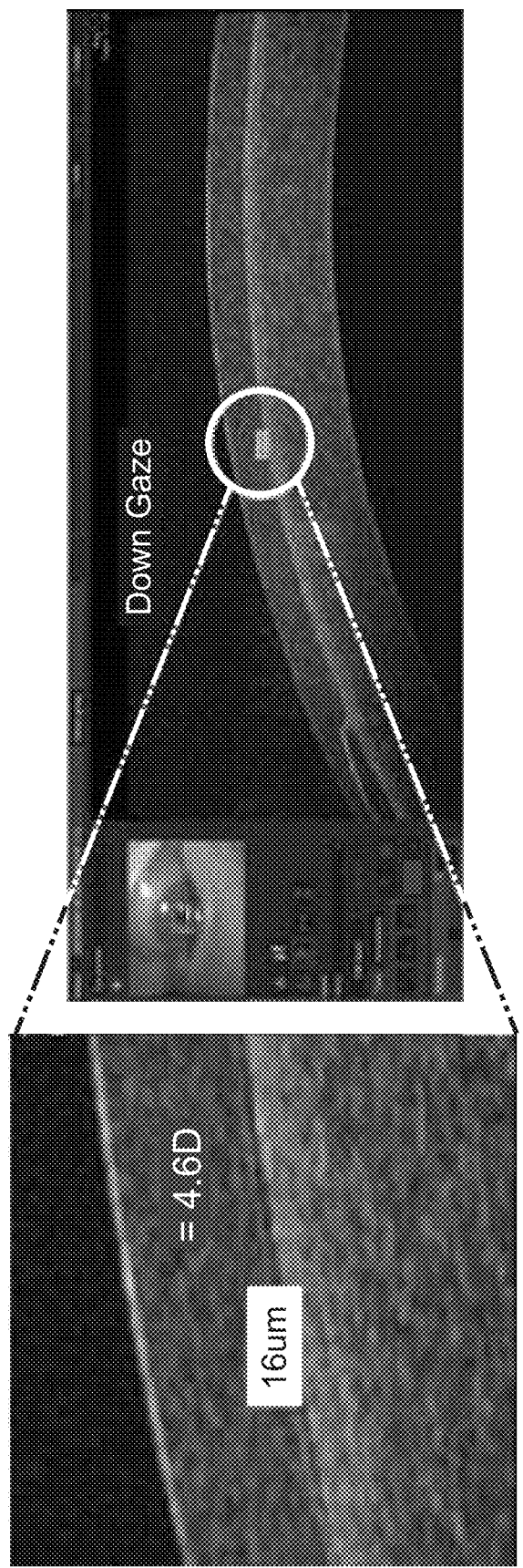
FIG. 30 shows an OCT image of cross-sections of a dynamic contact lens having a ridge on a cornea with down gaze.
Figure 31:
FIG. 31 shows an OCT image of a dynamic contact lens with an as-fabricated ridge having a width of about 500 microns on a cornea during down gaze with a gap height of 38 microns.

The dynamic lens with a peripheral ridge was placed over a human eye and imaged by OCT during primary (forward) gaze (FIG. 29) and during downward gaze (FIG. 30). During primary gaze the dynamic portion conformed to the cornea and during downward gaze the dynamic portion bulged outward to form a tear lens with a gap height of 16 µm. In another example, as shown in FIG. 31, for a dynamic lens with an as-fabricated ridge, the gap of the tear lens was 38 µm.

Example 10

Dynamic Lens with Flattened Periphery

A dynamic lens was fabricated having the following parameters: material type: SH65 silicone hydrogel; material modulus: 200 MPa; center thickness (CT): 200 µm; R0-OZ optical zone: 1.5 µm; SAG (bulge gap): 110 µm; R1 (near peripheral zone) 4.5 µm; BC1 (near periphery BC): 8.9 µm; R2 (total lens diameter: 14.5 mm; BC2 (far periphery BC): 11 µm; transition radius (rounded corner between OZ and near periphery, 0=sharp corner): 1 µm; and edge shape: chisel. In this dynamic lens, the radius of curvature of the peripheral portion is greater (flatter profile) than other dynamic lenses.

Figure 32:
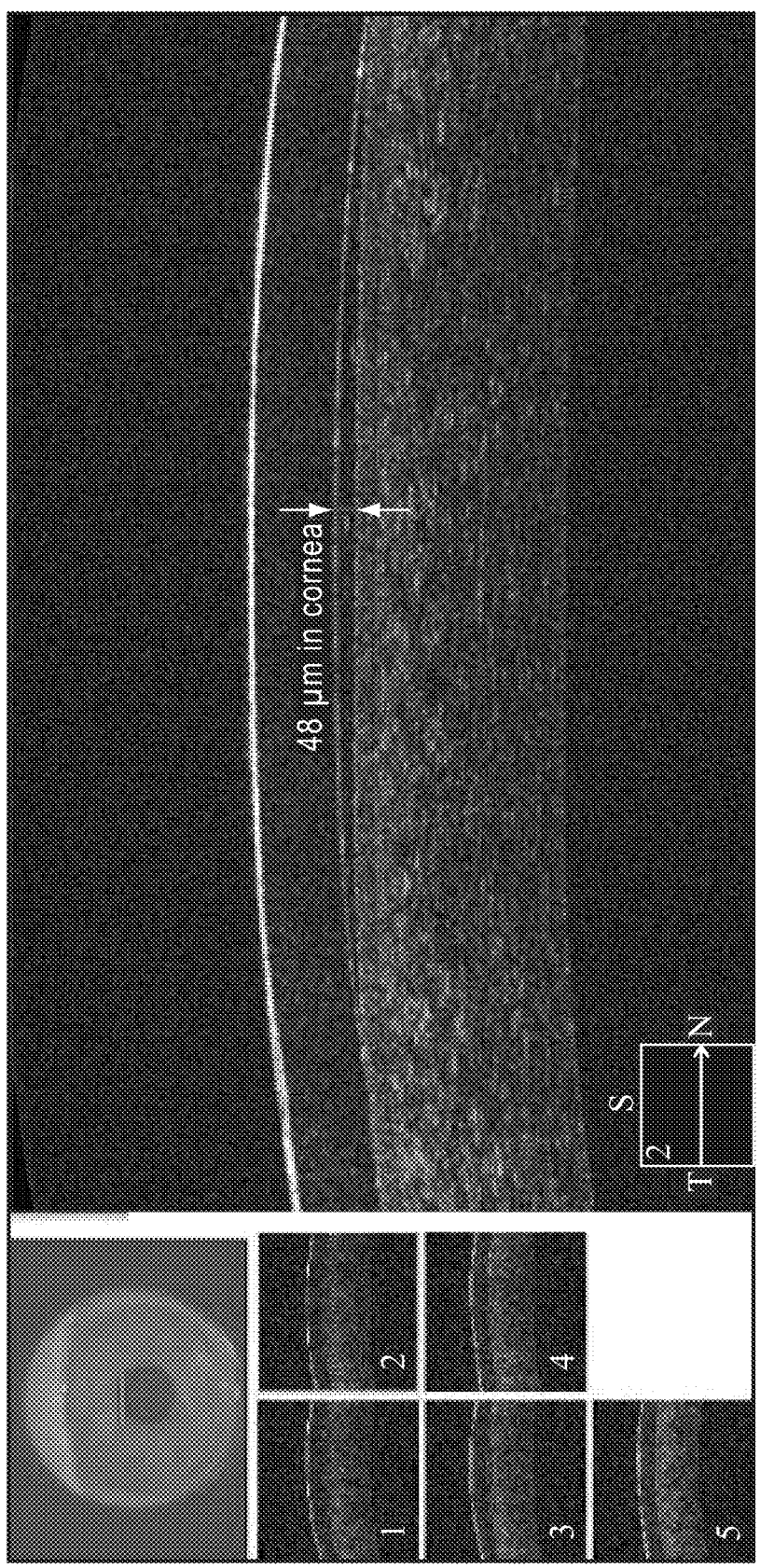
FIG. 32 shows an OCT image of a dynamic contact les having a flattened peripheral profile with a base curve of 11 mm overlying a cornea.

FIG. 32 shows that flattening the peripheral profile to a base curve of 11 mm resulted in an increased gap between the posterior surface of the dynamic portion and the cornea.

Example 11

Dynamic Contact Lens Design

In general, the structure of a dynamic lens is based on a nominal lens geometry design that is common in the field of soft contact lenses, such that at least the peripheral portion conforms to the cornea to enable both comfort and fluid flow under the lens.

A nominal dynamic contact lens can have an average back optic zone radius (BOZR) similar to the cornea front curvature (7 mm to 9 mm) that can be uniform (same BOZR for all lens diameters such as, for example, 8.9 mm) or a different BOZR for different lens diameters to facilitate the ability of the lens to conform the corneal/scleral asperity.

A nominal dynamic lens can have, for example, two peripheral curvatures, a central BOZR of 7.86 mm (+−1.5 mm) for a central diameter of 10 mm (+−1.5 mm) and a flatter BOZR in the periphery of 9.3 mm (+−1.5 mm). The transition between the two BOZR curvatures can be smoothed by a continuous gradual change or can employ a fillet. A dynamic lens can have a standard diameter (~14 mm), fabricated with standard soft contact lens material such as a silicone hydrogel and can have a standard optical transparency. A dynamic contact lens can have a standard edge, such as a rounded edge or a chiselled edge.

The diameter of the dynamic portion of a dynamic lens can be, for example, from 1 mm to 7 mm, such as from 2 mm to 4 mm. The dynamic lens can be fabricated such that the profile is characterized by different curvatures. For example, the central dynamic portion can be fabricated with a steeper base curve, such as a bulge, such that the SAG height between the center of the dynamic portion and the surface of the surrounding curvature is from 10 µm to 200 µm. The transition zone between the two curvatures, i.e., between the curvature of the dynamic portion and the peripheral portion may be smoothed by one or more transition curvatures or fillet to eliminate or to minimize local pressure points and to facilitate fluid exchange with the tear lens underlying the dynamic portion. The parameters that facilitate the ability of the dynamic portion to deform include, for example, the thickness, the material modulus, the general lens geometry, the area and diameter of the dynamic portion and the base curve of the dynamic portion.

The transition zone between the dynamic portion and the peripheral portion may be notched with grooves having a width, for example, from 50 µm to 1,000 µm, on the posterior surface of the lens (to release pressure from the dynamic portion and to allow fluid availability). The grooves can cross the transitional zone between the dynamic portion and the surrounding peripheral portion. The number of grooves, for example, can range from 1 to 12 and the length of the grooves can range, for example, from 0.5 mm to the lens edge of the dynamic lens (~7 mm).

One or more of the grooves can be connected to a cavity, to one or more fenestrations, or to both a cavity and one or more fenestrations.

Assuming a cornea with a central curvature of 7.6 mm a tear lens with a power of 4 Diopters will require a SAG of 14 µm over an optic zone of 3 mm in diameter or a SAG of 26 µm for an optic zone of 4 mm in diameter or 41 µm for an optic zone of 5 mm.

Table 1 shows the calculated optical power resulting from different fabricated SAG heights of 40 µm or 100 µm, for optical zones having diameters from 3 mm to 5.8 mm, assuming that the tear lens gap is equivalent to the as-fabricated SAG height.

TABLE 1

| Calculated optical power. Fabricated Lens Parameters | | | | | | | | |
|---|---|---|---|---|---|---|---|---|
| OZ Fabricated SAG, µm | 40 | 100 | 40 | 100 | 40 | 100 | 40 | 100 |
| R2, mm | 6.19 | 4.72 | 6.84 | 5.76 | 7.20 | 6.40 | 7.37 | 6.75 |
| Optical Power, Diopter | 11.32 | 27.87 | 6.23 | 15.36 | 3.87 | 9.55 | 2.79 | 6.89 |
| Focus Distance, mm | 8.8 | 3.6 | 16.1 | 6.5 | 25.9 | 10.5 | 35.8 | 14.5 |
| Tear Lens Volume, µL | 0.14 | 0.36 | 0.26 | 0.64 | 0.40 | 1.01 | 0.55 | 1.38 |

Aspects of the Invention

Aspect 1A. A contact lens comprising a dynamic portion, wherein the dynamic portion comprises: a conforming configuration configured to provide a first optical power to an eye having a cornea; and at least one non-conforming configuration configured to provide a second optical power to the eye, wherein the second optical power is different than the first optical power.

Aspect 2A. The contact lens of aspect 1A, wherein, the contact lens comprises a center geometric axis; and the dynamic portion is disposed at the center geometric axis, para-central to the center geometric axis, off the center geometric axis, or a combination of any of the foregoing.

Aspect 3A. The contact lens of any one of aspects 1A to 2A, wherein the conforming configuration is configured to substantially conform to the cornea.

Aspect 4A. The contact lens of any one of aspects 1A to 3A, wherein the conforming configuration is configured to adhere to the cornea.

Aspect 5A. The contact lens of any one of aspects 1A to 4A, wherein the conforming configuration is configured to adhere to the cornea by capillary forces.

Aspect 6A. The contact lens of any one of aspects 1A to 5A, wherein the at least one non-conforming configuration comprises a single non-conforming configuration, one or more discrete non-conforming configurations, or a continuous range of non-conforming configurations.

Aspect 7A. The contact lens of any one of aspects 1A to 6A, wherein the at least one non-conforming configuration is configured to provide a tear lens between a posterior surface of the dynamic portion and an anterior surface of a cornea.

Aspect 8A. The contact lens of any one of aspects 1A to 7A, wherein the contact lens is configured such that when applied to the cornea, the dynamic portion assumes the conforming configuration for a first vision, and assumes the at least one non-conforming configuration for a second vision.

Aspect 9A. The contact lens of aspect 8A, wherein each of the first vision and the second vision independently comprises a distance vision, an intermediate vision, or a near vision.

Aspect 10A. The contact lens of any one of aspects 1A to 9A, further comprising at least one first mechanism configured to induce a change between the conforming configuration and the at least one non-conforming configuration; and at least one second mechanism configured to induce a change between the at least one non-conforming configuration and the conforming configuration.

Aspect 11A. The contact lens of aspect 10A, wherein, the at least one first mechanism, the at least one second mechanism, or both the at least one first mechanism and the at least one second mechanism comprise manipulating one or more tear fluid reservoirs; the one or more tear fluid reservoirs are disposed between a posterior surface of the dynamic portion and an anterior surface of the cornea; and the one or more tear fluid reservoirs are fluidly coupled to tear fluid between a posterior surface of the dynamic portion and the anterior surface of the cornea.

Aspect 12A. The contact lens of aspect 11A, wherein the one or more tear fluid reservoirs are disposed symmetrically around the dynamic portion.

Aspect 13A. The contact lens of aspect 11A, wherein the one or more tear fluid reservoirs are disposed non-symmetrically around the dynamic portion.

Aspect 14A. The contact lens of any one of aspects 1A to 13A, wherein at least some of the one or more tear fluid reservoirs are compressible.

Aspect 15A. The contact lens of any one of aspects 1A to 14A, wherein at least some of the one or more tear fluid reservoirs are compressible by a force within a range from 0.1 µm-force to 10 µm-force.

Aspect 16A. The contact lens of any one of aspects 1A to 15A, wherein, the one or more tear fluid reservoirs are configured to compress when pressure is applied by an eyelid; and the one or more tear fluid reservoirs are configured to expand when pressure is not applied by an eyelid.

Aspect 17A. The contact lens of any one of aspects 1A to 16A, wherein the one or more tear fluid reservoirs are configured to compress when pressure is applied by an eyelid, only during a gaze change.

Aspect 18A. The contact lens of any one of aspects 1A to 17A, wherein the one or more tear fluid reservoirs are contiguous with the dynamic portion.

Aspect 19A. The contact lens of aspect 10A, wherein the at least one first mechanism, the at least one second mechanism, or both the at least one first mechanism and the at least one second mechanism comprise exchanging tear fluid by compressing the dynamic portion or compressing the peripheral portion, when pressure is applied to the contact lens by an eyelid, during a gaze change.

Aspect 20A. The contact lens of aspect 10A, wherein the at least one first mechanism, the at least one second mechanism, or both the at least one first mechanism and the at least one second mechanism comprise protrusions on an anterior surface of the contact lens configured to interact with an eyelid.

Aspect 21A. The contact lens of any one of aspects 1A to 20A, further comprising an optical region, wherein the dynamic portion overlaps with at least a portion of the optical region.

Aspect 22A. The contact lens of any one of aspects 1A to 21A, further comprising a peripheral portion coupled to the dynamic portion, wherein the peripheral portion is configured to retain the contact lens on the cornea.

Aspect 23A. The contact lens of any one of aspects 1A to 22A, wherein, the dynamic portion comprises a first material characterized by a first modulus; and the peripheral portion comprises a second material characterized by a second modulus.

Aspect 24A. The contact lens of aspect 23A, wherein, the first material and the second material comprise the same material.

Aspect 25A. The contact lens of aspect 23A, wherein, the first material and the second material don not comprise the same material.

Aspect 26A. The contact lens of any one of aspects 1A to 25A, wherein, the first modulus is greater than the second modulus.

Aspect 27A. The contact lens of any one of aspects 1A to 25A, wherein, the first modulus is less than the second modulus.

Aspect 28A. The contact lens of any one of aspects 1A to 25A, wherein, the first modulus is the same as the second modulus.

Aspect 29A. The contact lens of any one of aspects 1A to 28A, wherein, the first modulus is within a range from 0.05 MPa to 10 MPa; and the second modulus is within a range from 0.05 MPa to 10 MPa.

Aspect 30A. The contact lens of any one of aspects 1A to 29A, wherein, the first modulus is within a range from 0.1 MPa to 2 MPa; and the second modulus is within a range from 0.1 MPa to 2 MPa.

Aspect 31A. The contact lens of any one of aspects 1A to 30A, wherein each of the first material and the second material independently comprises a silicone, a hydrogel, a silicone hydrogel, or a combination of any of the foregoing.

Aspect 32A. The contact lens of any one of aspects 1A to 31A, wherein the dynamic portion, in the at least one non-conforming configuration, comprises a center SAG height within a range from 5 μm to 300 μm, with respect to a base curvature of a posterior surface of the peripheral portion.

Aspect 33A. The contact lens of any one of aspects 1A to 32A, wherein the dynamic portion comprises a center thickness from 30 μm to 600 μm.

Aspect 34A. The contact lens of any one of aspects 1A to 33A, wherein, the contact lens comprises a posterior surface; and at least a portion of the posterior surface comprises a material, a surface treatment, or a combination thereof; selected to control capillary forces between at least a portion of the posterior surface of the contact lens and tear fluid, between the cornea and the tear fluid, between the posterior surface of the contact lens and the cornea, or a combination of any of the foregoing.

Aspect 35A. The contact lens of any one of aspects 1A to 34A, wherein, the first optical power does not provide a change in optical power to the eye; or the second optical power does not provide a change in optical power to the eye.

Aspect 36A. The contact lens of any one of aspects 1A to 35A, wherein, the conforming configuration provides a first change in optical power to the eye; and the at least one non-conforming configuration provides a second change in optical power to the eye, in addition to the first change in optical power.

Aspect 37A. The contact lens of any one of aspects 1A to 36A, wherein the conforming configuration and at least one of the at least one non-conforming configurations are quasi-stable.

Aspect 38A. The contact lens of any one of aspects 1A to 37A, wherein, the dynamic portion comprises a posterior surface and comprises a gap profile between the posterior surface and the cornea, wherein the gap profile comprises a maximum gap differential, wherein the maximum gap differential is the difference between a center gap height and a gap height at a perimeter of the dynamic portion; the conforming configuration comprises a first maximum gap differential; the non-conforming configuration comprises a second maximum gap differential; and the second maximum gap differential is greater than the first maximum gap differential.

Aspect 39A. The contact lens of any one of aspects 1A to 38A, wherein, the contact lens comprises an as-fabricated shape; and the contact lens, in one of the at least one non-conforming configurations, comprises the as-fabricated shape.

Aspect 40A. The contact lens of any one of aspects 1A to 39A, wherein, the contact lens comprises a peripheral portion comprising a peripheral posterior surface; the peripheral posterior surface comprises a peripheral base curvature; the dynamic portion comprises a dynamic posterior surface; the dynamic posterior surface comprises a dynamic base curvature; in the conforming configuration the dynamic base curvature is substantially the same as the peripheral base curvature; and in the at least one non-conforming configuration the dynamic base curvature deviates from the peripheral base curvature.

Aspect 41A. The contact lens of any one of aspects 1A to 40A, wherein, the cornea comprises a corneal curvature; the dynamic portion comprises a dynamic posterior surface; the dynamic posterior surface comprises a dynamic base curvature; and in the conforming configuration, the dynamic base curvature is substantially the same as the corneal curvature.

Aspect 42A. The contact lens of any one of aspects 1A to 41A, wherein, the contact lens comprises a peripheral portion comprising a peripheral posterior surface; the peripheral posterior surface comprises a peripheral base curvature; the dynamic portion comprises a center SAG height with respect to the peripheral base curvature; and the dynamic portion is configured to assume a first configuration characterized by a first center SAG height with respect to the peripheral base curvature and assume a second configuration characterized by a second center SAG height with respect to the peripheral base curvature, wherein the first center SAG height and the second center SAG height are different.

Aspect 43A. A contact lens, comprising: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

Aspect 44A. A contact lens, comprising: a dynamic portion comprising a dynamic posterior surface, wherein the dynamic posterior surface comprises a dynamic base curvature; a peripheral portion coupled to the dynamic portion, wherein the peripheral portion comprises a peripheral posterior surface; and the peripheral posterior surface comprises a peripheral base curvature; wherein, in a first configuration the dynamic base curvature is substantially the same as the peripheral base curvature; and in a second configuration the dynamic base curvature deviates from the peripheral base curvature.

Aspect 45A. A contact lens, comprising a dynamic portion comprising a dynamic posterior surface, wherein the dynamic posterior surface comprises a dynamic base curvature; wherein, in a first configuration the dynamic base curvature is substantially the same as a corneal curvature; and in a second configuration the dynamic base curvature deviates from the corneal curvature.

Aspect 46A. A contact lens, comprising: a peripheral portion comprising a peripheral posterior surface, wherein the peripheral posterior surface comprises a peripheral base curvature; and a dynamic portion coupled to the peripheral portion, wherein the dynamic portion comprises a center thickness, and a center SAG height with respect to the peripheral base curvature; wherein, the dynamic portion is configured to assume a first configuration characterized by a first center SAG height with respect to the peripheral base curvature and assume a second configuration characterized by a second center SAG height with respect to the peripheral base curvature, wherein, the first center SAG height and the second center SAG height are different; and the first configuration and the second configuration are quasi-stable.

Aspect 47A. A contact lens, comprising a dynamic portion comprising a posterior surface, wherein, the posterior surface comprises a dynamic base curvature; in a first configuration the posterior surface comprises a first base curvature; and in a second configuration the posterior surface comprises a second base curvature.

Aspect 48A. The contact lens of aspect 47A, wherein, the first configuration is configured to provide a first optical power to an eye having a cornea; and the second configuration is configured to provide a second optical power to the eye.

Aspect 49A. The contact lens of any one of aspects 47A to 48A, wherein the first base curvature is substantially the same as a corneal curvature.

Aspect 50A. The contact lens of any one of aspects 47A to 49A, further comprising at least one first mechanism configured to induce a change between the first configuration and the second configuration; and at least one second mechanism configured to induce a change between the second configuration and the first configuration.

Aspect 51A. A contact lens, comprising: a dynamic portion, wherein the dynamic portion comprises: at least one first non-conforming configuration configured to provide a first optical power to an eye having a cornea; and at least one second non-conforming configuration configured to provide a second optical power to the eye, wherein the second optical power is different than the first optical power; at least one first mechanism configured to induce a change between the first non-conforming configuration and the at least one second non-conforming configuration; and at least one second mechanism configured to induce a change between the at least one second non-conforming configuration and the at least one first non-conforming configuration.

Aspect 52A. A contact lens, comprising: a first portion comprising a first posterior surface, a first anterior surface opposite the first posterior surface, and a first material, wherein, the first posterior surface comprises a first radius of curvature; and the first material comprises a first modulus; and a second portion coupled to the first portion, wherein the second portion comprises a second posterior surface and a second anterior surface opposite the second posterior surface, and a second material, wherein, the second posterior surface comprises a second radius of curvature; and the second material comprises a second modulus; and wherein the first radius of curvature is less than the second radius of curvature; and wherein each of the first modulus and the second modulus is within a range from 0.05 MPa to 10 MPa.

Aspect 53A. The contact lens of aspect 52A, wherein, the first portion is configured to provide a tear lens when applied to an eye; and the second portion configured to retain the contact lens on a cornea.

Aspect 54A. The contact lens of any one of aspects 52A to 53A, wherein each of the first modulus and the second modulus is within a range from 0.05 MPa to 3 MPa.

Aspect 55A. The contact lens of any one of aspects 52A to 54A, wherein the first portion comprises a center SAG height within a range from 5 µm to 300 µm, with respect to the second radius of curvature of a posterior surface of the peripheral portion.

Aspect 56A. A contact lens, comprising: a first portion comprising a first posterior surface, a first anterior surface opposite the first posterior surface, and a first material, wherein the first material comprises a first modulus; and a peripheral portion coupled to the first portion, wherein the peripheral portion comprises: a peripheral posterior surface having a base curvature, and the second material comprises a second modulus; and wherein the first posterior surface bulges anteriorly from the base curvature of the posterior surface of the peripheral portion; and wherein each of the first modulus and the second modulus is within a range from 0.05 MPa to 10 MPa.

Aspect 57A. The contact lens of aspect 56A, wherein each of the first modulus and the second modulus is within a range from 0.05 MPa to 3 MPa.

Aspect 58A. The contact lens of any one of aspects 56A to 57A, wherein the first portion comprises a center SAG height within a range from 5 µm to 300 µm, with respect to the base curvature of the posterior surface of the peripheral portion.

Aspect 59A. A method of correcting vision of a patient comprising applying the contact lens of any one of aspects 1A to 51A to an eye of a patient in need of corrected vision.

Aspect 60A. The method of aspect 59A, wherein correcting vision comprises correcting hyperopia, correcting myopia, correcting astigmatism, or correcting presbyopia.

Aspect 61A. The method of aspect 59A, wherein correcting vision comprises delaying progression of myopia.

Aspect 62A. A method of treating presbyopia comprising applying the contact lens of any one of aspects 1A to 51A to a presbyopic eye of a patient.

Aspect 63A. A method of correcting vision of a patient comprising applying the contact lens of any one of aspects 52A to 58A to an eye of a patent in need of such treatment.

Aspect 64A. The method of aspect 63A, wherein connecting vision comprises treating an irregular cornea or astigmatism.

Aspect 65A. A method of treating an eye of a patient following ocular therapy comprising applying a contact lens of any one of aspects 52A to 58A to an eye of a patent in need of such treatment.

Aspect 66A. A method of healing a trauma wound to a cornea of an eye of a patient comprising applying a contact lens of any one of aspects 52A to 58A to an eye of a patent in need of such healing.

Aspect 67A. A method of protecting an eye of a patient from a potential injury comprising applying a contact lens of any one of aspects 52A to 58A to an eye of a patent in need of such protection.

Aspect 68A. A method of fabricating a contact lens, comprising molding a material to provide a contact lens comprising: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

Aspect 1. A dynamic contact lens comprising: a dynamic portion comprising a dynamic posterior surface and a dynamic anterior surface opposite the dynamic posterior surface; a peripheral portion comprising a peripheral posterior surface, a peripheral anterior surface opposite the peripheral posterior surface, and a transition zone coupling the peripheral portion and the dynamic portion; wherein the dynamic portion comprises: a material having a Young's modulus within a range from 0.05 MPa to 10 MPa; and an as-fabricated center SAG height from 10 μm to 300 μm.

Aspect 2. The dynamic contact lens of aspect 1, wherein the dynamic contact lens is configured to produce a tear lens for correcting vision when applied to a cornea.

Aspect 3. The dynamic contact lens of any one of aspects 1 to 2, wherein when the dynamic contact lens is applied to a cornea, the dynamic portion can assume two or more quasi-stable configurations, wherein the two or more quasi-stable configurations are characterized by a different gap between the center dynamic posterior surface and the cornea.

Aspect 4. The dynamic contact lens of any one of aspects 1 to 3, wherein the dynamic portion has a diameter from 2.5 mm to 7 mm.

Aspect 5. The dynamic contact lens of any one of aspects 1 to 4, wherein the dynamic posterior surface has a radius of curvature from 3 mm to 7.5 mm.

Aspect 6. The dynamic contact lens of any one of aspects 1 to 5, wherein the dynamic portion has a substantially uniform thickness.

Aspect 7. The dynamic contact lens of any one of aspects 1 to 6, wherein the dynamic portion has a substantially uniform thickness from 20 μm to 300 μm.

Aspect 8. The dynamic contact lens of any one of aspects 1 to 7, wherein the transition zone is configured facilitate flow of tear fluid to a tear lens formed between the dynamic posterior surface and a cornea when applied to an eye.

Aspect 9. The dynamic contact lens of any one of aspects 1 to 8, wherein the transition zone comprises features configured to enhance the flexibility of the dynamic portion.

Aspect 10. The dynamic contact lens of aspect 9, wherein the features comprise smooth edges, a thinned cross-sectional thickness, grooves, or a combination of any of the foregoing.

Aspect 11. The dynamic contact lens of any one of aspects 1 to 10, wherein the dynamic contact lens comprises one or more channels in the peripheral posterior surface extending from the dynamic portion.

Aspect 12. The dynamic contact lens of aspect 11, wherein each of the one or more channels extend radially from the dynamic portion.

Aspect 13. The dynamic contact lens of any one of aspects 11 to 12, wherein the one or more channels comprises from 3 to 20 channels.

Aspect 14. The dynamic contact lens of any one of aspects 11 to 13, wherein each of the one or more channels has a width from 100 μm to 1,000 μm, and a height from 50 μm to 200 μm.

Aspect 15. The dynamic contact lens of any one of aspects 11 to 14, wherein each of the one or more channels has a length from 1 mm to 7 mm.

Aspect 16. The dynamic contact lens of any one of aspects 11 to 15, wherein at least one of the channels is coupled to one or more fenestrations extending from the peripheral anterior surface.

Aspect 17. The dynamic contact lens of aspect 16, wherein the one or more fenestrations has a diameter from 200 μm to 600 μm.

Aspect 18. The dynamic contact lens of any one of aspects 1 to 17, further comprising one or more cavities in the peripheral posterior surface.

Aspect 19. The dynamic contact lens of aspect 18, wherein the peripheral posterior surface comprises from 3 to 12 cavities.

Aspect 20. The dynamic contact lens of any one of aspects 18 to 19, wherein each of the one or more cavities independently has a depth below the posterior peripheral surface from 10 μm to 500 μm.

Aspect 21. The dynamic contact lens of any one of aspects 1 to 20, further comprising one or more protrusions overlying the peripheral anterior surface.

Aspect 22. The dynamic contact lens of aspect 21, wherein the peripheral anterior surface comprises from 3 to 12 protrusions.

Aspect 23. The dynamic contact lens of any one of aspects 21 to 22, wherein each of the one or more protrusions independently has a height above the anterior peripheral surface from 10 μm to 200 μm.

Aspect 24. A dynamic contact lens comprising: a peripheral portion, a dynamic portion coupled to the peripheral portion, wherein the dynamic portion comprises: a conforming configuration configured to provide a first optical power to an eye having a cornea; and at least one non-conforming configuration configured to provide a second optical power to the eye, wherein the second optical power is different than the first optical power.

Aspect 25. The dynamic contact lens of aspect 24, wherein, when applied to the eye, in the conforming configuration the dynamic portion substantially conforms to the anterior surface of the cornea; and in the non-conforming configuration the dynamic portion does not conform to the anterior surface of the cornea.

Aspect 26. The dynamic contact lens of any one of aspects 24 to 25, wherein the conforming configuration and the non-conforming configuration are quasi-stable.

Aspect 27. The dynamic contact lens of any one of aspects 24 to 26, wherein, the dynamic contact lens comprises a center geometric axis; and the dynamic portion is disposed at the center geometric axis, para-central to the center geometric axis, off the center geometric axis, or a combination of any of the foregoing.

Aspect 28. The dynamic contact lens of any one of aspects 24 to 27, wherein, when applied to an eye, in the conforming configuration the dynamic portion substantially conforms to the cornea.

Aspect 29. The dynamic contact lens of any one of aspects 24 to 28, wherein, when applied to an eye, in the conforming configuration the dynamic portion adheres to the cornea.

Aspect 30. The dynamic contact lens of any one of aspects 24 to 29, wherein, when applied to an eye, in the conforming configuration the dynamic portion adheres to the cornea by capillary forces.

Aspect 31. The dynamic contact lens of any one of aspects 24 to 30, wherein, when applied to an eye, in the conforming configuration to the dynamic portion adheres to the cornea by mechanical forces.

Aspect 32. The dynamic contact lens of any one of aspects 24 to 31, wherein the at least one non-conforming configuration comprises a single non-conforming configuration, one or more discrete non-conforming configurations, or a continuous range of non-conforming configurations.

Aspect 33. The dynamic contact lens of any one of aspects 24 to 32, wherein the at least one non-conforming configuration is configured to provide a tear lens between a posterior surface of the dynamic portion and an anterior surface of a cornea.

Aspect 34. The dynamic contact lens of any one of aspects 24 to 33, wherein the dynamic contact lens is configured such that when applied to the cornea, the dynamic portion assumes the conforming configuration for a first vision, and assumes the at least one non-conforming configuration for a second vision.

Aspect 35. The dynamic contact lens of aspect 34, wherein each of the first vision and the second vision independently comprises a distance vision, an intermediate vision, or a near vision.

Aspect 36. The dynamic contact lens of any one of aspects 24 to 35, further comprising: at least one first feature configured to induce a change between the conforming configuration and the at least one non-conforming configuration; wherein the at least one comprises an as-fabricated geometry of the dynamic portion.

Aspect 37. The dynamic contact lens of aspect 36, wherein the geometry of the dynamic portion comprises a bulge extending anteriorly from the peripheral portion.

Aspect 38. The dynamic contact lens of any one of aspects 24 to 37, further comprising: at least one first feature configured to induce a change between the conforming configuration and the at least one non-conforming configuration; and at least one second feature configured to induce a change between the at least one non-conforming configuration and the conforming configuration.

Aspect 39. The dynamic contact lens of aspect 38, wherein each of the first feature and the second feature are configured to induce a change in configuration by pressure applied by an eyelid.

Aspect 40. The dynamic contact lens of aspect 39, wherein pressure applied by an eyelid comprises gazing downward, normal blinking, intentional blinking, holding the eyelids closed for a period of time, or squeezing the eyelids against the eye for a period of time.

Aspect 41. The dynamic contact lens of any one of aspects 38 to 40, wherein the at least one first feature and the at least one second feature are the same feature.

Aspect 42. The dynamic contact lens of aspect 24, further comprising at least one feature configured to induce a change in configuration by pressure applied by an eyelid.

Aspect 43. The dynamic contact lens of aspect 42, wherein the at least one feature comprises one or more protrusions on the anterior surface of the dynamic contact lens.

Aspect 44. The dynamic contact lens of aspect 43, wherein the one or more protrusions has a height with respect to the anterior surface within a range from 10 µm to 200 µm.

Aspect 45. The dynamic contact lens of any one of aspects 43 to 44, wherein the one or more protrusions is disposed over an underlying cavity in the posterior surface of the dynamic contact lens.

Aspect 46. The dynamic contact lens of any one of aspects 43 to 44, wherein the one or more protrusions comprises one or more ridges.

Aspect 47. The dynamic contact lens of any one of aspects 42 to 46, wherein the at least one feature comprises one or more features configured to increase friction.

Aspect 48. The dynamic contact lens of aspect 47, wherein the one or more features configured to increase friction comprises, grooves, depressions, fenestrations, ridges, or a combination of any of the foregoing.

Aspect 49. The dynamic contact lens of any one of aspects 38 to 49, wherein, the at least one first feature, the at least one feature mechanism, or both the at least one first feature and the at least one second feature comprise one or more tear fluid reservoirs; the one or more tear fluid reservoirs are disposed between a posterior surface of the dynamic portion and an anterior surface of the cornea; and the one or more tear fluid reservoirs are fluidly coupled to tear fluid between a posterior surface of the dynamic portion and the anterior surface of the cornea.

Aspect 50. The dynamic contact lens of aspect 49, wherein the one or more tear fluid reservoirs are disposed symmetrically around the dynamic portion.

Aspect 51. The dynamic contact lens of aspect 49, wherein the one or more tear fluid reservoirs are disposed non-symmetrically around the dynamic portion.

Aspect 52. The dynamic contact lens of any one of aspects 49 to 51, wherein at least some of the one or more tear fluid reservoirs are compressible.

Aspect 53. The dynamic contact lens of any one of aspects 49 to 52, wherein at least some of the one or more tear fluid reservoirs are compressible by a force within a range from 0.1 µm-force to 10 µm-force.

Aspect 54. The dynamic contact lens of any one of aspects 49 to 53, wherein, the one or more tear fluid reservoirs are configured to compress when pressure is applied by an eyelid; and the one or more tear fluid reservoirs are configured to expand when pressure is not applied by an eyelid.

Aspect 55. The dynamic contact lens of any one of aspects 49 to 54, wherein the one or more tear fluid reservoirs are configured to compress when pressure is applied by an eyelid, only during a gaze change.

Aspect 56. The dynamic contact lens of any one of aspects 49 to 55, wherein the one or more tear fluid reservoirs are fluidly coupled to the dynamic portion.

Aspect 57. The dynamic contact lens of any one of aspects 36 to 56, wherein the at least one first feature, the at least one second feature, or both the at least one first feature and the at least one second mechanism comprise exchanging tear fluid by compressing the dynamic portion or compressing the peripheral portion, when pressure is applied to the dynamic contact lens by an eyelid, during a gaze change.

Aspect 58. The dynamic contact lens of any one of aspects 36 to 56, wherein the at least one first feature, the at least one second feature, or both the at least one first feature and the at least one second feature comprise protrusions on an anterior surface of the dynamic contact lens configured to interact with an eyelid.

Aspect 59. The dynamic contact lens of any one of aspects 24 to 58, further comprising an optical region, wherein the dynamic portion overlaps with at least a portion of the optical region.

Aspect 60. The dynamic contact lens of any one of aspects 24 to 59, wherein the peripheral portion is configured to retain the dynamic contact lens on the cornea.

Aspect 61. The dynamic contact lens of any one of aspects 24 to 60, wherein, the dynamic portion comprises a first material characterized by a first Young's modulus; and the peripheral portion comprises a second material characterized by a second Young's modulus.

Aspect 62. The dynamic contact lens of aspect 61, wherein, the first material and the second material comprise the same material.

Aspect 63. The dynamic contact lens of aspect 61, wherein, the first material and the second material comprise different materials.

Aspect 64. The dynamic contact lens of any one of aspects 61 and 63, wherein, the first modulus is greater than the second Young's modulus.

Aspect 65. The dynamic contact lens of any one of aspects 61 and 63, wherein, the first modulus is less than the second Young's modulus.

Aspect 66. The dynamic contact lens of aspect 61, wherein, the first modulus is the same as the second Young's modulus.

Aspect 67. The dynamic contact lens of aspect 61, wherein, the first Young's modulus is within a range from 0.05 MPa to 10 MPa; and the second Young's modulus is within a range from 0.05 MPa to 10 MPa.

Aspect 68. The dynamic contact lens of aspect 61, wherein, the first Young's modulus is within a range from 0.1 MPa to 2 MPa; and the second Young's modulus is within a range from 0.1 MPa to 2 MPa.

Aspect 69. The dynamic contact lens of any one of aspects 61 to 68, wherein each of the first material and the second material independently comprises a silicone, a hydrogel, a silicone hydrogel, or a combination of any of the foregoing.

Aspect 70. The dynamic contact lens of any one of aspects 24 to 69, wherein the dynamic portion, in the at least one non-conforming configuration, comprises a center gap height within a range from 5 μm to 300 μm, with respect to a base curvature of a posterior surface of the peripheral portion.

Aspect 71. The dynamic contact lens of any one of aspects 24 to 70, wherein the dynamic portion comprises a center thickness from 30 μm to 600 μm.

Aspect 72. The dynamic contact lens of any one of aspects 24 to 71, wherein, the dynamic contact lens comprises a posterior surface; and at least a portion of the posterior surface comprises a material, a surface treatment, or a combination thereof; selected to control capillary forces between at least a portion of the posterior surface of the dynamic contact lens and tear fluid, between the cornea and the tear fluid, between the posterior surface of the dynamic contact lens and the cornea, or a combination of any of the foregoing.

Aspect 73. The dynamic contact lens of any one of aspects 24 to 72, wherein, the first optical power does not provide a change in optical power to the eye; or the second optical power does not provide a change in optical power to the eye.

Aspect 74. The dynamic contact lens of any one of aspects 24 to 73, wherein, the conforming configuration provides a first change in optical power to the eye; and the at least one non-conforming configuration provides a second change in optical power to the eye, in addition to the first change in optical power.

Aspect 75. The dynamic contact lens of any one of aspects 24 to 74, wherein the conforming configuration and at least one of the non-conforming configurations are quasi-stable.

Aspect 76. The dynamic contact lens of any one of aspects 24 to 75, wherein, the dynamic portion comprises a posterior surface and comprises a gap profile between the posterior surface and the cornea, wherein the gap profile comprises a maximum gap differential, wherein the maximum gap differential is the difference between a center gap height and a gap height at a perimeter of the dynamic portion; the conforming configuration comprises a first maximum gap differential; the non-conforming configuration comprises a second maximum gap differential; and the second maximum gap differential is greater than the first maximum gap differential.

Aspect 77. The dynamic contact lens of any one of aspects 24 to 76, wherein, the dynamic contact lens comprises an as-fabricated shape; and the dynamic contact lens, in one of the non-conforming configurations, comprises the as-fabricated shape.

Aspect 78. The dynamic contact lens of any one of aspects 24 to 77, wherein, the dynamic contact lens comprises a peripheral portion comprising a peripheral posterior surface; the peripheral posterior surface comprises a peripheral base curvature; the dynamic portion comprises a dynamic posterior surface; the dynamic posterior surface comprises a dynamic base curvature; in the conforming configuration the dynamic base curvature is substantially the same as the peripheral base curvature; and in the at least one non-conforming configuration the dynamic base curvature deviates from the peripheral base curvature.

Aspect 79. The dynamic contact lens of any one of aspects 24 to 78, wherein, the cornea comprises a corneal curvature; the dynamic portion comprises a dynamic posterior surface; the dynamic posterior surface comprises a dynamic base curvature; and in the conforming configuration, the dynamic base curvature is substantially the same as the corneal curvature.

Aspect 80. The dynamic contact lens of any one of aspects 24 to 79, wherein, the dynamic contact lens comprises a peripheral portion comprising a peripheral posterior surface; the peripheral posterior surface comprises a peripheral base curvature; the dynamic portion comprises a center SAG height with respect to the peripheral base curvature; and the dynamic portion is configured to assume a first configuration characterized by a first center gap height with respect to the peripheral base curvature and assume a second configuration characterized by a second center gap height with respect to the peripheral base curvature, wherein the first center SAG height and the second center gap height are different.

Aspect 81. A dynamic contact lens, comprising: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

Aspect 82. A dynamic contact lens, comprising: a dynamic portion comprising a dynamic posterior surface, wherein the dynamic posterior surface comprises a dynamic base curvature; a peripheral portion coupled to the dynamic portion, wherein the peripheral portion comprises a peripheral posterior surface; and the peripheral posterior surface comprises a peripheral base curvature; wherein, in a first configuration the dynamic base curvature is substantially the same as the peripheral base curvature; and in a second configuration the dynamic base curvature deviates from the peripheral base curvature.

Aspect 83. A dynamic contact lens, comprising a dynamic portion, wherein, the dynamic portion comprises a dynamic posterior surface; the dynamic posterior surface comprises a dynamic base curvature; in a first configuration the dynamic base curvature is substantially the same as a corneal curvature; and in a second configuration the dynamic base curvature deviates from the corneal curvature.

Aspect 84. A dynamic contact lens, comprising: a peripheral portion, wherein the peripheral portion comprises a peripheral posterior surface, wherein the peripheral posterior surface comprises a peripheral base curvature; and a dynamic portion coupled to the peripheral portion, wherein the dynamic portion comprises a center thickness, and a center SAG height with respect to the peripheral base curvature; wherein, the dynamic portion is configured to assume a first configuration characterized by a first center gap height with respect to the peripheral base curvature and assume a second configuration characterized by a second center gap height with respect to the peripheral base curvature, wherein, the first center gap height and the second center gap height are different; and the first configuration and the second configuration are quasi-stable.

Aspect 85. A dynamic contact lens, comprising a dynamic portion comprising a posterior surface, wherein, the posterior surface comprises a dynamic base curvature; in a first configuration the posterior surface comprises a first base curvature; and in a second configuration the posterior surface comprises a second base curvature.

Aspect 86. The dynamic contact lens of aspect 85, wherein the first configuration is configured to provide a first optical power to an eye; and the second configuration is configured to provide a second optical power to the eye.

Aspect 87. The dynamic contact lens of any one of aspects 85 to 86, wherein the first base curvature is substantially the same as a corneal curvature.

Aspect 88. The dynamic contact lens of any one of aspects 85 to 87, further comprising: at least one first mechanism configured to induce a change between the first configuration and the second configuration; and at least one second mechanism configured to induce a change between the second configuration and the first configuration.

Aspect 89. A dynamic contact lens, comprising: a dynamic portion, wherein the dynamic portion comprises: at least one first non-conforming configuration configured to provide a first optical power to an eye having a cornea; and at least one second non-conforming configuration configured to provide a second optical power to the eye, wherein the second optical power is different than the first optical power; at least one first mechanism configured to induce a change between the first non-conforming configuration and the at least one second non-conforming configuration; and at least one second mechanism configured to induce a change between the at least one second non-conforming configuration and the at least one first non-conforming configuration.

Aspect 90. A dynamic contact lens, comprising: a first portion comprising a first posterior surface, a first anterior surface opposite the first posterior surface, and a first material, wherein, the first posterior surface comprises a first radius of curvature; and the first material comprises a first Young's modulus; and a second portion coupled to the first portion, wherein the second portion comprises a second posterior surface and a second anterior surface opposite the second posterior surface, and a second material, wherein, the second posterior surface comprises a second radius of curvature; and the second material comprises a second Young's modulus; and wherein the first radius of curvature is less than the second radius of curvature; and wherein each of the first Young's modulus and the second Young's modulus independently within a range from 0.05 MPa to 10 MPa.

Aspect 91. The dynamic contact lens of aspect 90, wherein the first portion is configured to provide a tear lens when applied to an eye; and the second portion configured to retain the dynamic contact lens on a cornea.

Aspect 92. The dynamic contact lens of any one of aspects 90 to 91, wherein each of the first Young's modulus and the second Young's modulus is independently within a range from 0.05 MPa to 3 MPa.

Aspect 93. The dynamic contact lens of any one of aspects 90 to 92, wherein the first portion comprises a center SAG height within a range from 5 μm to 300 μm, with respect to the second radius of curvature of a posterior surface of the peripheral portion.

Aspect 94. A dynamic contact lens, comprising: a first portion comprising a first posterior surface, a first anterior surface opposite the first posterior surface, and a first material, wherein the first material comprises a first Young's modulus; and a peripheral portion coupled to the first portion, wherein the peripheral portion comprises: a peripheral posterior surface having a base curvature, and the second material comprises a second Young's modulus; and wherein the first posterior surface bulges anteriorly from the base curvature of the posterior surface of the peripheral portion; and wherein each of the first Young's modulus and the second Young's modulus is independently within a range from 0.05 MPa to 10 MPa.

Aspect 95. The dynamic contact lens of aspect 94, wherein each of the first Young's modulus and the second Young's modulus is independently within a range from 0.05 MPa to 3 MPa.

Aspect 96. The dynamic contact lens of any one of aspects 94 to 95, wherein the first portion comprises a center SAG height within a range from 5 μm to 300 μm, with respect to the base curvature of the posterior surface of the peripheral portion.

Aspect 97. A method of correcting vision of a patient comprising applying the dynamic contact lens of any one of aspects 1 to 96 to an eye of a patient in need of corrected vision.

Aspect 98. The method of aspect 97, wherein correcting vision comprises correcting hyperopia, correcting myopia, correcting astigmatism, or correcting presbyopia.

Aspect 99. The method of any one of aspects 97 to 98, wherein correcting vision comprises delaying progression of myopia.

Aspect 100. A method of treating presbyopia comprising applying the dynamic contact lens of any one of aspects 1 to 96 to a presbyopic eye of a patient.

Aspect 101. A method of correcting vision of a patient comprising applying the dynamic contact lens of any one of aspects 1 to 96 to an eye of a patent in need of such treatment.

Aspect 102. The method of aspect 101, wherein connecting vision comprises treating an irregular cornea or astigmatism.

Aspect 103. A method of treating an eye of a patient following ocular therapy comprising applying a dynamic contact lens of any one of aspects 1 to 96 to an eye of a patent in need of such treatment.

Aspect 104. A method of healing a trauma wound to a cornea of an eye of a patient comprising applying a dynamic contact lens of any one of aspects 1 to 96 to an eye of a patent in need of such healing.

Aspect 105. A method of protecting an eye of a patient from a potential injury comprising applying a dynamic contact lens of any one of aspects 1 to 96 to an eye of a patent in need of such protection.

Aspect 106. A method of fabricating a dynamic contact lens, comprising molding a material to provide a dynamic contact lens comprising: a peripheral portion comprising a peripheral posterior surface and a peripheral anterior surface, wherein the peripheral posterior surface comprises a peripheral base curvature; and a dynamic portion comprising a dynamic posterior surface and a dynamic anterior surface, wherein at least the dynamic posterior surface bulges away from the peripheral base curvature toward the dynamic anterior surface.

Aspect 107. The method of aspect 106, wherein the peripheral portion comprises a first material characterized by a first Young's modulus; and the dynamic portion comprises a second material characterized by a second Young's modulus; and wherein each of the first Young's modulus and the second Young's modulus is from 0.05 MPa to 30 MPa, Aspect 108. The method of any one of aspects 106 to 107, wherein each of the first Young's modulus and the second Young's modulus is from 0.1 MPa to 2 MPa, Aspect 109. A method of fabricating a dynamic contact lens comprising molding a material to provide a dynamic contact lens comprising: a dynamic portion characterized by a dynamic base curvature; and a peripheral portion coupled to the dynamic portion, wherein the peripheral portion comprises a peripheral base curvature, wherein the dynamic base curvature is different than the peripheral base curvature.

Aspect 110. The method of aspect 109, wherein a radius of the curvature of the dynamic portion is less than a radius of curvature of the peripheral portion.

Aspect 111. The method of any one of aspects 109 to 110, wherein a radius of curvature of the dynamic portion is less than a radius of curvature of a para-central peripheral portion, wherein the para-central peripheral portion adjoins the dynamic portion.

Aspect 112. A dynamic contact lens of any one of aspects 1 to 96 applied to a cornea.

There are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A dynamic contact lens comprising:
    a peripheral portion;
    one or more fenestrations disposed in the peripheral portion;
    an interior dynamic portion coupled to the peripheral portion, wherein the interior dynamic portion, when worn on an eye, is configured to form with the eye a cylindrically shaped tear lens, the interior dynamic portion assuming
        a conforming configuration configured to provide a first optical power to an eye; and
        at least one non-conforming configuration configured to provide a second optical power to the eye, wherein the second optical power is different than the first optical power;
    wherein the lens comprises a material having a Young's modulus from about 0.1 MPa to about 3 MPa; and
    wherein the lens is configured to correct an astigmatism when worn on the eye.

2. The dynamic contact lens of claim 1, further comprising:
    one or more fenestrations configured to facilitate flow of a fluid from an anterior surface of the lens to a posterior surface of the lens.

3. The dynamic contact lens of claim 2, further comprising:
    one or more channels in the posterior surface of the lens, wherein the one or more channels are fluidly coupled to the one or more fenestrations and configured facilitate flow of a fluid to the interior dynamic portion.

4. The dynamic contact lens of claim 1, further comprising:
    a transition zone coupling the peripheral portion and the interior dynamic portion, the transition zone configured to facilitate transitioning the interior dynamic portion between two or more configurations.

5. The dynamic contact lens of claim 4, wherein the transition zone comprises one or more features configured to enhance the flexibility of the interior dynamic portion.

6. The dynamic contact lens of claim 5, wherein the one or more features is selected from a group comprising smooth edges, a thinned cross-sectional thickness, grooves, or any combination thereof.

7. The dynamic contact lens of claim 1, wherein the interior dynamic portion and peripheral portion have the same base curvature when in the conforming configuration.

8. The dynamic contact lens of claim 1, wherein the interior dynamic portion and peripheral portion have a different base curvature when in the at least one non-conforming configuration.

9. The dynamic contact lens of claim 1, wherein the interior dynamic portion and peripheral portion are made of the same material.

10. The dynamic contact lens of claim 1, wherein the interior dynamic portion and the peripheral portion are made of one or more materials having the same Young's modulus.

11. The dynamic contact lens of claim 1, wherein the lens comprises a soft material.

12. The dynamic contact lens of claim 1, wherein the tear lens provides an additional optical power to the eye.

* * * * *

UNITED STATES PATENT AND TRADEMARK OFFICE
CERTIFICATE OF CORRECTION

PATENT NO. : 11,947,196 B2
APPLICATION NO. : 17/812929
DATED : April 2, 2024
INVENTOR(S) : Rafaeli et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 43 days.

Signed and Sealed this
Seventh Day of January, 2025

Derrick Brent
*Acting Director of the United States Patent and Trademark Office*